(12) United States Patent
Yoo

(10) Patent No.: US 8,097,450 B2
(45) Date of Patent: *Jan. 17, 2012

(54) THIN FILM CHEMICAL ANALYSIS APPARATUS AND ANALYSIS METHOD USING THE SAME

(75) Inventor: Jae-chern Yoo, Pohang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 196 days.

This patent is subject to a terminal disclaimer.

(21) Appl. No.: 12/376,034

(22) PCT Filed: Aug. 2, 2007

(86) PCT No.: PCT/KR2007/003728
§ 371 (c)(1),
(2), (4) Date: Feb. 2, 2009

(87) PCT Pub. No.: WO2008/016271
PCT Pub. Date: Feb. 7, 2008

(65) Prior Publication Data
US 2009/0317896 A1 Dec. 24, 2009

(30) Foreign Application Priority Data
Aug. 2, 2006 (KR) .................... 10-2006-0073597

(51) Int. Cl.
*C12M 1/34* (2006.01)
*C12M 3/00* (2006.01)

(52) U.S. Cl. ............ 435/288.5; 422/72; 435/287.1

(58) Field of Classification Search ............ 422/64, 422/67, 72, 100; 435/287.2, 288.5, 297.2
See application file for complete search history.

(56) References Cited

U.S. PATENT DOCUMENTS
6,302,134 B1 * 10/2001 Kellogg et al. ............ 137/74
(Continued)

FOREIGN PATENT DOCUMENTS
WO WO03080868 * 2/2003

OTHER PUBLICATIONS
U.S. Appl. No. 11/743,933, filed May 20, 2010, Jae-Chern Yoo, Samsung Electronics Co., Ltd.

*Primary Examiner* — Michael Marcheschi
*Assistant Examiner* — Shanta G Doe
(74) *Attorney, Agent, or Firm* — Staas & Halsey LLP

(57) ABSTRACT

Disclosed is a thin film chemical analysis apparatus and an analysis method using the same, which can solve the sealing problem caused by environmental factors (e.g. impact, temperature) for long circulation and storage periods, as well as can detect an analyte quickly and easily. The thin film chemical analysis apparatus includes at least one chamber adapted to store a fluid necessary for biological or biochemical analysis or to conduct a biological or biochemical reaction; channels for fluid-connection of the chambers; holes arranged between or inside the channels and connected to the channels; a rotatable body having the chambers, the channels, and the holes integrated into the body; and a burst valve having a sealing means for closing the hole and sealing a fluid in the chamber, the sealing means being torn away from the hole by centrifugal force resulting from rotation of the body and opening the hole.

29 Claims, 24 Drawing Sheets

U.S. PATENT DOCUMENTS

| | | | |
|---|---|---|---|
| 7,300,199 B2 * | 11/2007 | Andersson et al. | 366/341 |
| 7,459,129 B2 * | 12/2008 | Andersson et al. | 422/100 |
| 7,560,073 B1 * | 7/2009 | Peters et al. | 422/99 |
| 2001/0055812 A1 * | 12/2001 | Mian et al. | 436/45 |
| 2002/0106786 A1 * | 8/2002 | Carvalho et al. | 435/287.3 |
| 2004/0063217 A1 * | 4/2004 | Webster et al. | 436/180 |
| 2004/0155213 A1 * | 8/2004 | Yoo | 251/65 |
| 2005/0026301 A1 * | 2/2005 | Petithory | 436/180 |
| 2006/0194273 A1 * | 8/2006 | Thomas | 435/29 |
| 2006/0291354 A1 * | 12/2006 | Ferren et al. | 369/52.1 |

* cited by examiner the direction of centrifugal force for the liquid leaked out 7a   liquid leaked out the direction of centrifugal force for the liquid leaked out liquid leaked out fluidic direction by centrifugal force liquid reference PSA CEA AFP CA15-3 CA125 control <the filter channel(66) filled with elmusion>

THIN FILM CHEMICAL ANALYSIS APPARATUS AND ANALYSIS METHOD USING THE SAME

CROSS REFERENCE TO RELATED APPLICATIONS

This application claims the benefit under 35 U.S.C. Section 371, of PCT International Application No. PCT/KR2007/003728, filed Aug. 2, 2007, which claimed priority to Korean Application No. 10-2006-0073597 filed Aug. 2, 2006, in the Korean Intellectual Property Office, the disclosures of all of which are hereby incorporated by reference.

TECHNICAL FIELD

The present invention relates to a thin film chemical analysis apparatus and an analysis method using the same. More particularly, the present invention relates to a thin film chemical analysis apparatus adapted for a thin film-type apparatus for diagnosing and detecting a small amount of substance in a fluid, such as a lab-on-a-chip, a protein chip, or a DNA chip, and an analysis method using the same.

BACKGROUND ART

The present application is related to Korean Patent Application No. 10-2001-0003956 (Jan. 27, 2001) entitled "NUCLEIC HYBRIDIZATION ASSAY METHOD AND DEVICE USING CLEAVAGE TECHNIQUE SPECIFICALLY RESPONSIVE TO SPECIFIC SEQUENCE OF COMPLEMENTARY DOUBLE BOND STRAND OF NUCLEIC ACID AND OLIGONUCLEOTIDE"; PCT Application No. PCT/KR02/00126 (Jan. 27, 2002) entitled "NUCLEIC HYBRIDIZATION ASSAY METHOD AND DEVICE USING A CLEAVAGE TECHNIQUE RESPONSIVE TO THE COMPLEMENTARY DOUBLE STRAND OR THE SINGLE STRAND OF NUCLEIC ACIDS OR OLIGONUCLEOTIDES"; Korean Patent Application No. 10-2001-0031284 (May 31, 2001) entitled "A MICRO VALVE APPARATUS USING MICRO BEAD AND METHOD FOR CONTROLLING THE SAME"; PCT Application No. PCT/KR02/01035 (May 31, 2002) entitled "A MICRO VALVE APPARATUS USING MICRO BEAD AND METHOD FOR CONTROLLING THE SAME"; Korean Patent Application No. 10-2002-0017558 (Mar. 27, 2002) entitled "BIO-DISK, BIO-DRIVER APPARATUS, AND ASSAY METHOD USING THE SAME"; Korean Patent Application No. 10-2005-0038765 entitled "DIGITAL BIO DISK (DBD), DBD DRIVER APPARATUS, AND ASSAY METHOD USING THE SAME"; and PCT Application No. PCT/KR2006/001709 entitled "DIGITAL BIO DISK (DBD), DBD DRIVER APPARATUS, AND ASSAY METHOD USING THE SAME", the contents of all of which are incorporated herein for reference.

The efficiency and economy of most clinical diagnostic assay apparatuses for detecting a small amount of analyte in a fluid have been improved to date by designing apparatuses for preparing multiple samples and automatically adding reagents, as well as apparatuses for assaying a large number of test samples in parallel or in series. Such automated reagent preparation apparatuses and automated multiple-sample analyzers are frequently integrated into a single thin film apparatus. This thin film-type clinical experiment analyzer can accurately assay hundreds of analytes from a small amount of samples and reagents within one hour in an automatic or semi-automatic manner. However, such a thin film-type analyzer has a problem in that the complicated design of valves for controlling the flow and flow rate of samples or reagents (enzymes and buffer solutions) renders it difficult to make the analyzer a thin film.

In order to overcome this problem, there is a dire need to provide valves that are simple and adapted for thin films, and a thin film chemical analysis apparatus into which the valves are integrated.

CD and DVD as Thin Films

Standard CDs consist of a 12-cm polycarbonate substrate, a reflective metal layer, and a protective lacquer coating. Formats regarding CDs and DVDs follow ISO 9600.

The polycarbonate substrate is composed of transparent polycarbonate of an optical quality. In the case of CDs that have undergone standard printing or mass replication, the data layer is a part of the polycarbonate substrate, and the data is engraved as a series of pits by a stamper during the injection molding process. Particularly, polycarbonate is melted and injected into a mold at high pressure during the injection molding process. The polycarbonate is then cooled so that it has the mirror image of the mold, "stamper", or "stamp". The resulting pits on the disk substrate correspond to binary data, and are maintained by the polycarbonate substrate as the mirror image of the pits of the stamper created during the mastering process. The stamping master is commonly glass.

Such a disk can be adapted and modified into a thin film-type analysis apparatus for diagnosing and detecting a small amount of substance in a fluid (e.g. thin film chemical analysis apparatus). In this case, channels through which a fluid can flow, chambers for storing a buffer solution, holes, and valves may be formed on the disk surface during the injection molding process instead of pits.

As generally known in the art, conventional lab-on-a-chips have a plurality of chambers for storing a large amount of liquid-phase biological and chemical substances necessary for chemical processes. However, lab-on-a-chips cannot be commercialized until the following two problems are solved.

Firstly, the body of lab-on-a-chips repeats thermal expansion and contraction due to environmental factors (e.g. impact, temperature) during circulation and storage periods, even if the chambers are closed by physical valves. As a result, the valves have minute gaps, through which the liquid leaks out of the chambers due to the capillary phenomenon.

Secondly, although the liquid-phase substance must be stored in the chambers stably for a long period of time, the liquid itself is subjected to pressure resulting from evaporation and convection when the lab-on-a-chips are exposed to environmental factors (e.g. temperature) for a long period of time, and leaks out of the chambers through the minute gaps.

U.S. Patent Publication No. US005863708A discloses a valve using a temperature gradient caused by a biometallic material and a heated well. However, this valve has many problems regarding commercialization because it is difficult to control the valve by "heat control" without damaging the biomaterial, and because the liquid sealing problem due to evaporation and convection occurring inside the liquid cannot be overcome.

U.S. Pat. No. 6,063,589 entitled "DEVICES AND METHODS FOR USING CENTRIPETAL ACCELERATION TO DRIVE FLUID MOVEMENT ON A MICROFLUIDICS SYSTEM", U.S. Pat. No. 5,186,844 entitled "APPARATUS AND METHOD FOR CONTINUOUS CENTRIFUGAL BLOOD CELL SEPARATION", and U.S. Pat. No. 6,752,961 entitled "MODIFIED SIPHONS FOR IMPROVING METERING PRECISION" disclose capillary burst valves having chambers for gradually moving a liquid from the circular center in the outward direction while gradually increasing the rotation speed. Particularly, the disk is initially rotated at a low speed and then rotated at a higher speed so that the fluid moves to the next chamber. Such capillary burst valves have serious problems in that they are not applicable to a lab-on-a-chip process including centrifugation, which requires a high speed from the beginning, they can be opened only once, and they cannot be closed again after being opened.

Conventional valves, which have the above-mentioned two problems, cannot store a liquid in chambers for a long period of time. In an attempt to avoid such problems, U.S. Pat. No. 6,752,961 proposes that a separate diluent container be used to store a liquid and be broken just before the liquid inside the container is used. However, the fact that a bulky container must be stored inside the disk renders it impossible to make the disk a thin film.

DISCLOSURE

Technical Problem

Therefore, the present invention has been made in view of the above-mentioned problems, and the present invention provides a thin film chemical analysis apparatus capable of solving the sealing problem caused by environmental factors (e.g. impact, temperature) for long circulation and storage periods, as well as detecting an analyte quickly and easily.

In addition, the present invention provides an analysis method capable of solving the sealing problem caused by environmental factors (e.g. impact, temperature) for long circulation and storage periods, as well as detecting an analyte quickly and easily.

Technical Solution

In accordance with an aspect of the present invention, there is provided a thin film chemical analysis apparatus including at least one chamber adapted to store a fluid necessary for biological or biochemical analysis or to conduct a biological or biochemical reaction; channels for fluid-connection of the chambers; holes arranged between or inside the channels and connected to the channels; a rotatable body having the chambers, the channels, and the holes integrated into the body; and a burst valve having a sealing means for closing the hole and sealing a fluid in the chamber, the sealing means being torn away from the hole by centrifugal force resulting from rotation of the body and opening the hole.

The thin film chemical analysis apparatus may further include a thin film valve connected to the burst valve in series at a channel, the burst valve being arranged in the channel, and adapted to open/close the channel reversibly so that reversible opening/closing is possible while guaranteeing sealing properties of the chamber.

The burst valve may be connected to the outlet or inlet of the thin film valve in series. The burst valve may be installed at the outlet of the liquid storage chamber to completely seal the outlet during the circulation period. The fact that the liquid in the liquid storage chamber does not leak through the thin film valve solves the fatal problem of conventional thin film valves, which have poor long-term sealing capacity.

In addition, the shortcomings of conventional burst valves that are disposable (i.e. once they are opened, they cannot be closed again) are overcome. According to the present invention, the burst valve is adapted to seal the liquid storage chamber during the circulation period. Once the burst valve is opened by centrifugal force during disk operation, the liquid in the liquid storage chamber is solely allowed to move to an adjacent chamber according to whether the thin film valve is opened or closed.

The hole is adapted to be opened when centrifugal force resulting from rotation of the body exceeds closing strength of the sealing means regarding the hole.

The thin film chemical analysis apparatus may include a plurality of burst valves having different levels of closing strength of the sealing means, and a rotation speed of the body may be controlled so that opening/closing of the plurality of burst valves is controlled selectively or independently.

The thin film chemical analysis apparatus may further include a heat irradiation means for applying heat to the burst valve, and the burst valve may be opened by a combination of the centrifugal force and the heat applied by the heat irradiation means.

The heat irradiation means may be a laser beam irradiation means.

The thin film chemical analysis apparatus may further include a valve search means coupled to the heat irradiation means so that a burst valve to be opened can be selected.

The application of the heat may be conducted by a pulse beam operation of applying heat to the burst valve every time a location of the heat irradiation means coincides with a location of the burst valve during rotation of the body.

Preferably, the burst valve is adapted to be opened by a combination of heat generated by laser beams and centrifugal force, or by centrifugal force alone.

A laser beam generating device emits laser beams toward the burst valve so that the resulting heat weakens the sealing strength or binding strength of the burst valve, which is then easily opened by centrifugal force. The laser beam generating device may be mounted on a slider, which is a type of valve search means.

Emission of laser beams toward the burst valve may occur while the disk rotates or when the disk has stopped.

In order to emit laser beams toward a corresponding burst valve during rotation of the disk, the laser beam generating device is slid to a location corresponding to the radius of the burst valve and is operated to generate laser beams. Then, the burst valve is irradiated with the laser beams every time the laser beam generating device on the slider matches with the burst valve during rotation of the disk. The amount of laser beams directed to the burst valve is a function of the disk rotation speed and the power of the laser beam generating device. Such a laser beam emission operation during rotation of the disk will hereinafter be referred to as a pulse beam operation.

When the disk has stopped, the laser beam generating device on the slider and the corresponding burst valve are aligned to match with each other. If the burst valve is irradiated with laser beams, the amount of laser beams directed to the burst valve is a function of the intensity of laser beams and the irradiation time. The intensity of laser beams can be adjusted by modifying the focus of laser beams or the distance between the laser beam generating device and the burst valve, or by controlling the current of the laser beam generating device.

Such a laser beam emission operation of controllably moving the slider to a location of the corresponding burst valve and controllably turning on/off the laser beam generating device while the disk remains stationary will hereinafter be referred to as a scanning beam operation.

The controlled movement of the slider to the location of the burst valve may be based on a radial valve search process and an azimuthal valve search process, which will be described later.

Preferably, a thin film-type cylindrical magnet is installed on the upper or lower end of the burst valve for the purpose of the azimuthal valve search process.

Preferably, the burst valve is opened by heating the burst valve based on the pulse beam operation or the scanning beam operation and then rotating the disk.

Preferably, concentric burst valves of the thin film chemical analysis apparatus are opened by centrifugal force occurring in the fluid during rotation of the thin film chemical analysis apparatus, as well as by a pulse beam operation of heating and opening a corresponding concentric burst valve every time the laser beam generating device on the slider matches with the burst valve during rotation of the thin film chemical analysis apparatus.

The pulse beam operation is useful in moving a high-viscosity fluid or simultaneously moving a plurality of concentric burst valves so that the fluid moves to corresponding adjacent chambers during rotation. This is because high-viscosity fluids cannot be easily moved without being accompanied by centrifugal force. Particularly, a viscous fluid may fail to move to an adjacent chamber even if the valve is opened while the disk remains stationary. This degrades the operability and reliability.

The body may be a rotatable thin film disk including an upper substrate, a middle substrate, and a lower substrate. The diameter of the disk is preferably 120 mm, 80 mm, or 32 mm.

The movement of the fluid may be conducted by centrifugal force resulting from rotation force of the body or by a capillary phenomenon, or is conducted via a channel coated with a hydrophilic material.

The body may be variously made of plastic, glass, mica, silica, silicon wafer, etc. However, the plastic is preferred due to economic reasons, easiness of processing, and compatibility with conventional laser reflection-based detectors (e.g. CD-ROM, DVD reader).

Preferably, the body is made of at least one material selected from the group consisting of silicon wafer, polypropylene, polyacrylate, polyvinyl alcohol, polyethylene, PMMA (polymethylmetacrylate), COC (cyclic olefin copolymer), and polycarbonate. The body may be coated with aluminum or have aluminum sheet attached to a surface of the body.

When a liquid-phase substance is stored in a chamber of a lab-on-a-chip, it must remain stable until it is used. However, the body of the lab-on-a-chip undergoes contraction and expansion due to environmental factors (e.g. temperature) during long circulation and storage periods. As a result, valves develop gaps, through which the liquid leaks due to evaporation and convention occurring in the liquid. This critically degrades the reliability of sealing.

The above problems are solved by burst valves according to the present invention.

According to an embodiment of the present invention, the burst valve is a hydraulic burst valve.

The hydraulic burst valve is advantageous in that it can be realized in a thin film type, and because thin film adhesive tape is flexible enough to adapt itself to expansion and contraction resulting from environmental factors (e.g. temperature), no sealing problem occurs during circulation and storage periods due to evaporation and convention of the liquid or due to expansion and contraction of the body.

Particularly, the sealing means is hole-closing membrane glued to the hole to seal the fluid in the chamber, and the hole-closing membrane is torn away from the hole by hydraulic pressure of the fluid created by centrifugal force resulting from rotation of the body so that the hole is opened.

The hole-closing membrane may be thin film adhesive tape including an adhesive or a membrane material.

The adhesive may be made of a material selected from the group consisting of silicon, rubber-based material, modified silicon-based material, acrylic material, polyester, and epoxy.

The body may include an upper substrate, a middle substrate, and a lower substrate stacked on one another, and the thin film chemical analysis apparatus may further include first thin film adhesive tape stacked between the upper and middle substrates to bind the upper and middle substrates; and second thin film adhesive tape stacked between the middle and lower substrates to bind the middle and lower substrates.

A portion of the first or second thin film adhesive tape may be glued to the hole to form a hole-closing membrane sealing the fluid.

The thin film adhesive tape may be single-sided or double-sided tape. The tape may consist of paper, vinyl, polyester film, polyethylene film, or any synthetic release paper, one or both sides of which are surface-treated with a special adhesive or gluing agent. If necessary, an adhesive having excellent properties (e.g. sealing properties, buffering properties, vibration-absorbing properties, resistance to impact, resistance to heat, adsorbing properties, gluing strength) may be selected and used.

The membrane may have a hydrophobic surface or may be made of a material selected from the group consisting of polymer, polyethylene, polypropylene, polysulfone, polyalkene, cellulosics, polyvinyl, polycarbonate, and polyamide. The hydrophobic membrane surface efficiently interrupts the movement of the fluid stored in the liquid storage chamber.

When it comes to the manufacturing method, single-sided tape may be attached to the substrate, and the release paper is then removed so that a surface of the substrate is coated with a thin film of adhesive. Alternatively, a surface of the substrate may be coated with a thin film of adhesive by using a dispenser, by spraying the adhesive, or by silk screen printing.

Preferably, the thin film adhesive tape does not rely on release paper, but the substrate is coated with a thin film of adhesive.

The single-sided tape has a hole-closing membrane so that, when the release paper is removed, the hole-closing membrane is left near the hole by the adhesive.

When the hole is closed by the thin film adhesive tape, the area of attachment of the thin film adhesive tape determines the closing strength. When the disk rotation speed (centrifugal force) exceeds the closing strength, the thin film adhesive tape is torn away and opens the hole.

According to another embodiment of the present invention, the burst valve is a viscous burst valve.

Particularly, the sealing means is grease or a grease-coated solid particle, the grease or grease-coated solid particle is glued to the hole to seal the fluid in the chamber, and the grease or grease-coated solid particle is torn or separated from the hole by centrifugal force resulting from rotation of the body so that the hole is opened.

Preferably, the viscous substance is melt (or the viscosity is weakened) by heat resulting from laser beam irradiation.

The grease may be gel-phase oil selected from the group consisting of Si-based oil, TFE oil, Si-based grease, and Si-based vacuum grease.

The thin film chemical analysis apparatus may further include an auxiliary channel for receiving the grease or grease-coated solid particle when the grease or grease-coated solid particle is separated from the hole by centrifugal force resulting from rotation of the body.

The stopple is preferably coated with a cushiony material, or is a ball coated with an adhesive.

The adhesive is preferably melt (or the adhesive strength is weakened) by heat resulting laser beam irradiation. The stopple is preferably melt or reduced by heat resulting from laser beam irradiation.

According to another embodiment of the present invention, the burst valve is a stopple burst valve.

Particularly, the sealing means is a stopple glued to the hole to seal the fluid in the chamber, and the stopple is separated from the hole by centrifugal force resulting from rotation of the body and opens the hole.

The stopple may be a metal particle having a shape of a cone, a ball, a thin film cylinder, or a particle having a larger head.

The thin film chemical analysis apparatus may further include a gluing means arranged near the hole to glue to the stopple to the hole.

The thin film chemical analysis apparatus may further include a search means for searching for a specific location of the body through a radial search process and an azimuthal search process of the body.

The thin film chemical analysis apparatus may further include a thin film-type magnet arranged at a specific location of the body to provide the search means with a reference point.

The search means may be adapted to search for a location of a valve, a chamber, or an assay site on the body.

The thin film chemical analysis apparatus may further include at least one means coupled to the search means and selected from the group consisting of a valve opening means, a laser irradiation means, a chamber mixing means, and a reaction detecting means.

The body may include at least two substrates stacked on each other, and the thin film chemical analysis apparatus may further include thin film adhesive tape stacked between the substrates to bind the substrates; and a thin film channel formed so that a portion of the thin film adhesive tape is lost and forms a channel by a capillary phenomenon.

The thin film chemical analysis apparatus may further include a bio pickup optical module; a slide equipped with the bio pickup optical module and adapted to search for a specific location on the body; and a slider motor for controlling movement of the slider.

The bio pickup optical module may include a laser beam generating device, a thin film valve opening/closing means, or a reaction result detecting device.

The slider may be adapted to search for a specific location on the body based on a radial search process of the body, an azimuthal search process, or an upward/downward movement process.

The thin film chemical analysis apparatus may further include a spindle motor for rotating the body at a high speed; a step motor for rotating the body by a predetermined angle; and a gear connection means for controlling connection of the step motor and the spindle motor to the body.

The at least one chamber may include a liquid storage chamber and a reagent chamber, the liquid storage chamber contains a liquid-phase reagent while the reagent chamber is empty, and the liquid-phase reagent stored in the liquid storage chamber is supplied to the reagent chamber when the burst valve is opened, or the liquid storage chamber and the reagent chamber contain a dilution buffer and solid-phase reagent granules, respectively, and the dilution buffer stored in the liquid storage chamber is supplied to the reagent chamber when the burst valve is opened so that the solid-phase reagent granules stored in the reagent chamber are dissolved in the dilution buffer and turn into a liquid-phase reagent.

According to the present invention, the thin film valves include all types of valves, except for the burst valves according to the present invention. Particularly, the thin film valves include valves which can be made in a thin film type and which have holes adapted to be opened/closed by various opening/closing means. For example, the thin film valves according to the present invention include a valve using a microbead (or cylindrical magnet) installed in a hole so that it is opened/closed by a movable permanent magnet or an electromagnet installed above or below the body; a valve opened/closed by mechanical force; a valve opened/closed by centrifugal force; a valve opened/closed by dissolution and solidification caused by a chemical reaction; a valve opened/closed by a shape memory alloy which restores its original shape by heat or chemical reactions; a valve opened/closed by air bubbles created by electrolysis; a valve opened/closed by air bubbles created by heat; a valve opened/closed by thermal expansion and contraction of a microbead; a valve opened/closed by electrostatic force; a valve opened/closed by magnetic force; a valve opened/closed by laser heat; a valve opened/closed by a temperature gradient; a valve opened/closed by an actuator based on ultrasonic waves; a valve opened/closed by a pump or physical pressure; a valve opened/closed by hydrophobic properties; a valve opened/closed by a small particle that expands and contracts due to irradiation of ultra-high frequency waves or laser beams; and a valve opened/closed by a magnetic fluid; and a valve opened/closed by thermal expansion and contraction of air.

In the case of the valve based on hydrophobic properties, the hydrophobic surface, which has been coated with a hydrophobic material, is preferably converted into a hydrophilic surface by laser beam irradiation. Alternatively, the hydrophilic surface is again converted into the hydrophobic surface by additional laser beam irradiation.

The hydrophobic coating preferably has hydrophilic properties by means of heat caused by laser beams emitted by a laser beam generating device. The hydrophobic coating preferably consists of a phase-changing substance.

When a substance is a crystalline phase caused by laser beams, it has a high level of hydrophobic properties (i.e. it is in a basic phase). Particularly, a crystalline-phase portion acts as a barrier against a hydrophilic liquid movement and plays the role of closing the valve. When irradiated with strong laser, the molecular arrangement of the phase-changing material is broken, and its temperature rises very much. If the substance is solidified in that condition, it turns into an amorphous phase, in which the hydrophobic properties are replaced with hydrophilic properties.

The hydrophilic coating facilitates the movement of a hydrophilic liquid on the surface, and thus incorporates a valve opening function.

However, in an amorphous phase, the hydrophobic coating is thermodynamically unstable. This means that the coating returns to the original crystalline phase even if a small amount of heat is applied. Based on these characteristics, the portion that has converted into the hydrophilic coating is irradiated with a medium-intensity of laser to heat it at a relative low temperature so that the portion switches from the amorphous phase to the crystalline phase (hydrophobic). A hydrophobic barrier is again formed in this manner.

The thin film valve preferably consists of a microbead and a movable permanent magnet. Although a spherical ball is preferred as the microbead, a non-spherical particle may also be used, such as a thin film cylindrical magnet or a thin film square magnet.

The microbead includes, for example, a magnet ball, a ferromagnetic metal particle, a paramagnetic particle, a diamagnetic particle, and a stainless metal ball. The microbead may also consist of solid-phase metal, plastic, or a glass ball, which is coated with metal or cushiony material (e.g. rubber, silicone rubber). The metal ball may consist of an alloy. The microbead has a diameter of 1 um-1 mm, and preferably 100 um-500 μm. The contact surface increases in proportion to the ball size, and improves the reliability regarding opening/closing. According to the present invention, although a spherical ball is preferred as the microbead, a non-spherical particle may also be used as the microbead, such as a thin film-type cylindrical permanent magnet or a thin film-type square permanent magnet. The thin film-type permanent magnet preferably has a thickness of 0.1-0.5 mm, and the thin film-type cylindrical permanent magnet preferably has a diameter of 1-5 mm.

According to a preferred embodiment of the present invention, the spherical or non-spherical particle is coated with silicone rubber. Alternatively, a thin film of silicone rubber is inserted between the thin film-type cylindrical magnet and the hole. The silicone rubber is cushiony and is suited for sealing.

According to the present invention, chambers for pre-storing various liquid-phase reagents (e.g. enzyme, buffer solution), which are necessary to operate the thin film chemical analysis apparatus, during the manufacturing process will be referred to as liquid storage chambers, and all remaining types of chambers will be referred to as process chambers.

The process chambers include a reagent chamber, which is supplied with a liquid-phase reagent from the liquid storage chamber and temporarily stores it when the burst valve is opened. When the thin film valve of a process chamber requiring the liquid-phase reagent is opened, the reagent is supplied from the reagent chamber to the process chamber.

The at least one chamber may include a liquid storage chamber, a reagent chamber, and a process chamber, the thin film chemical analysis apparatus may further include a thin film valve for reversibly opening/closing a hole connecting the chambers, a fluid movement from the liquid storage chamber to the reagent chamber may be made by opening the burst valve, and a fluid movement from the reagent chamber to the process chamber or a fluid movement between the process chambers may be made by opening the thin film valve.

The thin film chemical analysis apparatus may further include a thin film valve opening/closing means for controlling opening/closing of the thin film valve; and a valve search means coupled to the thin film valve opening/closing means so that a thin film valve to be opened can be selected, and the thin film valve may be opened by opening a thin film valve by the thin film valve opening/closing means, the thin film valve having been selected by the valve search means.

The thin film valve may include a permanent magnet installed above the hole; an electromagnet or a movable permanent magnet installed below the hole; and a microbead or a thin film cylindrical magnet for selectively opening/closing the hole by magnetic force established by the magnets.

The thin film valve may be adapted to close the hole throughout circulation and storage periods by means of magnetic force from the permanent magnet installed above the hole.

The thin film chemical analysis apparatus may further include a small magnetic ball stored in the at least one chamber; a slider adapted to move rapidly below the body; and a permanent magnet mounted on the slider to apply drawing force or repulsive force to the small magnetic ball so that the small magnetic ball can move, and the small magnetic ball in the chamber moves together by the drawing force from the magnet at every time when the ball faces the permanent magnet by rotating the body or by repeating forward/backward rotation while the permanent magnet remains stationary at a corresponding radius of the chamber so that liquid mixing in the chamber is induced.

The thin film chemical analysis apparatus may further include a small magnetic ball stored in the at least one chamber; a slider adapted to move rapidly below the body; and a permanent magnet mounted on the slider to apply drawing force or repulsive force to the small magnetic ball so that the small magnetic ball can move, and the small magnetic ball in the chamber vibrates by rotating the body while the permanent magnet remains stationary at a corresponding radius of the chamber so that liquid mixing in the chamber is induced.

The thin film chemical analysis apparatus may further include a small magnetic ball stored in the at least one chamber; a slider adapted to move rapidly below the body; and an electromagnet mounted on the slider to apply drawing force or repulsive force to the small magnetic ball so that the small magnetic ball can move, and the small magnetic ball in the chamber vibrates by on/off control of the electromagnet or by changing a magnetic field direction so that liquid mixing in the chamber is induced.

A fluid movement between the at least one chamber may be made by a fluid movement caused by centrifugal force resulting from rotation of the body, by a hydrophilic fluid movement caused by a hydrophilic channel surface, by a pumping fluid movement caused by repeated opening/closing of the thin film valve, or by a fluid movement caused by a capillary phenomenon of the channel.

The thin film chemical analysis apparatus may further include a thin film valve opening/closing means for controlling opening/closing of the thin film valve; and a valve search means of which upper part is coupled to the thin film valve opening/closing means so that a thin film valve to be opened can be selected, and a fluid movement between the at least one chamber is made by pumping force occurring when the valve search means repeatedly selects the thin film valve.

The pumping force may be generated by a pulse valve operation of opening the thin film valve every time a location of the thin film valve opening/closing means coincides with a location of the thin film valve during rotation of the body.

The thin film chemical analysis apparatus may further include a liquid valve for preventing centrifugal force from causing fluid leakage from the chamber during rotation of the body.

The liquid valve may be a U- or V-shaped channel when viewed with a rotation center of the body as a reference.

The liquid valve may have a surface treated with a hydrophilic material, and a fluid held in a chamber by the liquid valve during rotation of the body may be moved to a different chamber by a hydrophilic fluid movement when the body stops.

The at least one chamber of the thin film chemical analysis apparatus may include an excess chamber so that, when an excess of fluid is injected into a different chamber, the excess is stored in the excess chamber and that the different chamber stores a predetermined amount of fluid.

The at least one chamber of the thin film chemical analysis apparatus may include a quantitative channel connected between the excess chamber and the different chamber to transfer the excess of fluid during rotation of the body.

The at least one chamber of the thin film chemical analysis may have an inverted V-type wedge shape when viewed with a rotation center of-the body as a reference, and the burst valve may be arranged on an end of a wedge-shaped portion in the chamber, hydraulic pressure concentrating in the end.

The wedge-shaped chamber may be used as a preparation chamber for preparing a sample from an analyte, and the burst valve installed at the end of the wedge-shaped portion may have sufficient closing strength so that the burst valve is not opened during centrifugation.

The thin film chemical analysis apparatus may further include a filter arranged in the channel to separate a sample.

The filter may be a membrane having a micropore or a porous filter.

The sample may be separated by a pulse filter operation of opening the thin film valve every time a location of the thin film valve opening/closing means coincides with a location of the thin film valve during rotation of the body so that the sample is discharged from the thin film valve and passes through the filter by centrifugal force.

The thin film chemical analysis apparatus may include an emulsion that can convert into a filter by an emulsion photopolymerization method, and a filter chamber formed at a location of the channel, in which the filter is to be formed, while intersecting with it. The filter may be formed in the filter chamber.

The thin film chemical analysis apparatus may include a temperature control means for controlling a reaction temperature of the chamber.

The temperature control means may include a temperature measuring means, a heating means, and a cooling means.

The at least one chamber of the thin film chemical analysis apparatus may include at least one of a preparation chamber for preparing a sample from an analyte; an amplification chamber for amplifying the sample; a buffer chamber for temporarily storing a sample obtained in the preparation chamber or storing a dilution buffer for diluting the sample or a label to be coupled to a target substance in the sample; an assay site having a probe fixed so as to undergo a biological or biochemical reaction with the sample; a liquid storage chamber storing an enzyme necessary for analysis or a buffer solution; a reagent chamber for temporarily storing the enzyme or buffer solution from the liquid storage chamber and supplying the enzyme or buffer solution to a different chamber; a trash chamber for collecting waste created during a dehydration process or a cleaning process; a cleaning chamber for storing a cleaning solution necessary for a cleaning process of a different chamber; and a quantitative chamber for supplying a predetermined amount of sample to a different chamber.

The preparation chamber may additionally have an auxiliary preparation chamber and a preparation hole so that a sample can be separated from a centrifugally separated analyte.

The label may be in a liquid phase or include solid-phase granules.

The label may be a noctilucent label.

The solid-phase granules may be solid particles obtained by converting a liquid-phase label into tablets, balls, grains, or powder, or particles obtained by converting a liquid-phase label into a frozen-dried form on a porous pad.

The preparation of the sample in the preparation chamber may be conducted by centrifugation using high-speed rotation of the body.

The dilution buffer in the buffer chamber may be supplied via a reagent injection hole of the buffer chamber or be supplied by a burst valve opening operation from the liquid storage chamber storing the dilution buffer.

The assay site may store a reagent for reaction analysis.

The assay site may include a nitrocellulose membrane, a nylon membrane, or a porous membrane and a capture probe fixed on the membrane.

The assay site may store a reagent for reaction analysis, or include a porous membrane and a capture probe fixed thereon.

The reagent for reaction analysis may include solid-phase granules.

When the burst valve is opened, the dilution buffer stored in the liquid storage chamber may convert the solid-phase granules into a liquid-phase reagent or label.

The solid-phase granules may include a plurality of different solid-phase granules stored in a plurality of assay sites for a plurality of types of biochemical reaction analysis, respectively, and the plurality of different solid-phase granules can be converted into a liquid-phase reagent by a single type of dilution buffer.

The liquid storage chamber for storing the dilution buffer may have a volume corresponding to a dilution ratio of solid-phase granules determined for each of the plurality of assay sites.

The liquid storage chamber may include a lower substrate constituting the bottom of the chamber; a middle substrate constituting the lateral surfaces and a portion of the top of the chamber so that the height of the outer periphery of the chamber is smaller than that of the center; a liquid injected into the chamber and concentrated in the outer periphery of the chamber by the capillary phenomenon; and an upper substrate coupled after the liquid injection to constitute the remaining portion of the top of the chamber.

Particularly, the liquid storage chamber may include a middle substrate and an upper substrate, the middle substrate may include a chamber for providing a liquid storage space and an upper opening for injecting a liquid into the chamber, the height of an outer periphery of the chamber of the middle substrate may be smaller than the height of a center of the chamber so that, when a liquid is injected into the chamber via the opening, the liquid is concentrated in the outer periphery of the chamber due to a capillary phenomenon, and the upper substrate may be coupled to the middle substrate after the liquid is completely injected into the chamber so that a top of the liquid storage chamber is sealed.

The quantitative chamber may be installed between a concentric channel and the assay site, the quantitative chamber and the concentric channel may be filled with a sample by a hydrophilic fluid movement of the sample via the concentric channel, and the at least one chamber may further include an overflow chamber at an end of the concentric channel so that, during rotation of the body, a portion of the sample filling the concentric channel is withdrawn by centrifugal force while a different portion of the sample remains in the quantitative chamber.

The sample in the quantitative chamber may move to each assay site when concentric thin film valves installed between the quantitative chamber and the assay site are simultaneously opened by a pulse valve operation during rotation of the body.

The quantitative chamber may include a sector channel coated with a hydrophilic material and may be filled with a sample during a hydrophilic fluid movement of the sample.

The sector channel may have an inverted V or U shape when viewed with a rotation center of the body as a reference so that the sample is isolated in each sector channel during rotation of the body without moving to an adjacent assay site.

The assay site may include a porous membrane, interdigitated electrodes formed on a surface of the porous membrane as coatings, and a capture probe fixed in an empty space between the interdigitated electrodes; a porous membrane and a capture probe fixed on the porous membrane; a micropore formed on a substrate and a capture probe fixed on the micropore; or a capture probe to be fixed and a fixing means for fixing the capture probe to the substrate at a desired time.

The assay site may include a porous membrane and a probe fixed on the porous membrane, and the thin film chemical analysis apparatus may further include a virtual sample storage chamber for storing a virtual sample to be injected into the assay site after the sample so as to facilitate diffusion of the sample.

The virtual sample may have a diffusion rate lower than the sample or a viscosity higher than the sample. The virtual sample may be a cleaning solution having glycerol added to the solution.

The assay site may include a porous membrane and various types of tumor markers or disease markers fixed on the porous membrane as line- or spot-type test lines, and the fixed markers may have an overall strip shape so as to allow a lateral flow or flow-through of the entire fluid.

The thin film chemical analysis apparatus may further include marker location lines corresponding to locations of the markers or an edge line defining an edge of the strip.

The upper substrate corresponding to the assay site may be treated opaquely so that, when the upper substrate is irradiated with light, scattering and noise are reduced.

The porous membrane may include at least one of a conjugate pad and a sample pad.

The tumor markers or disease markers may be selected from the group consisting of AFP, PSA, CEA, CA19-9, CA125, CA15-3, markers specific to Alzheimer's disease, and myocardial infarction markers.

The assay site may further include a capture probe for a reference line and a control line fixed on the porous membrane.

The reaction density of the reference line may be determined as a cutoff value.

The cutoff value of the reference line may be 3 ng/ml, 4 ng/ml, 10 ng/ml, 20 ng/ml, 30 ng/ml, 40 ng/ml, or 50 ng/ml.

Qualitative or quantitative analysis may proceed based on a difference in reaction intensity between the reference and test lines.

Qualitative or quantitative analysis may proceed based on a difference in reaction intensity between background of the strip and the test lines.

Qualitative or quantitative analysis may proceed based on reaction intensity of the test lines determined by a linear function regarding reaction intensity established by the plurality of reference lines.

Qualitative or quantitative analysis may proceed based on reaction intensity of the test lines determined by a linear function regarding reaction intensity established by the reference and control lines.

The body may include an integrated wireless RF IC incorporating a temperature measuring function, a heating function, or an assay site reading function.

The body may include an integrated wireless RF IC for storing information regarding a pesticide residue test or an antibiotic residue test.

The information may be stored in a memory incorporated in the wireless RF IC.

The information may be related to a test date, a test result, an expiration date, a target production area, a product ID, a production history, a circulation history, a farmer contact, a price, or whether the product is organic or not.

The body may include a CD or DVD optical layer on a surface thereof.

The CD or DVD optical layer may include a protective layer, a reflective layer, and a data layer.

The data layer may include a pit, a pigment layer, or a phase-changing substance layer.

The data layer may include information regarding a version of the thin film chemical analysis apparatus, a manufacturing date, a protocol, an analysis algorithm, a standard control value for reading, a location of the assay site, bioinformatics, self-diagnosis, personal security, an ID, a test result, or a history.

The thin film chemical analysis apparatus may further include a detecting means for detecting a reaction in the at least one chamber.

The detecting means may be a spectrophotometer including a light source device and an optical detector.

The thin film chemical analysis apparatus may further include a chamber search means coupled to the detecting means so as to select from the at least one chamber.

The detecting means may be an image sensor device, and the thin film chemical analysis apparatus may further include an LED for lighting of the image sensor device.

The LED may be a multicolor LED emitting various wavelengths of light, and the image sensor device may be adapted to measure color intensity with regard to the various wavelengths of light and to analyze a reaction based on a two-dimensional profile between the wavelengths and the color intensity.

The thin film chemical analysis apparatus may be combined with a bio-robot, a running machine, a massager, a bidet, a vending machine, or a body fat measuring device.

The bio-robot may have a lancet device on a finger-shaped portion so that sample blood can be loaded into a sample injection hole of the body.

According to another aspect of the present invention, there is provided a thin film chemical analysis apparatus for a pesticide residue test, including at least one chamber adapted to store a fluid necessary for a pesticide residue test or an antibiotic residue test or to conduct a pesticide residue test; channels for fluid connection of the chambers; an assay site adapted to undergo a reaction with a reagent; holes arranged between or inside the channels and connected to the channels; a rotatable body having the chambers, the channels, the assay site, and the holes integrated into the body; a burst valve having a sealing means for closing the hole and sealing the fluid in the chamber, the sealing means being torn away from the hole by centrifugal force resulting from rotation of the body so that the hole is opened; and a thin film valve adapted to open/close the hole reversibly, wherein the assay site includes a sample membrane for measuring reaction intensity regarding a sample obtained from an analyte; and a control membrane for determining zero point of reaction intensity as a blank test.

The at least one chamber may include at least one of a preparation chamber for preparing a sample from an analyte due for a pesticide residue test; a sample extraction liquid storage chamber for storing a sample extraction liquid transferred to the preparation chamber to extract a sample from the analyte when the burst valve is opened; a buffer chamber for temporarily storing the sample obtained in the preparation chamber or storing a dilution buffer for diluting the sample or a label to be coupled to a target substance in the sample; a liquid storage chamber for storing an enzyme necessary for analysis or a buffer solution; a trash chamber for collecting waste created during a cleaning process; a reagent chamber for temporarily storing the enzyme or buffer solution from the liquid storage chamber and supplying the enzyme or buffer solution to a different chamber; a control liquid storage chamber for supplying a control liquid to the control membrane;

and a quantitative chamber for supplying a predetermined amount of sample to a different chamber.

The liquid storage chamber may contain a dilution buffer while the reagent chamber or the buffer chamber contains solid-phase reagent granules, the dilution buffer stored in the liquid storage chamber may be supplied to the reagent chamber or the buffer chamber when the burst valve is opened, and the solid-phase reagent granules stored in the reagent chamber or the buffer chamber may be dissolved in the dilution buffer and turn into a liquid-phase reagent.

The movement of the fluid may be made by a pulse valve operation of opening the thin film valve every time a location of the thin film valve coincides with a location of a thin film valve opening/closing means during rotation of the body, by a hydrophilic fluid movement, by a capillary fluid movement, or by a pumping fluid movement.

The thin film chemical analysis apparatus may further include a liquid valve for preventing centrifugal force from causing fluid leakage from the chamber during rotation of the body.

The liquid valve may be a U- or V-shaped channel when viewed with a rotation center of the body as a reference.

The liquid valve may have a surface treated with a hydrophilic material, and a fluid held in a chamber by the liquid valve during rotation of the body may be moved to a different chamber by a hydrophilic fluid movement when the body stops.

The body may include an integrated wireless RF IC for storing information regarding a pesticide residue test or an antibiotic residue test.

The information may be stored in a memory incorporated in the wireless RF IC.

The information may be related to a test date, a test result, an expiration date, a target production area, a product ID, a production history, a circulation history, a farmer contact, a price, or whether the product is organic or not.

The test result regarding the assay site may be displayed on a computer monitor, remote access may be made to a server of a corresponding government institute or a food dealer via Internet automatically or manually so that the test result and history are stored in the server, or an authentication regarding the test result may be received from the government institute and is recorded on an RF IC on the body.

The pesticide residue may be organophosphorous-based or carbamate-based insecticide.

The sample membrane may include acetylcholinesterase (AChE) for detecting the carbamate-based insecticide.

The thin film chemical analysis apparatus according to the present invention is characterized in that the body is of a thin film type, as in the case of a disk device (e.g. CD-ROM, DVD). The flow and flow rate of the fluid stored in the liquid storage chamber are preferably controlled by a burst valve selected from a hydraulic burst valve, a viscous burst valve, and a stopple burst valve. The flow and flow ratio of the fluid between the process chambers are preferably controlled by a thin film valve, a burst valve, or a combination of both.

The thin film chemical analysis apparatus and the analysis method using the same according to the present invention are suitable for a thin film-type apparatus for diagnosing and detecting a small amount of biomaterial or a chemical substance in a fluid, such as a lab-on-a-chip, a protein chip, or a DNA chip. Particularly, the inventive thin film chemical analysis apparatus is suited for integration into a conventional thin film disk (e.g. CD-ROM, DVD).

The thin film chemical analysis apparatus and the analysis method using the same according to the present invention are suitable for a thin film-type apparatus for diagnosing and detecting a small amount of biomaterial or a chemical substance in a fluid, such as a lab-on-a-chip to which ELISA/CLISA has been applied, a lab-on-a-chip to which a rapid test method has been applied, or a lab-on-a-chip for a food-poisoning bacteria test, an antibiotic residue test, a pesticide residue test, a genetically modified food test, a food allergy test, contaminant test, a paternity test, a meat type test, or a production site identification test.

Characteristically, the pesticide residue test is related to organophosphorous-based and carbamate-based insecticides, which are most frequently used as pesticides for vegetables and fruits.

The present invention is characterized in that the biomaterial is at least one material selected from the group consisting of DNA, oligonucleotide, RNA, PNA, a ligand, a receptor, an antigen, an antibody, milk, urine, saliva, hair, an agricultural product sample, a meat sample, a fish sample, a bird sample, contaminated water, a livestock sample, a food sample, an oral cell, a tissue sample, semen, protein, and a biological substance.

If the analyte is urine, the thin film chemical analysis apparatus can analyze leucocyte, blood, protein, nitrite, pH, specific gravity, glucose, ketone, ascorbic acid, urobilinogen, and bilirubin.

When the analyte is hair, the analysis is advantageous in that it is possible to more accurately measure the historical record of accumulation of nutrients and toxic materials in the body (e.g. mineral), compared with blood or urine. Particularly, the analysis result can accurately tell whether inorganic materials have been taken excessively or insufficiently for a long period of time, the amount of toxic heavy metal, etc, as generally known in the art.

According to another aspect of the preset invention, there is provided an analysis method using a thin film chemical analysis apparatus including at least one chamber; channels for fluid connection of the chambers; holes arranged between or inside the channels and connected to the channels; a rotatable body having the chambers, the channels, and the holes integrated into the body; a burst valve having a sealing means for closing the hole and sealing a fluid in the chamber; and a thin film valve adapted to open/close the channel reversibly, the analysis method including a step of tearing the sealing means away from the hole by centrifugal force resulting from rotation of the body so that the burst valve is opened.

The analysis method according to the present invention is characterized in that a liquid storage chamber for storing a liquid in the body is separately provided so that, when the disk is initially used, the burst valve is opened to move the liquid stored in the liquid storage chamber to corresponding reagent chambers. The liquid storage chamber is opened by a burst valve selected from a hydraulic burst valve, a viscous burst valve, and a stopple burst valve. The thin film valve controls the valve opening/closing and the flow rate the reagent and process chambers every time each process begins and ends. The fluid movement is made by centrifugal force resulting from rotation force of the disk, by a capillary phenomenon, or by a channel coated with a hydrophilic material.

The analysis method may further include the steps of opening the burst valve so that a fluid stored in a liquid storage chamber is transferred to a different chamber; and controlling the thin film valve connected to the burst valve in series in a channel, the burst valve being arranged in the channel, so that the channel is opened/closed reversibly.

The analysis method may further include a step of controlling a rotation speed of the body so as to generate centrifugal force corresponding to closing strength of the sealing means and to open the burst valve.

The analysis method may further include a step of controlling heat applied to the burst valve to open the burst valve.

The analysis method may further include a step of moving the fluid by centrifugal force resulting from rotation of the body, by a hydrophilic channel surface, by pumping force resulting from repeated opening/closing of the thin film valve, or by a capillary phenomenon of the channel.

The sealing means may be a hole-closing membrane, grease, a grease-coated particle, or a stopple.

The analysis method may further include the steps of opening the burst valve to supply a dilution buffer stored in a liquid storage chamber to a reagent chamber; and dissolving solid-phase reagent granules stored in the reagent chamber by the dilution buffer so that the granules turn into a liquid-phase reagent.

The analysis method may further include a step of searching for a valve to be opened/closed so that the burst valve or the thin film valve is opened/closed selectively.

The analysis method may further include a step of moving a small magnetic ball contained in the chamber by magnetic force so that liquids in the chamber are mixed.

The analysis method may further include a step of preventing centrifugal force from causing fluid leakage from the chamber opened during rotation of the body by using a liquid valve having a U- or V-shape when viewed with a rotation center of the body as a reference.

The analysis method may further include a step of separating a sample by using a filter provided in the channel.

The analysis method may further include a step of controlling a reaction temperature of the chamber.

The analysis method may further include the steps of searching for and selecting a specific chamber; and detecting a reaction result of an assay site.

The detecting step may be conducted by a spectrophotometer, and analysis of the assay site by the spectrophotometer may be conducted after the chamber search step based on control of a rotation angle of the body by a step motor or a gear connected to the step motor or based on an azimuthal valve search, or may be conducted based on space addressing of assay sites by a buffer chamber so that optical absorbance of a sample in the chamber is continuously measured during rotation of the body.

The light source or light source device of the spectrophotometer may be a white LED, an RGB laser, or an laser diode module having a plurality of laser diodes integrated into the module.

The reading of the assay site by the spectrophotometer may include the steps of transmitting a predetermined wavelength of light obtained by a light source device of the spectrophotometer through the assay site of the thin film chemical analysis apparatus having a reflective layer integrated into an upper substrate in the body or into the assay site, and detecting light reflected by the reflective layer by an optical detector so as to measure optical absorbance of the sample in the assay site.

The reading of the assay site by the spectrophotometer may include the steps of measuring optical absorbance of the sample by an optical detector integrated into the body so as to obtain a reading result, and receiving the reading result by a wireless RF IC integrated into the body so as to wirelessly transmit the reading result to an outside.

The analysis method may further include a step of rotating the body at a high speed to separate a sample from an analyte.

The analysis method may further include the steps of rotating the body at a high speed to separate a sample from an analyte by centrifugal force; mixing the separated sample with a dilution buffer or a label in a buffer chamber by moving the separated sample to the buffer chamber; opening the thin film valve so that the sample in the buffer chamber makes a hydrophilic-fluid-movement via a concentric channel, a quantitative channel, or a sector channel; and opening the thin film valve by opening the burst valve or by a pulse valve operation of the thin film valve so that the sample in the quantitative chamber or the sector channel flows into each assay site and undergoes a biochemical reaction with a reagent in the assay site.

The analysis method may further include a step of rotating the body so that a portion of the sample filling the concentric channel is entirely moved to an overflow chamber by centrifugal force while a different portion of the sample remains in the quantitative chamber only.

The analysis method may further include the steps of opening the burst valve so that the dilution buffer stored in a dilution buffer storage chamber is transferred to the assay site; and dissolving solid-phase granules in the assay site by the transferred dilution buffer.

The analysis method may further include a step of supplying the buffer chamber with a dilution buffer or a label by burst valve opening of the dilution buffer chamber before the mixing step.

The channel connecting the buffer chamber to the concentric channel or to the sector channel may include a liquid valve for preventing liquid leakage during rotation of the body, and the analysis method may further include a step of moving a sample held in the buffer chamber by the liquid valve during rotation of the body to the concentric channel or the sector channel by a hydrophilic fluid movement when the body stops.

The analysis method may further include the steps of cleaning the assay site by adding a cleaning solution; and rotating the body at a high speed to dehydrate and dry the assay site.

The analysis method may further include at least one of the steps of analyzing a reaction result of the assay site qualitatively or quantitatively; displaying a diagnosis result corresponding to analysis on a computer monitor; remotely transmitting the diagnosis result or a medical interview table to a doctor via Internet connection; and receiving a prescription from the doctor.

The analysis method may further include a step of transferring a centrifugally separated sample to the buffer chamber by a pulse valve operation of the thin film valve or by a pulse filter operation.

The analysis method may further include a step of providing a user with a message requesting ejection or a warning message when a conventional optical disk or an unrecognizable thin film chemical analysis apparatus is loaded onto a thin film chemical analysis apparatus drive.

An exemplary analysis method using a thin film chemical analysis apparatus according to the present invention includes the steps of (a) injecting a sample containing nucleic acid into a preparation chamber by a sample injection means; (b) conducting a preparation process of extracting DNA or RNA from the sample; (c) transferring the DNA or RNA extracted during the preparation process to an amplification chamber; (d) conducting an amplification process by transferring a reagent containing an enzyme and a buffer solution necessary to amplify the DNA or RNA in the amplification chamber from a first reagent chamber to the amplification chamber; (e) transferring the amplified DNA to an assay site after the amplification process is over; (f) conducting a hybridization reaction process by transferring a reagent containing an enzyme and a buffer solution necessary for the hybridization reaction process of the assay site from a second reagent chamber to the assay site; and (g) collecting waste created during the hybridization reaction process after the hybridization reaction process is over.

The enzymes and buffer solutions in the first and second reagent chambers may be supplied from liquid storage chambers, which have been storing them separately, by opening the burst valve.

The cleaning step may further include a step of adding a cleaning solution in a third a reagent chamber to the assay site by opening the thin film valve so that the assay site is cleaned.

The cleaning solution in the third reagent chamber may be supplied from a liquid storage chamber, which has been storing it separately, by opening the burst valve.

Particularly, during the cleaning step using the cleaning solution, the cleaning solution stored in the liquid storage chamber is transferred to the third reagent chamber by opening the burst valve and is directed into the assay site by opening the thin film valve of the third reagent chamber so that the assay site is cleaned.

The cleaning step may further include a step of drying and dehydrating the assay site by rotating the disk. Waste created during the drying and dehydrating process is collected in the trash chamber by centrifugal force.

Another exemplary analysis method using a thin film chemical analysis apparatus according to the present invention includes the steps of separating a sample (serum or plasma) from blood by rotating the thin film chemical analysis apparatus at a high speed; directing the sample into a first buffer chamber storing a label and conducting incubation so that the antigen and the label constitute a label-antigen linked body; moving the label-antigen linked body into an assay site; incubating the thin film chemical analysis apparatus in a stationary condition so that the label-antigen linked body undergoes an antigen-antibody reaction with a capture antibody (immunoprobe); and adding a cleaning solution to clean the assay site or rotating the body at a high speed to dry and dehydrate the assay site.

Another exemplary method using a thin film chemical analysis apparatus according to the present invention includes the steps of separating a sample (serum (plasma) or antigen) from blood by rotating the thin film chemical analysis apparatus at a high speed; directing the sample into a first buffer chamber storing a dilution buffer and mixing the sample with the dilution buffer to obtain a diluted sample; moving the diluted sample to an assay site; incubating the thin film chemical analysis apparatus in a stationary condition so that the diluted sample undergoes an antigen-antibody reaction with a capture antibody (immunoprobe); and adding a cleaning solution to clean the assay site or rotating the body at a high speed to dry and dehydrate the assay site.

Advantageous Effects

The thin film chemical analysis apparatus and the analysis method using the same according to the present invention are suitable for a thin film-type apparatus for diagnosing and detecting a small amount of substance in a fluid, such as a lab-on-a-chip, a protein chip, or a DNA chip. Particularly, the inventive apparatus and method are suited for integration into a thin film such as a conventional disk device (e.g. CD-ROM, DVD). The apparatus and method can advantageously solve the sealing problem caused by environment factors (e.g. temperature) for long circulation and storage periods, as well as detect an analyte easily and quickly.

BRIEF DESCRIPTION OF THE DRAWINGS

The foregoing and other objects, features, and advantages of the present invention will become more apparent from the following detailed description when taken in conjunction with the accompanying drawings in which.

BEST MODE

Mode for Invention

Hereinafter, exemplary embodiments of the present invention will be described with reference to the accompanying drawings.

Figure 1:
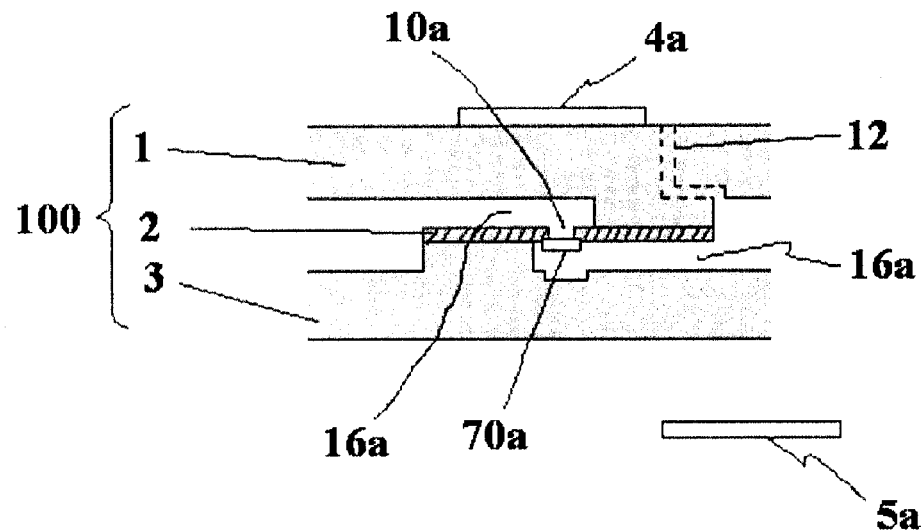
FIGS. 1 and 2 show a valve using a microbead installed inside the body of a thin film chemical analysis apparatus according to an embodiment of the present invention, when the valve is opened and closed, respectively.
Figure 2:
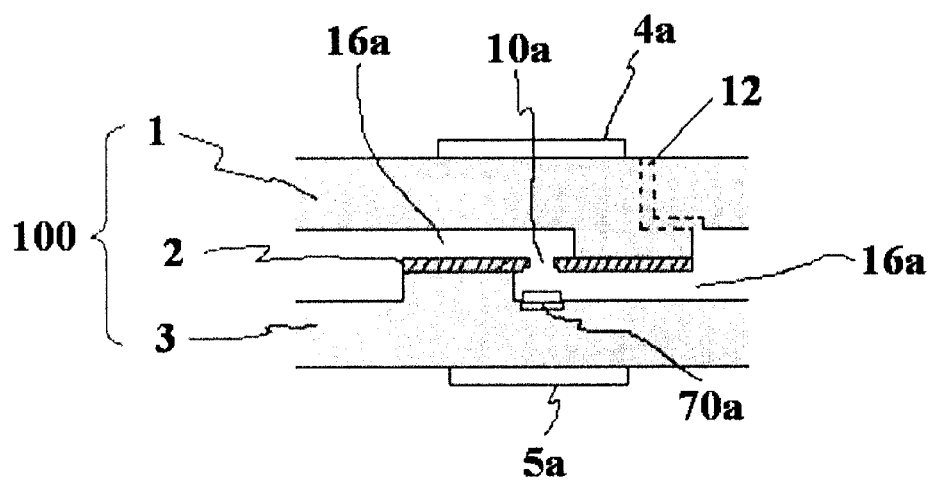

FIGS. 1 and 2 show a valve using a microbead installed inside the body of a thin film chemical analysis apparatus 100 according to an embodiment of the present invention, when the valve is opened and closed, respectively.

Referring to FIGS. 1 and 2, a thin film valve according to an embodiment of the present invention uses a thin film-type cylindrical permanent magnet.

The body includes an upper substrate 1, a middle substrate 2, and a lower substrate 3, each of which forms a plurality of channels for enabling a fluid to flow on the substrate surface during an injection molding process, chambers for storing a buffer solution, and holes for interconnecting the channels. These components are fastened and attached to one another to constitute a thin film chemical analysis apparatus.

FIG. 1 corresponds to a case in which the thin film-type cylindrical permanent magnet 70a closes a hole 10a and disconnects channels 16a. FIG. 2 corresponds to a case in which the hole 10a is opened to connect the channels 16a. When the channels are to be disconnected by closing the hole 10a as shown in FIG. 1, the lower permanent magnet 5a is moved away from the center of the hole 10a so that the upper permanent magnet 4a draws the thin film-type cylindrical permanent magnet 70a in the upward direction and closes the hole 10a.

As such, the valve is closed by the drawing force between the upper permanent magnet 4a and the thin film-type cylindrical permanent magnet 70a. On the other hand, when the hole 10a is to be opened to connect the channels 16a as shown in FIG. 2, the movable permanent magnet 5a lying below the body 100 is moved toward the center of the hole 10a so as to draw the thin film-type cylindrical permanent magnet 70a in the downward direction. Particularly, the valve is opened because the drawing force between the lower permanent magnet 5a and the thin film-type cylindrical permanent magnet 70a is stronger than that between the upper permanent magnet 4a and the thin film-type cylindrical permanent magnet 70a.

Such opening/closing is realized when the lower permanent magnet 5a is stronger than the upper permanent magnet 4a. Alternatively, the distance between the thin film-type cylindrical permanent magnet 70a and the lower permanent magnet 5a is set to be smaller than that between the thin film-type cylindrical permanent magnet 70a and the upper permanent magnet 4a.

According to the present invention, the lower permanent magnet 5a preferably consists of an electromagnet or a movable permanent magnet. Considering that narrow channels 16a are formed in the disk so that the fluid can move through them, the upper substrate 1 has a discharge port 12 formed therein so that the fluid can properly move through the channels without receiving pressure.

The chamber of the thin film chemical analysis apparatus according to the present invention preferably has a discharge port for discharging air pressure resulting from the fluid movement. More preferably, the discharge port is positioned in a direction opposite to the direction of flow of the fluid (i.e. opposite to the centrifugal force).

FIGS. 3-10 show burst valves according to embodiments of the present invention.

Figure 3:
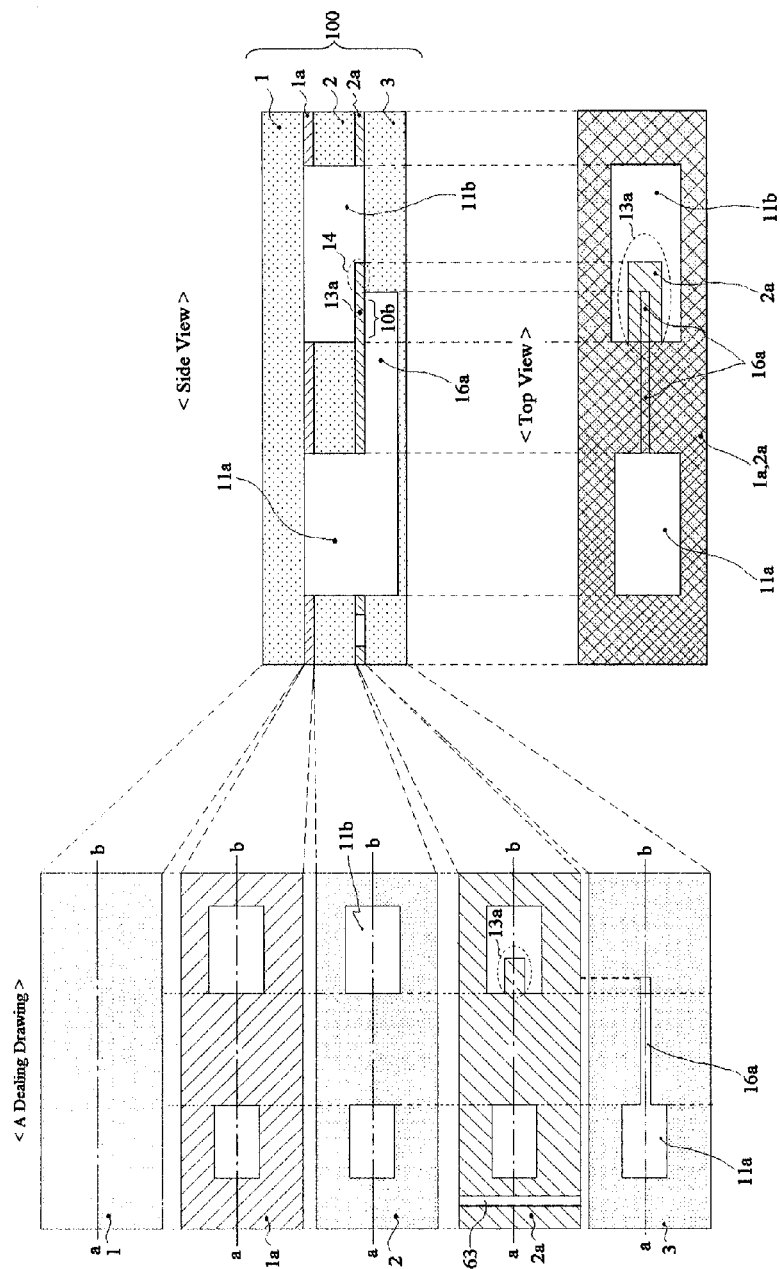
FIG. 3 shows an exploded plane view, a sectional side view, and a plane view of a hydraulic burst valve using thin film adhesive tape installed inside the body of a thin film chemical analysis apparatus according to an embodiment of the present invention.

FIG. 3 shows an exploded plane view, a sectional side view, and a plane view of a hydraulic burst valve using thin film adhesive tape installed inside the body of a thin film chemical analysis apparatus according to an embodiment of the present invention. Referring to FIG. 3, the body includes an upper substrate 1, a middle substrate 2, and a lower substrate 3, which form channels 16a for enabling a fluid to flow on the substrate surface during an injection molding process, a liquid storage chamber 11a for storing a buffer solution, a reagent chamber 11b, and a hole 10b for interconnecting the channels 16a.

The substrates 1, 2, and 3 are fastened and attached to one another by thin film adhesive tape 1a and 2b to constitute a thin film chemical analysis apparatus 100.

Particularly, the upper and middle substrates 1 and 2 constitute the chambers 11a and 11b. The lower substrate 3 has channels 16a engraved at a predetermined depth so as to connect the liquid storage chamber 11a and the reagent chamber 11b. A hole 10b is formed on one end of the channels 16a so that the liquid storage chamber 11a and the reagent chamber 11b can connect to each other. The hole 10b is closed by a hole-closing membrane 13a, which is formed near the hole 10b by thin film adhesive tape 2a when the substrates 1, 2, and 3 are attached and assembled.

The hole-closing membrane 13a closes the hole 10b so that it is completely sealed during circulation and storage periods. The body 100 rotates at a high speed during use, and the resulting centrifugal force causes the fluid contained in the liquid storage chamber 11a to builds up its own hydraulic pressure, which tears off the hole-closing membrane 13a and opens the hole 10b. As a result, the fluid moves to the reagent chamber 11b. The hole-closing membrane 13b is flexible enough to adapt itself to expansion and contraction resulting from environmental factors (e.g. temperature). This is advantageous in that, during circulation and storage periods, the sealing problem hardly occurs due to the evaporation and convection of the liquid or due to the expansion and contraction of the body.

The present invention is characterized in that the hole-closing membrane 13a is formed near the hole 10b when the substrates 1, 2, and 3 are fastened to one another by thin film adhesive tape 1a and 2b to be assembled.

According to another aspect, the present invention is characterized in that, since the closing strength occurring when the hole is closed by the thin film adhesive tape is proportional to the area 14 of attachment between the hole-closing membrane 13a and the substrates, a plurality of hydraulic burst valves having different levels of closing strength are installed in the thin film chemical analysis apparatus 100 and, when a valve is to be opened at a desired time, centrifugal force is generated to obtain hydraulic pressure exceeding the closing strength of the hole-closing member 13b of the corresponding valve so that the hole 10b is opened selectively or separately.

Figure 4:
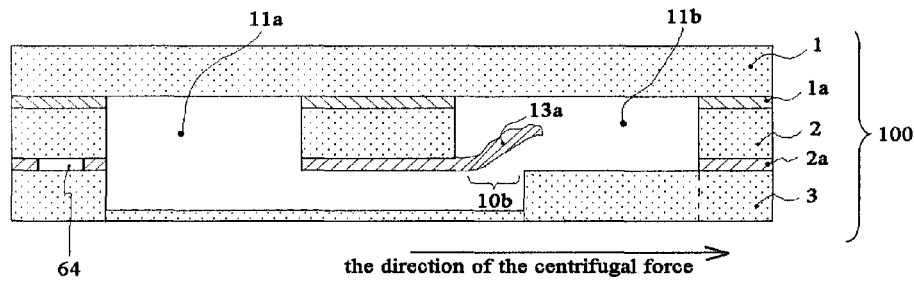
FIG. 4 shows a sectional side view of the hydraulic burst valve when the hole-closing membrane is opened.

FIG. 4 shows a sectional side view of a hydraulic burst valve using thin film adhesive tape installed inside the body of a thin film chemical analysis apparatus according to an embodiment of the present invention, when the hole-closing membrane is opened.

Referring to FIG. 4, the liquid builds up hydraulic pressure when the body rotates, and the resulting pressure tears off the hole-closing membrane 13a and opens the hole 10b. As a result, the liquid (not shown) stored in the liquid storage chamber 11a moves to the reagent chamber 11b.

The present invention is characterized in that, thin film channels 64 are preferably formed between layers of the substrates 1, 2, and 3 by thin film adhesive tape having a channel shape design.

The substrates 1, 2, and 3 are fastened and attached to one another by thin film adhesive tape so as to constitute a thin film chemical analysis apparatus 100. Characteristically, thin film channels 64 are formed on portions between layers of the substrates, where the thin film tape is omitted (e.g. indicated by reference numeral 63 in FIG. 3).

The fact that the thin film channels 64 are very narrow facilitates the capillary phenomenon.

Figure 5:
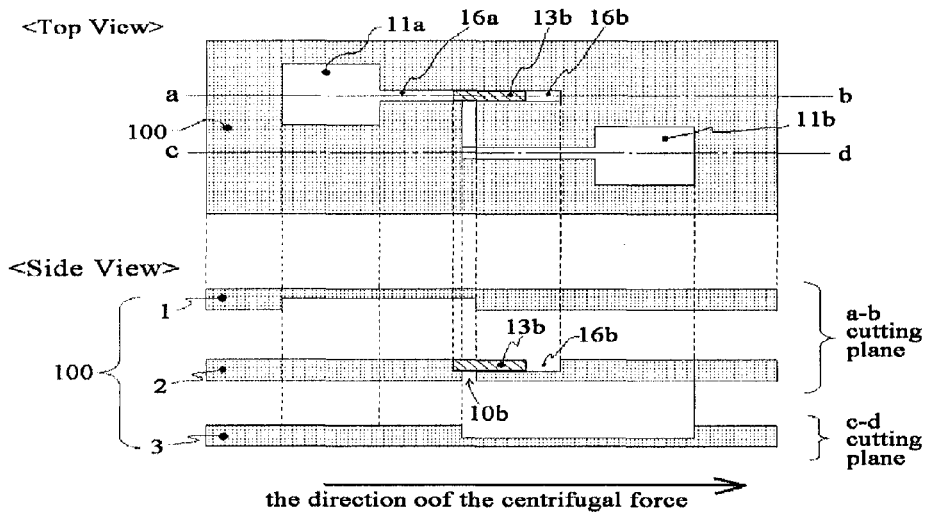
FIG. 5 shows a plane view and a sectional side view of a viscosity burst valve using grease embedded inside the body of a thin film chemical analysis apparatus according to an embodiment of the present invention.
Figure 6:
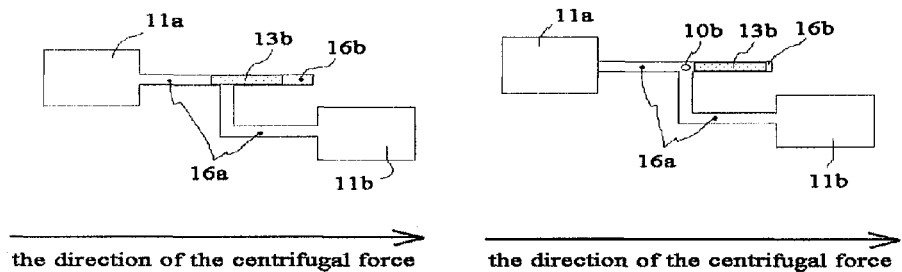
FIG. 6 shows the viscosity burst valve when the hole is closed and opened by grease, respectively.

FIG. 5 shows a plane view and a sectional side view of a viscosity burst valve using grease embedded inside the body of a thin film chemical analysis apparatus according to an embodiment of the present invention, and FIG. 6 shows the viscosity burst valve when the hole is closed and opened by grease, respectively.

The body includes an upper substrate 1, a middle substrate 2, and a lower substrate 3, each of which forms channels 16a for enabling a fluid to flow on the substrate surface during an injection molding process, a liquid storage chamber 11a for storing a buffer solution, a reagent chamber 11b, and a hole 10b for interconnecting the channels 16a. These components are fastened and attached to one another to constitute a thin film chemical analysis apparatus 100. Grease 13b is embedded near the hole 10b to close it so that the hole 10b is completely sealed by grease 13b during circulation and storage periods. The grease 13b moves towards the auxiliary channel 16b and opens the hole 10b if the centrifugal force resulting from high-speed rotation of the body 100 during use exceeds the binding force between the channels 16a and the grease 13b.

According to another aspect, the present invention is characterized in that, since the closing strength occurring when the hole 10b is closed by the grease 13b is proportional to the viscosity of the grease 13b or the area of contact between the grease 13b and the channels 16a, a plurality of viscous burst valves having different levels of closing strength are installed in the thin film chemical analysis apparatus and, when a valve is to be opened at a desired time, the disk is rotated to generate centrifugal force exceeding the closing strength of the corresponding valve so that the hole 10b is opened selectively or independently.

The grease 13b may be used as a coating on a solid particle. Alternatively, the grease 13b may be mixed with a solid particle. In this case, the weight of the solid particle makes it easier to open the valve by the centrifugal force. Considering that the closing strength by the grease is inverse proportional to the size or density of the solid particle, a plurality of viscous burst valves having different levels of closing strength may be installed in the thin film chemical analysis apparatus and, when a valve is to be opened at a desired time, the disk may be rotated to generate centrifugal force exceeding the closing strength of the corresponding valve so that the hole 10b is opened selectively or independently.

Referring to FIG. 6, the left half corresponds to a case in which the grease 13b closes the hole 10b and disconnects the channels 16a, and the right half corresponds to a case in which the grease 13b moves from the hole 10b to the auxiliary channel 16b and opens the hole 10b due to centrifugal force resulting from the rotation of the body.

Figure 7:
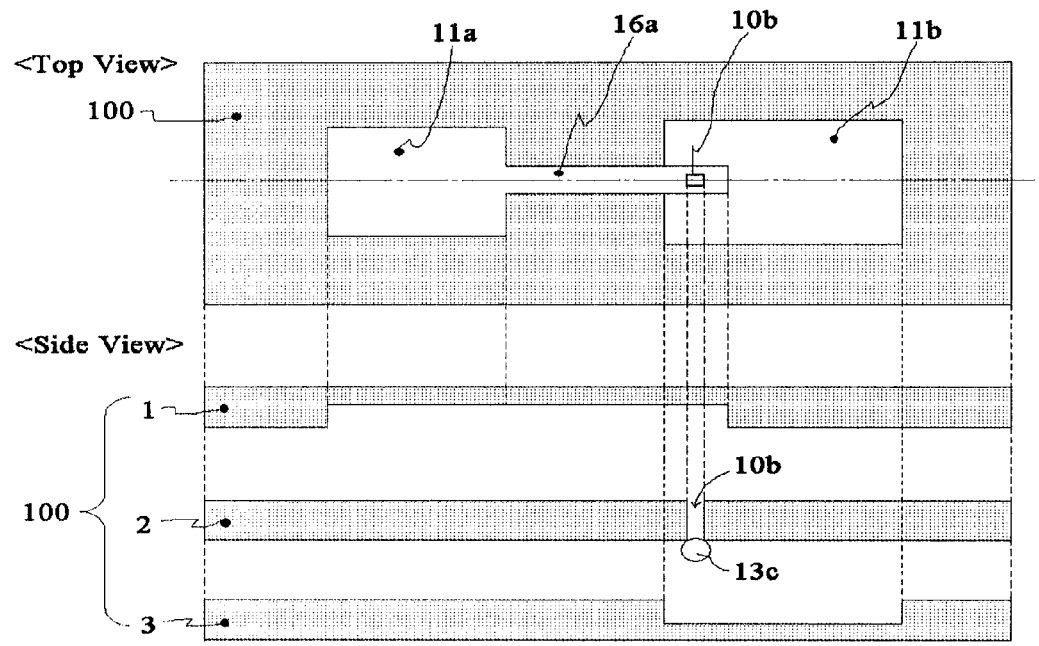
FIG. 7 shows a plane view and a sectional side view of a stopple burst valve using a stopple installed inside the body of a thin film chemical analysis apparatus according to an embodiment of the present invention.

FIG. 7 shows a plane view and a sectional side view of a stopple burst valve using a stopple installed inside the body of a thin film chemical analysis apparatus according to an embodiment of the present invention.

The body includes an upper substrate 1, a middle substrate 2, and a lower substrate 3, each of which forms channels 16a for enabling a fluid to flow on the substrate surface during an injection molding process, a liquid storage chamber 11a for storing a buffer solution, a reagent chamber 11b, and a hole 10b for interconnecting the channels 16a. These components are fastened and attached to one another to constitute a thin film chemical analysis apparatus 100. A stopple 13c closes the hole 10b so that it is completely sealed during circulation and storage periods. The stopple 13c moves away from the hole 10b and opens it due to centrifugal force resulting from high-speed rotation of the body during use.

According to another aspect, the present invention is characterized in that, since the closing strength occurring when the hole is closed by the stopple is proportional to the adhesive strength or binding strength of the stopple, a plurality of stopple burst valves having different levels of closing strength are installed in the thin film chemical analysis apparatus and, when a valve is to be opened at a desired time, centrifugal force exceeding the closing strength of the corresponding valve is generated to open the hole 10b.

Figure 8:
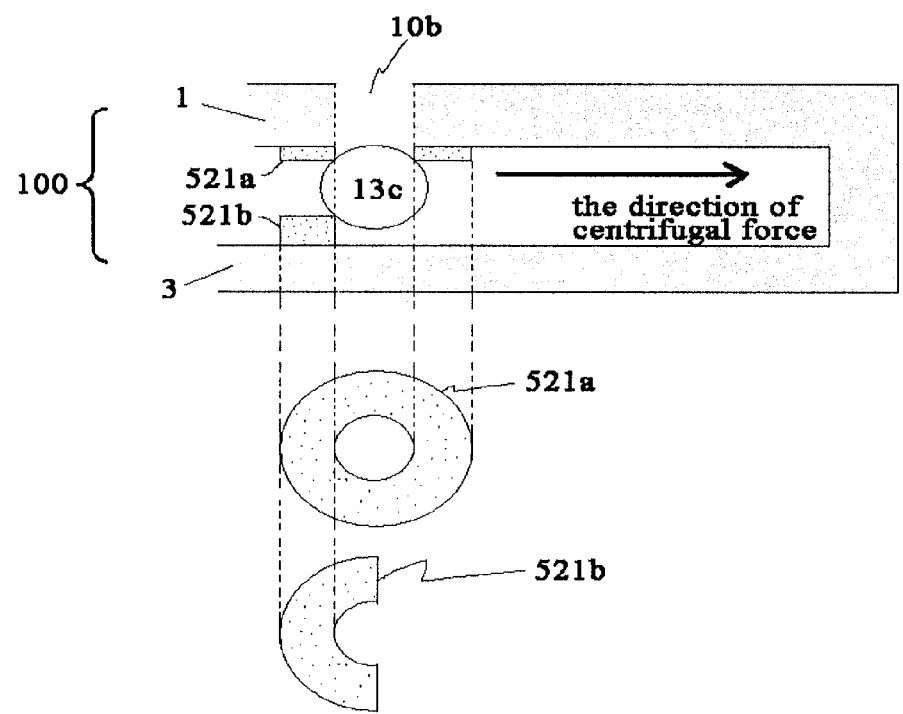
FIGS. 8 and 9 show a stopple burst valve using a steel ball as its stopple according to another embodiment of the present invention, when the valve is closed and opened, respectively.
Figure 9:
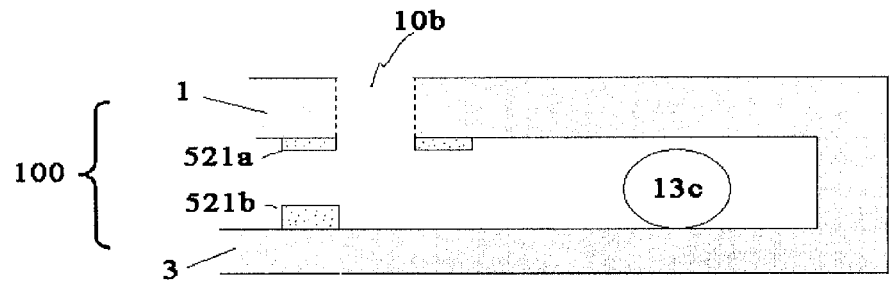

FIGS. 8 and 9 show a stopple burst valve using a steel ball as its stopple according to another embodiment of the present invention, when the valve is closed and opened, respectively.

Referring to FIGS. 8 and 9, a steel ball 13c is used to close the hole 10b so that it is automatically opened by centrifugal force during use.

Referring to FIG. 8, the steel ball 13c closes the hole 10b together with attachment means 521a and 521b.

In the drawing, reference numeral 521a refers to an attachment means for fastening the upper surface of the steel ball 13c to the hole 10b. To this end, the attachment means 521a has adhesive strength with regard to the entire circumference of the steel ball 13c.

Reference numeral 521b refers to an attachment means for attaching the lower surface of the steel ball 13c to the lower substrate 3. The attachment means 521b is designed to have adhesive strength with regard to half the entire circumference of the steel ball 13c so that the steel ball 13c is easily released by centrifugal force.

Referring to FIG. 9, the thin film chemical analysis apparatus 100 is loaded on a thin film chemical analysis apparatus drive (not shown) and is rotated at a high speed. The strong centrifugal force acting on the steel ball 13c during the rotation causes the steel ball 13c to move against the adhesive strength of the attachment means 521a and 521b and open the hole 10b.

The thin film chemical analysis apparatus according to the present invention is characterized in that the hole 10b is preferably closed by the adhesive strength or binding strength between the steel ball 13c and the attachment means 521a and 521b, and that the centrifugal force causes the steel ball 13c to move against the adhesive strength of the attachment means 521a and 521b and open the hole 10c.

The attachment means 521a and 521b according to the present invention are preferably made of an adhesive material which is used for cushiony adhesive tape.

Figure 10:
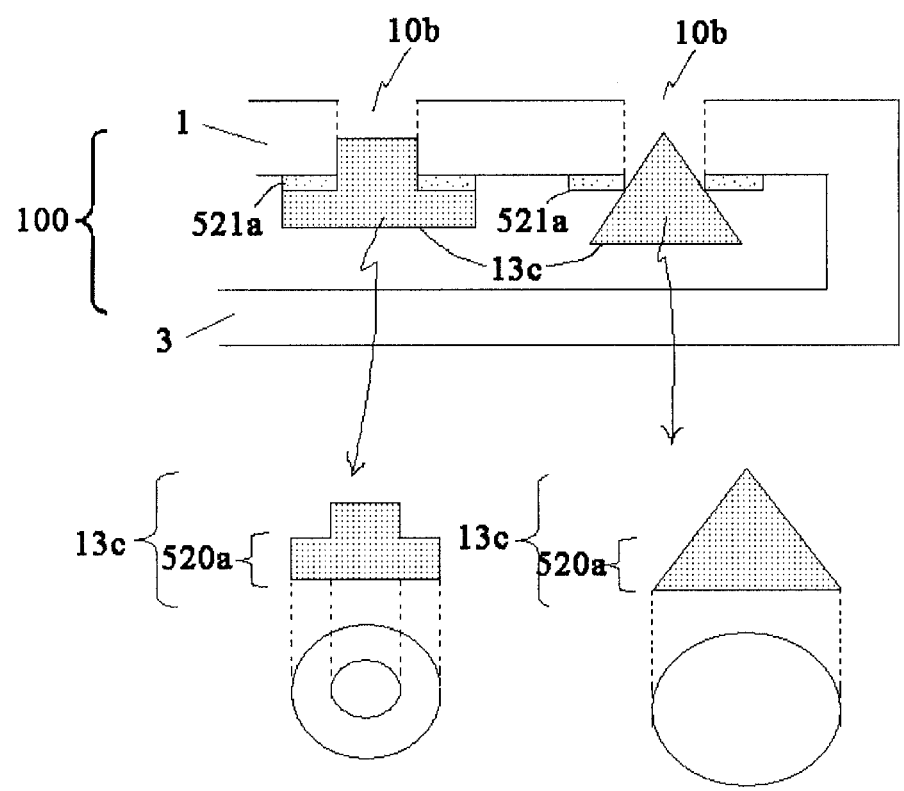
FIG. 10 shows examples of steel balls having different shapes.

FIG. 10 shows examples of steel balls having different shapes.

Referring to FIG. 10, the steel balls 13c preferably have an enlarged head 520a in the shape of a triangular cylinder and a cap, respectively, so that the steel balls 13 for closing the hole 10b can be easily released by centrifugal force. In this case, only the upper surface of the steel balls 13c is fastened and attached to the hole 10b by an attachment means 521a.

According to another embodiment, the hole 10b itself is coated with a cushiony rubber material in order to increase the degree of closing of the hole 10b.

Alternatively, the steel ball 13c is coated with a cushiony rubber material, gel, or grease material.

Figure 11:
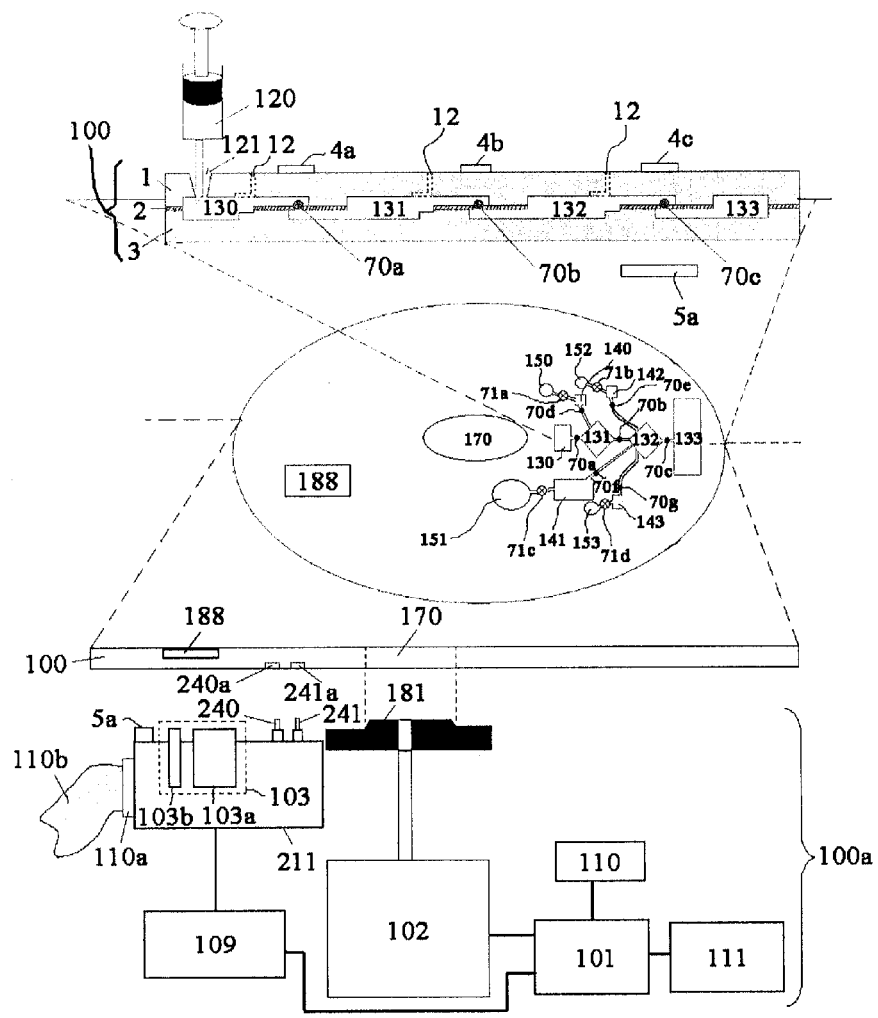
FIG. 11 shows sectional and plane views of a thin film chemical analysis apparatus according to an embodiment of the present invention, as well as a sectional view of a thin film chemical analysis apparatus drive for driving and controlling the apparatus.

FIG. 11 shows sectional and plane views of a thin film chemical analysis apparatus according to an embodiment of the present invention, as well as a sectional view of a thin film chemical analysis apparatus drive for driving and controlling the apparatus.

Referring to FIG. 5, a series of processes regarding a lab-on-a-chip are integrated into a thin film, such as a conventional disk device (e.g. CD-ROM or DVD).

Particularly, the drawing illustrates an embodiment of a thin film chemical analysis apparatus 100 having chambers adapted to store various buffer solutions necessary for analysis and to conduct various chemical processes, channels for moving processed fluids and buffer solutions, and thin film valves and burst valves for controlling the opening/closing of the channels, all of which are integrated into a thin film disk, as well as a thin film chemical analysis apparatus drive 100a for controlling and driving the thin film chemical analysis apparatus 100.

Reference numeral 100 refers to the body or substrate of the thin film chemical analysis apparatus, which includes upper, middle, and lower substrates 1, 2, and 3 stacked on one another. Each substrate forms a plurality of channels for enabling a fluid to flow on the substrate surface during an injection molding process, liquid storage chambers for storing buffer solutions, reagent chambers, process chambers, and holes for interconnecting the channels.

These components are fastened and attached to one another to constitute the body of a thin film chemical analysis apparatus 100, as disclosed in Korean Patent Application No. 10-2001-0031284 (May 31, 2001) entitled "A MICRO VALVE APPARATUS USING MICRO BEAD AND METHOD FOR CONTROLLING THE SAME" and PCT Application No. PCT/KR02/01035 (May 31, 2002) entitled "A MICRO VALVE APPARATUS USING MICRO BEAD AND METHOD FOR CONTROLLING THE SAME".

The valve operation of the process chambers 130, 131, 132, 133, 140, 141, 142, and 143 is realized by thin film valves 70a, 70b, 70c, 70d, 70e, 70f, and 70g, the opening/closing of each of which is independently controlled by magnetic force established by permanent magnets 4a, 4b, and 4c and a movable permanent magnet 5a. The valve operation of the liquid storage chambers 150, 151, 152, and 153 is realized by the burst valves labeled 71a, 71b, 71c, and 71d. Those of the process chambers labeled 140, 141, 142, and 143 correspond to reagent chambers.

According to the present invention, there are two methods for preparing a liquid-phase reagent in reagent chambers. According to the first method, a liquid-phase reagent stored in the liquid storage chambers 150, 151, 152, and 153 moves to corresponding reagent chambers by means of the opening operation of the burst valves when the thin film chemical analysis apparatus rotates. According to the second method, a dilution buffer is stored in the liquid storage chambers, and solid-phase granules obtained by highly concentrating a reagent are stored in the reagent chambers. When the burst valves are opened, the dilution buffer moves to the reagent chambers. Then, the solid-phase granules are dissolved in the dilution buffer and turn into a liquid-phase reagent. The second method is preferred because, when a reagent is to be stored in chambers for a long period of time, it can be stored more stably as solid-phase granules.

As used herein, solid-phase granules refer to solid particles obtained by converting a liquid-phase reagent or a liquid-phase label into tablets, balls, grains, or powder, or solid particles obtained by freezing and drying a liquid-phase reagent or a liquid-phase label on a porous pad.

Reference numeral 120 refers to a dispenser for injecting a sample, a pipette, a die, a lancet, or any sample injection means. Reference numeral 121 refers to a sample injection hole. Reference numeral 170 refers to a disk pore.

Reference numerals 130, 131, 132, and 133 refer to process chambers. Particularly, reference numeral 130 refers to a preparation chamber adapted for a preparation process for preparing a DNA sample from blood or cells, or preparing a DNA sample from RNA based on R-T (Reverse Transcription). Reference numeral 131 refers to an amplification chamber for a PCR (Polymer Chain Reaction) process or a DNA amplification process. Reference numeral 132 refers to a chamber for a hybridization process, particularly an assay site having a capture probe attached to the substrate or immobilized by an immobilization means so as to analyze and diagnose DNA amplified in the amplification process. Reference numeral 133 refers to a trash chamber for collecting waste created during the cleaning process.

Reference numerals 150, 151, 152, and 153 refer to liquid storage chambers. According to the first reagent preparation method, the chamber 150 stores a buffer solution including various enzymes necessary for the amplification process (e.g. polymerase, primer), the chambers 151 and 152 store various enzymes necessary for the hybridization process, and the chamber 153 stores a cleaning solution necessary for the cleaning process. According to the second reagent preparation method, the liquid storage chambers 150, 151, 152, and 153 store a dilution buffer.

Reference numeral 211 refers to a slider equipped with the movable permanent magnet 5a and connected to a slide motor 109 for driving control.

The opening/closing control of the thin film valves at the beginning and ending of each of the preparation process, amplification process, hybridization process, and cleaning process is realized by moving the permanent magnet 5a, which is installed on the slider 211, about the hole of the corresponding valve. The fluid movement is based on the centrifugal force resulting from rotation of the disk or the hydrophilic coating of the channels.

Reference numeral 103a refers to an optical pickup device for playing a conventional optical disk (e.g. CD, DVD). Reference numeral 103b refers to an assay site reading device for quantitative or qualitative analysis of the assay site 132, such as an optical transmittance measuring device, an electrochemical, capacitance, or impedance measuring device, a fluorescence detecting device, a noctilucence detecting device, an image sensor device, a bio-pit detecting device, a spectrometer, or an SPR (Surface Plasmon Resonance). The optical pickup device 103a and the assay site reading device 103b constitute a BOPM (Bio Optical Pickup Module) device 103.

The thin film chemical analysis apparatus according to the present invention is characterized in that it has a BOPM device 103 mounted on a slider so as to enable space addressing with regard to the thin film valves and the burst valves, a slide motor 109 for controlling the movement of the BOPM device 109, and a laser beam generating device and a thin film valve opening/closing means (e.g. permanent magnet 5a) mounted on the BOPM device 103 to control the opening/closing of the valves, and that the movement of the coordinate of the BOPM device is controlled based on the slide motor control so as to control the opening/closing of the plurality of thin film valves and the burst valves selectively, separately, or independently. The optical pickup device 103a is preferably used as the laser beam generating device.

The present invention is characterized in that the thin film valve opening/closing means is preferably a permanent magnet 5a mounted on the BOPM device, and that, under the movement control of the slider, the permanent magnet 5a can move in the radial direction, in the radial or azimuthal direction in a two-dimensional coordinate system, or in the radial, azimuthal, or upward/downward direction in a three-dimensional coordinate system.

The radial movement is preferably made under the control of the slide motor. The azimuthal movement is preferably made by rotating the disk by a predetermined amount under short rotation control of the spindle motor or under the control of the step motor while the slider remains stationary. The step motor is preferably connected and fastened to the spindle motor shaft by a gear for the azimuthal direction of the disk.

The upward/downward movement is preferably controlled by the slider or the permanent magnet 5a by means of a gear connection means connected to the motor.

Various embodiments of the assay site reading device are disclosed in Korean Patent Application No. 10-2002-0017558 (Mar. 27, 2002) entitled "BIO-DISK, BIO-DRIVER APPARATUS, AND ASSAY METHOD USING THE SAME" and Korean Patent Application No. 10-2005-0038765 entitled "DIGITAL BIO DISK (DBD), DBD DRIVER APPARATUS, AND ASSAY METHOD USING THE SAME".

Reference numerals 240 and 241 refer to means for contact-type interface between the thin film chemical analysis apparatus 100 and the BOPM 103, and are arranged on the slider 211.

The thin film chemical analysis apparatus according to the present invention is characterized in that the contact-type interfaces preferably provide the thin film chemical analysis apparatus 100 with a control signal or power necessary to read the assay site 132, which is created by a central controller 101.

Reference numerals 240a and 241a refer to connectors regarding the contact-type interface units 240 and 241, which electrically connect the thin film chemical analysis apparatus 100 to the contact-type interface units 240 and 241.

Reference numeral 110b refers to a flexible cable for connecting various control signals to the BOPM 103 on the slider 211 and to the contact-type interface means 240 and 241. The flexible cable 110b is connected to the central controller 101 via a wafer or a harness 110a.

Reference numeral 181 refers to a turntable on which the thin film chemical analysis apparatus 100 is to be loaded. Particularly, the thin film chemical analysis apparatus 100 is front-loaded or top-loaded onto the turntable 181 via the central pore 170 of the disk.

Reference numeral 188 refers to a memory-embedded wireless RF IC or an electronic tag device, which comprises information regarding a protocol for the lab-on-a-chip process, an analysis algorithm, a standard control value for reading, the location of the assay site, and self-diagnosis, as well as bioinformatics. The wireless RF IC 188 may also store personal security information and the ID of the thin film chemical analysis apparatus so that no unauthorized person can use it.

The wireless RF IC 188 is preferably of a smart IC card type. The wireless RF IC 188 provides the central controller 101 with its information via wireless communication, which is used for personal security. Reference numeral 110 refers to a radio wave generator for supplying the wireless RF IC 188 with power. Radio waves from the radio wave generator induce the induction coil embedded in the wireless RF IC 188 according to the Fleming's law so that a sufficient amount of electricity is generated to power the wireless RF IC 188.

The thin film chemical analysis apparatus according to the present invention is characterized in that the wireless RF IC 188 preferably incorporates a temperature measuring function so that it can measure the temperature of the assay site and wirelessly transmit it to the central controller lying outside. If the temperature of the assay site is too high or low, a heating or cooling means may be used to control the temperature in a moderate range. According to the present invention, the assay site preferably maintains a temperature range of 30-37° C. considering the biochemical activity and stability.

The thin film chemical analysis apparatus according to the present invention is characterized in that the wireless RF IC 188 preferably contains information regarding the date and result of pesticide and antibiotic residue tests by the apparatus, expiration date, agricultural production regions, production and cultivation history, circulation history, farmer contacts, prices, organic/non-organic, etc. Purchasers and agricultural circulators can use this information to obtain reliable agricultural products. General consumers can bring the thin film chemical analysis chemical analysis apparatus into contact with an RF IC reader or load it onto a thin film chemical analysis apparatus drive to obtain information regarding it.

The thin film chemical analysis apparatus according to the present invention is characterized in that the wireless RF IC 188 preferably stores the test result of the thin film chemical analysis apparatus in the memory embedded in the wireless IF IC 188.

The thin film chemical analysis apparatus is characterized in that it has optical layers on one of its surfaces, which include a protective layer, a reflective layer, a data layer (pit or pigment layer, or phase-changing substance layer) as in the case of a conventional CD or DVD, so that the apparatus is adapted for playing or recording by a conventional optical pickup device. The data layer contains information regarding the version of the thin film chemical analysis apparatus, manufacturing date, protocols, analysis algorithms, standard control values for reading, the location of assay sites, and self-diagnosis, as well as bioinformatics. The data layer may also store personal security information and the ID of the thin film chemical analysis apparatus so that no unauthorized person can use it. In addition, the data layer may record and store the analysis result of the apparatus and history information so that the hospital can easily manage the data of patients or the history of agricultural products.

The thin film chemical analysis apparatus according to the present invention is characterized in that the wireless RF IC 188 preferably controls the assay site reading device and wirelessly transmits the reading result to the central controller 101, storage device, or input/output device 111 lying outside.

The thin film chemical analysis apparatus according to the present invention is characterized in that the input/output device preferably follows the communication standard of USB (Universal Serial Bus), IEEE1394, ATAPI, SCSI, or Internet communication networks.

The input/output device 111 may be used to input the height, weight, gender, age, etc. of the user of the thin film chemical analysis apparatus 100.

Figure 12:
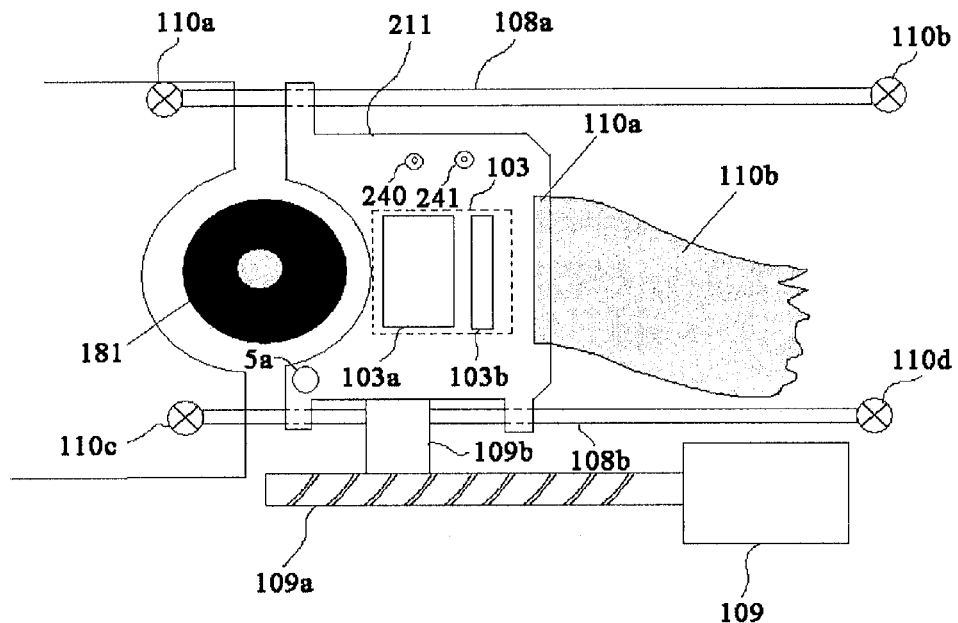
FIG. 12 is a top view of a slider provided with a BOPM, a permanent magnet, and a contact-type interface means according to an embodiment of the present invention.

FIG. 12 is a top view of a slider provided with a BOPM 103, a permanent magnet 5a, and contact-type interface means 240 and 241 according to an embodiment of the present invention.

The slider is movement controlled by worm gear connectors 109a and 109b connected to the shaft of a slide motor 109.

The slider is adapted to slide by using slide arms 108a and 108b as its guides. The slide arms 108a and 108b are connected to the body of a thin film chemical analysis apparatus drive 100a via screws 110a, 110b, 110c, and 110d. Reference numeral 110b refers to a flexible cable, which connects via a wafer or a harness 110a. Reference numeral 181 refers to a turntable rotated by a spindle motor 102.

Figure 13:
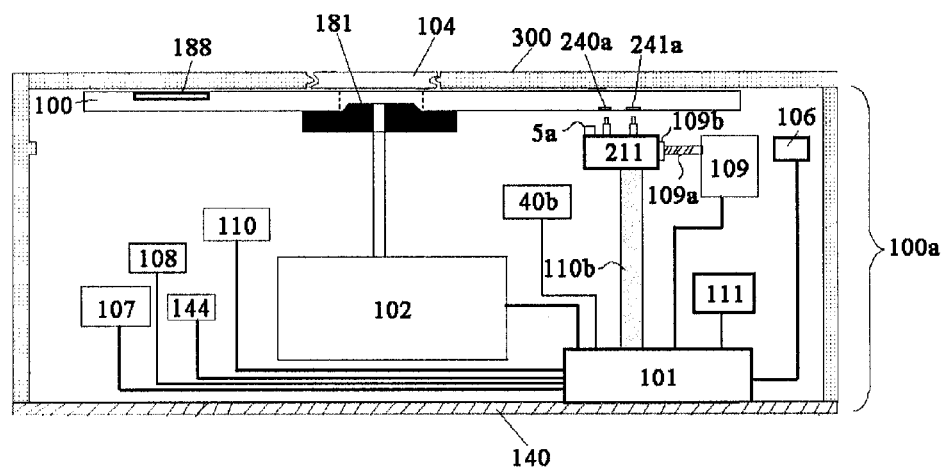
FIG. 13 shows the side view of a thin film chemical analysis apparatus drive for driving and controlling the thin film chemical analysis apparatus shown in FIG. 11 according to an embodiment of the present invention.

FIG. 13 shows the side view of a thin film chemical analysis apparatus drive 100a for driving and controlling the thin film chemical analysis apparatus 100 shown in FIG. 11 according to an embodiment of the present invention.

The contact-type interface means 240 and 241 on the slider 211 connect and supply control signals necessary to read assay sites on the thin film chemical analysis apparatus 100. One end of the contact-type interfaces 240 and 241 is fixedly connected to the slider 211, and the other end is fastened and electrically connected to the connectors 240a and 241a on the thin film chemical analysis apparatus 100 based on the slider 211 movement control.

Reference numeral 300 refers to a body supporting the thin film chemical analysis apparatus drive 100a. The thin film chemical analysis apparatus drive 100a has a circuit board 140 positioned on its lower surface and connected/fastened to the body 300 of the thin film chemical analysis apparatus drive 100a, a central controller 101 positioned on the circuit board 140 to control the thin film chemical analysis apparatus drive 100a, and a storage device or an input/output device 111 arranged and designed on the circuit board 140. The central controller 101 controls the spindle motor 102 so that the thin film chemical analysis apparatus 100 can rotate or stop, controls the movement of the BOPM designed and arranged on the slider 211 based on the slide motor 109 control, and changes the location of the permanent magnet 5a to control the opening/closing of a thin film valve of the thin film chemical analysis apparatus 100. When the thin film valve is opened, the permanent magnet 5a approaches the center of the hole of the corresponding valve very closely so that magnetic force effectively acts on a thin film-type cylindrical magnet embedded in the thin film chemical analysis apparatus 100.

The central controller 101 determines whether the disk currently loaded on the thin film chemical analysis apparatus drive 100a is a conventional optical disk (e.g. music CD, CD-R, game CD, DVD, etc) or a thin film chemical analysis apparatus 100. In the case of a conventional optical disk, the central controller 101 reads the contents of the disk and transmits them from the optical pickup device 103a to the storage device or input/output device 111. In addition, the central controller 101 conducts conventional optical disk-related operations of sending contents to be written to the optical pickup device 103a, providing respective components with various control signals necessary for reading/writing, etc. In the case of the thin film chemical analysis apparatus 100, the central controller 101 sends various control command signals necessary to control the lab-on-a-chip process to the wireless RF IC 188 via a non-contact interface 106.

After receiving the control commands, the wireless RF IC 188 supplies respective components of the thin film chemical analysis apparatus 100 with various control signals necessary to control the lab-on-a-chip process.

The present invention is characterized in that, preferably, the proper ID of the thin film chemical analysis apparatus 100 is wirelessly transmitted to the central controller 101 via the wireless RF IC 188 on the thin film chemical analysis apparatus 100 at the time of loading of the thin film chemical analysis apparatus 100 so that the central controller 101 recognizes that the disk currently loaded on the thin film chemical analysis apparatus drive 100a is a thin film chemical analysis apparatus.

According to the present invention, the result of reading the assay site 132 by the assay site reading device 103b on the BOPM is preferably transmitted to the central controller 101, storage device, or input/output device 111 via the flexible cable 110b connected to the slider 211. Alternatively, the reading result is wirelessly transmitted to the central controller 101, storage device, or input/output device 111 by the wireless RF IC 188 embedded in the thin film chemical analysis apparatus 100. The reading of the assay site may also be conducted by sending image information regarding the assay site obtained by an image sensor device 144, which is designed and arranged on the circuit board 140, to the central controller 101, storage device, or input/output device 111. Reference numeral 104 refers to a means for compressing the thin film chemical analysis apparatus 100 loaded on the disk pore. The compressing means is preferably designed to compress the apparatus by means of the magnetic drawing force with regard to the turntable 181 so that the apparatus can move vertically and rotate idly.

Reference numeral 40b refers to at least one LED (Light Emitting Diode) for illumination of the image sensor device. The image sensor device or the LED may be mounted on the slider 211, or installed above or below the assay site. According to the present invention, a multicolor LED capable of emitting various wavelengths of light is preferably used so that, under illumination in various wavelengths, the reaction intensity regarding the assay site 132 can be expressed in terms of color intensity to provide image information. Based on the two-dimensional correlation between the wavelength and color intensity, the reaction result of the assay site 132 can be subjected to quantitative or qualitative analysis.

The multicolor LED is preferably an R,G,B LED.

Reference numeral 107 refers to a laser generating device, which is used to excite a sample inside an assay site having a fluorescent or noctilucent label, so that image information regarding the assay site can be obtained by the image sensor device 144. The fluorescent label has a small wavelength difference between the excitation wavelength and the emission wavelength from the fluorescent label. This requires an expensive optical filter for removing signal interference between them and, even so, poor interference removal degrades the fluorescence detecting performance. In contrast, the noctilucent label can emit remembered light for a long time even if the excitation of the lager generating device is turned off. This means that the generation of the noctilucent label can be detected even during excitation-off. In this case, the noctilucence detecting device can efficiently detect the assay site with no interference between the excitation and emission wavelengths. Reference numeral 108 refers to a spectrometer, which outputs a plurality of wavelengths of light for measuring the optical transmittance or optical absorbance of the assay site, measures the optical transmittance or optical absorbance for each wavelength, and reads the reaction result of the assay site 132.

The spectrophotometer consists of a light source, a wavelength selector, a sample container (test tube or assay site 132), and a photodetector, as generally known in the art.

The spectrophotometer calibrates the apparatus by using a blank solution to obtain an optical transmittance of 100% (i.e. zero optical absorbance), and measures the optical absorbance of the sample solution.

The light source is supposed to emit a sufficient amount of energy in a wavelength range required for sample analysis. The light source may be a tungsten filament lamp, a hydrogen or deuterium lamp, a white LED, or a laser. According to the present invention, a white LED, an RGB laser, or an LD module having a plurality of LDs (Laser Diodes) integrated therein is preferably used.

The RGB laser has three lasers for outputting red, green, and blue light, which constitute a single module. The output power of the three lasers is properly combined to obtain various wavelengths of light necessary for sample analysis.

The LD module is obtained by modularizing a plurality of LDs having different wavelengths. LDs outputting corresponding wavelengths of light are turned on one after another to measure the optical absorbance of the sample with regard to the corresponding wavelengths.

It is a very important role of the spectrometer to obtain a specific wavelength of light from light emitted by the light source. The ideal is to obtain monochromatic radiation in a strict sense, which is very difficult in practice. Instead, the spectrum bandwidth of light exhibiting a specific range of wavelength distribution is clarified to indicate the degree of monochromatization. The closer to a single wavelength light from the light source is, the higher the measurement sensitivity and resolution become.

A desired wavelength of light can be obtained by the wavelength selector, which consists of a filter, a grating mirror, or a combination of both.

The grating mirror acts as a kind of prism that disperses and reflects incident light for each wavelength.

Figure 14:
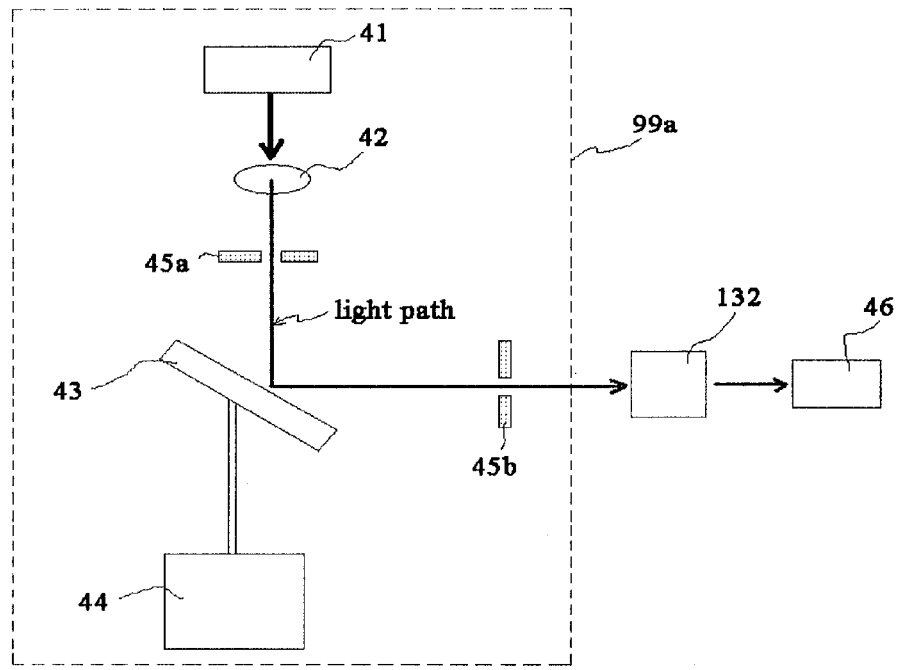
FIG. 14 shows a spectrophotometer using a grating mirror according to an embodiment of the present invention.

FIG. 14 shows a spectrophotometer 108 using a grating mirror according to an embodiment of the present invention.

Referring to FIG. 14, white light from a light source 41 is focused into a beam by a lens 42. The beam then passes through a first H-slit and a V-slit 45a and changes into a spot beam. When the spot beam is incident on a grating mirror 43, light reflected by the grating mirror 43 is split for each wavelength in a phase space. In order to obtain only a specific wavelength of light from the light that has been reflected by the grating mirror 43 and split in the phase space, a second H-slit and a V-slit 45b are fixedly arranged at a predetermined angle. In this case, the wavelength of light passing through the second H-slit and V-slit 45b can be varied by rotating the grating mirror 43. As such, a desired wavelength of light can be obtained by controlling the rotation angle of the grating mirror 43.

The desired wavelength of light obtained in this manner passes through the assay site 132, and is measured by a photodetector 46 to measure the optical absorbance, optical transmittance, or color intensity of the sample inside the assay site. In this manner, the result of chemical reaction of the sample is analyzed qualitatively or quantitatively. The method for quantitative or qualitative analysis of the result of chemical analysis of the sample includes an end point method, a rate assay method, and an initial rate method, as generally known in the art.

Reference numeral 41 refers to the light source of the spectrophotometer 108. The wavelength selector includes a step motor 44 for controlling the rotation angle of the grating mirror 43, a lens 42 for focusing light from the light source, a first H-slit and a V-slit 45a for turning the focused beam into a spot beam, a grating mirror 43 for splitting the spot beam in respective wavelengths, and a second H-slit and a V-slit 45b for passing only a specific angle of beam (i.e. a specific wavelength of light) reflected by the grating mirror. The specific wavelength of light obtained by the light source 41 and the wavelength selector passes through the assay site 132, and the optical absorbance of the sample inside the assay site is measured by the photodetector 46. The result of the chemical reaction of the sample is analyzed quantitatively or qualitatively in this manner. The step motor 44 may be rotated so that various wavelengths of light passes through the assay site in order to measure the optical absorbance of the sample inside the assay site with regard to each wavelength.

According to the present invention, the first or second H-slit and V-slit may be replaced with optical fibers.

According to the present invention, any combination of the light source, the lens, the first H-slit and V-slit or first optical fiber 45a, the grating mirror 43, the second H-slit and V-slit 45b or second optical fiber is referred to as a light source device 99a. Alternatively, the LD module and the RBG laser module alone may constitute the light source device 99a, which is then advantageously light, slim, and simple.

Figure 15:
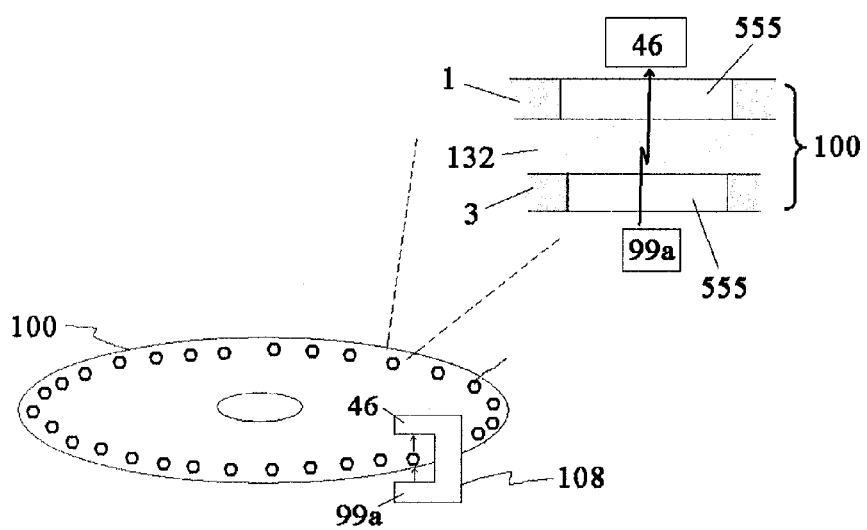
FIGS. 15-17 show methods for reading assay sites on a thin film chemical analysis apparatus by using a spectrophotometer according to embodiments of the present invention.
Figure 16:
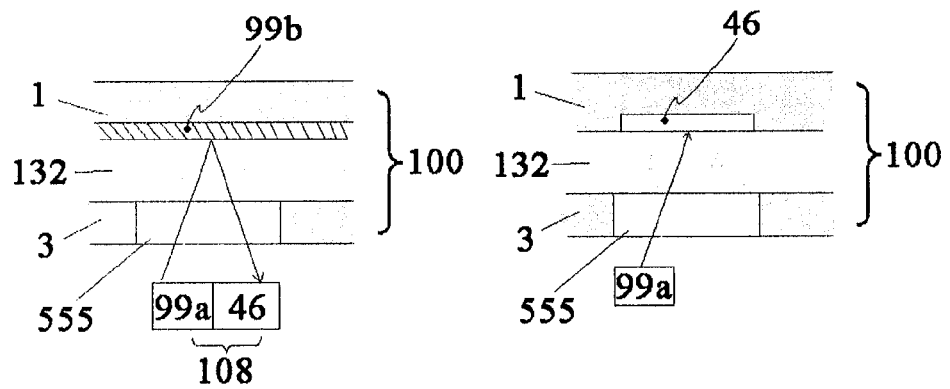
Figure 17:
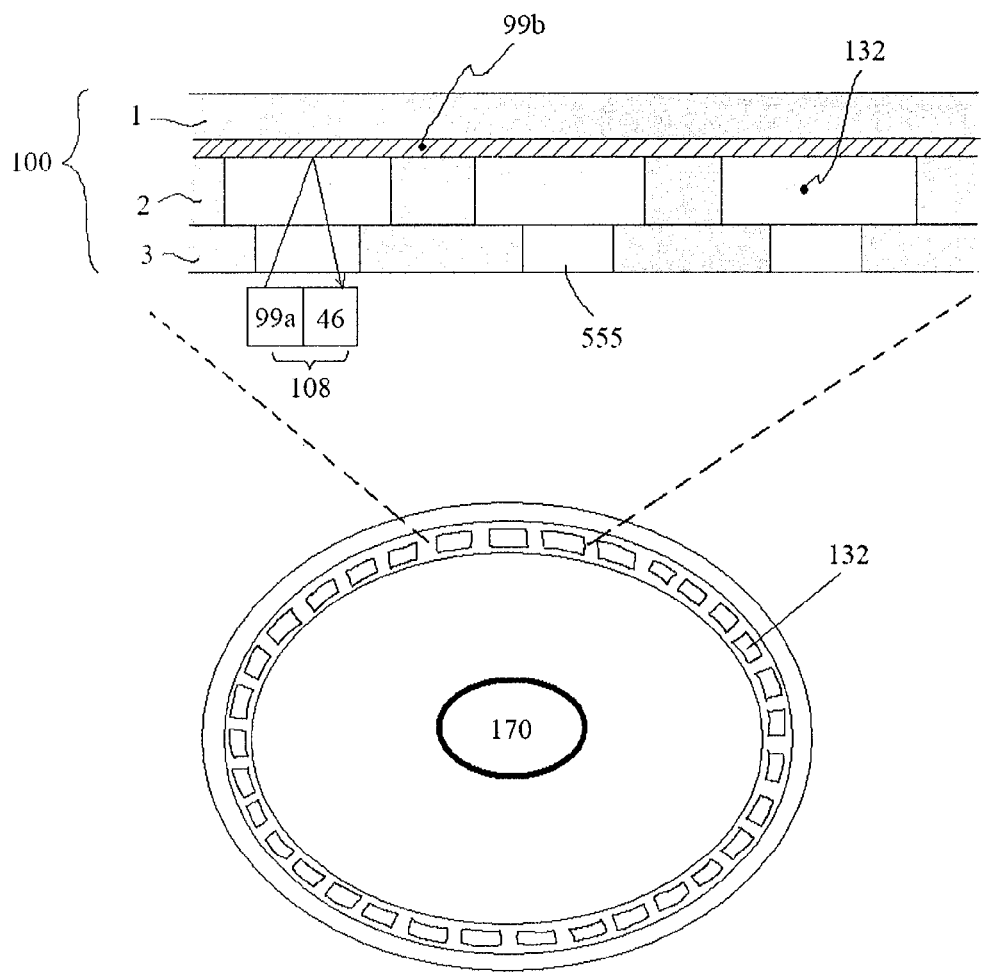

FIGS. 15-17 show methods for reading assay sites 132 on a thin film chemical analysis apparatus 100 by using a spectrophotometer 108 according to embodiments of the present invention. Reference numeral 555 refers to a transparent opening for reading by the photodetector 46.

Referring to FIG. 15, the photodetector 46 of the spectrophotometer 108 is placed above the thin film chemical analysis apparatus 100, and the light source device 99a is installed below the same. The modularized spectrophotometer 108 of the photodetector 46 and the light source device 99a are used to read a plurality of assay sites 132 arranged along the circumference of the thin film chemical analysis apparatus 100. They can match and read each of the assay sites 132 as the thin film chemical analysis apparatus 100 rotates (i.e. space addressing is possible). The spectrophotometer 108 calibrates the apparatus by using a blank solution to obtain a transmittance of 100% (i.e. zero absorbance), and measures the absorbance of the sample solution inside the assay sites.

The present invention is characterized in that at least one of the plurality of assay sites includes a blank solution chamber for calibration.

Referring to the left half of FIG. 16, a reflective layer 99b is integrated into the upper substrate 1 inside the thin film chemical analysis apparatus 100 or into an assay site, and the light source device 99a and the photodetector 46 are modularized into a spectrophotometer 108 and arranged below the thin film chemical analysis apparatus 100. A specific wavelength of light obtained by the light source device 99a passes through the assay site 132, and the photodetector 46 measures light reflected by the reflective layer 99b. In this manner, the optical absorbance of the sample inside the assay site is measured.

Referring to the right half of FIG. 16, the photodetector 46 is integrated into the assay site 132 of the thin film chemical analysis apparatus 100. In this case, the photodetector 46 is arranged to match with each of a plurality of assay sites one by one. Such integration of the photodetector 46 into the thin film chemical analysis apparatus shortens the optical traveling path and improves the receiving sensitivity of the photodetector 46. As a result, the susceptibility is substantially improved. The result of reading by the photodetector 46 integrated into the thin film chemical analysis apparatus is read by the wireless RF IC 188, and is wirelessly transmitted to the central controller 101.

Referring to FIG. 17, the reflective layer 99b shown in the left half of FIG. 16 is integrated into the upper substrate 1, and a plurality of assay sites are arranged along the circumference of the thin film chemical analysis apparatus 100. The spectrophotometer 108 is adapted to match with each of the assay sites and read it (i.e. space addressing). The light source device 99a selects and outputs a wavelength of light corresponding to the characteristics of the sample of each assay site in order to measure the optical absorbance. The present invention is characterized in that the successive reading of the assay sites by the spectrophotometer 108 is preferably preceded by a radial assay site search process and an azimuthal assay site search process by the spectrometer 108 mounted on the slider 211.

The image sensor device preferably consists of a line image sensor adapted to sense the amount of light in terms of CCD, CMOS, or pixel.

According to the present invention, the line image sensor preferably consists of a linear sensor array or a CIS (Contact Image Sensor).

The present invention is characterized in that the BOMP 103 having the image sensor device is adapted to move the slider 211 to obtain image information regarding assay sites. In addition, reading of the assay sites is preceded by a radial assay site search process and an azimuthal assay site search process by the image sensor device mounted on the slider 211.

FIGS. 18-23 show thin film chemical analysis apparatuses adapted for a series of processes regarding a lab-on-a-chip implemented based on an antigen-antibody reaction or a specific biochemical reaction between biomaterials according to embodiments of the present invention.

Figure 24:
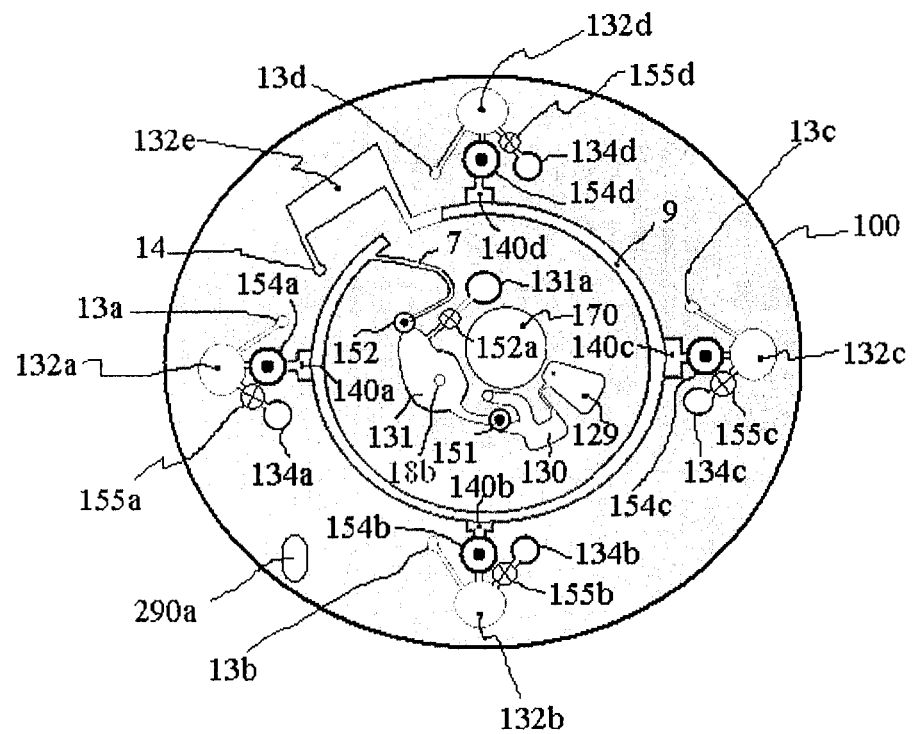
FIGS. 24 and 25 show thin film chemical analysis apparatuses adapted for a series of processes regarding a lab-on-a-chip having assay sites arranged in parallel on different sectors to analyze various types of biochemical reactions regarding a single sample according to embodiments of the preset invention.
Figure 25:
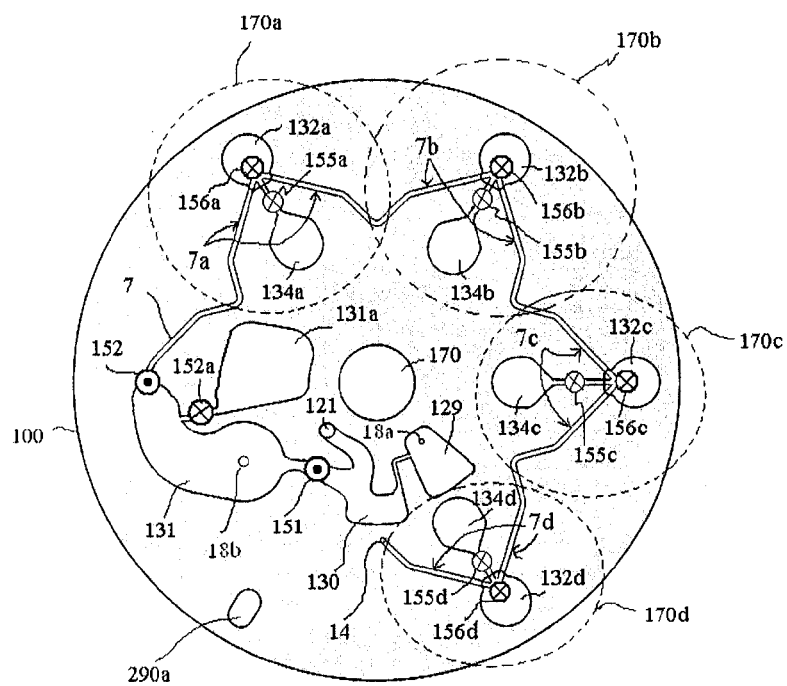

FIGS. 24 and 25 show thin film chemical analysis apparatuses adapted for a series of processes regarding a lab-on-a-chip having assay sites arranged in parallel on different sectors to analyze various types of biochemical reactions regarding a single sample.

Reference numeral 130 refers to a preparation chamber adapted for a preparation process for preparing a sample (serum, plasma, or a sample from which impurities have been removed) from blood or an analyte, which has been injected via an injection hole 121, based on centrifugal separation. Reference numeral 132 refers to a chamber for an antigen-antibody reaction or a specific biochemical reaction between biomaterials, particularly an assay site having a capture probe for analyzing and diagnosing an analyte, the capture probe being fixed to the chamber or being able to be immobilized by an immobilization means. Reference numeral 133 refers to a trash chamber for collecting waste created during the cleaning process. Reference numeral 292 refers to a channel for connecting the assay site 132 to the trash chamber 133. Reference numeral 291 refers to a channel for directing the solution in the buffer chamber 131 to the assay site 132.

Figure 18:
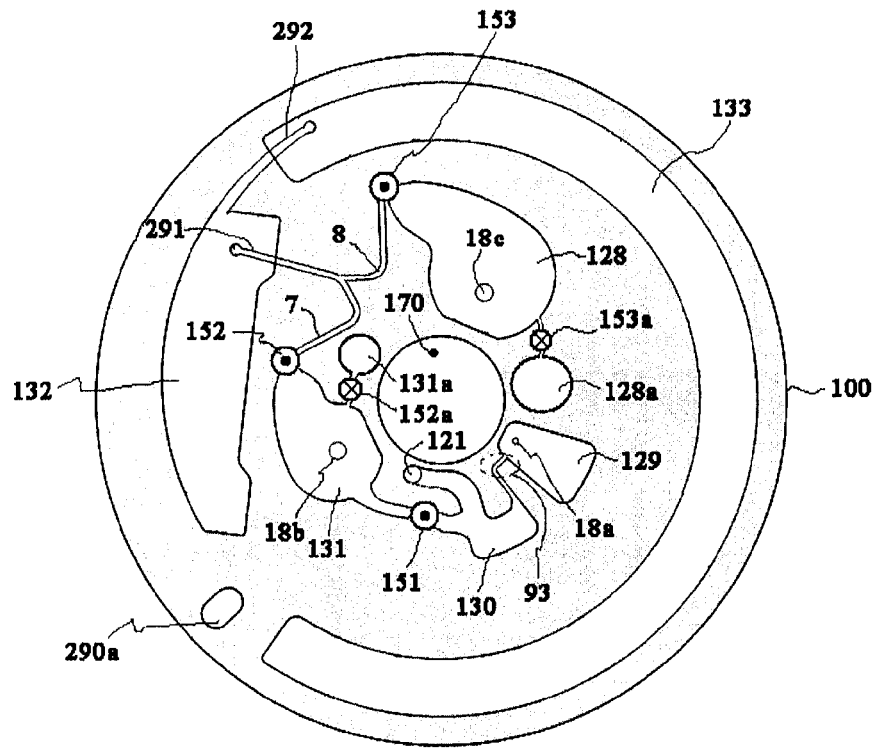
FIGS. 18-23 show thin film chemical analysis apparatuses adapted for a series of processes regarding a lab-on-a-chip implemented based on an antigen-antibody reaction or a specific biochemical reaction between biomaterials according to embodiments of the present invention.
Figure 18:
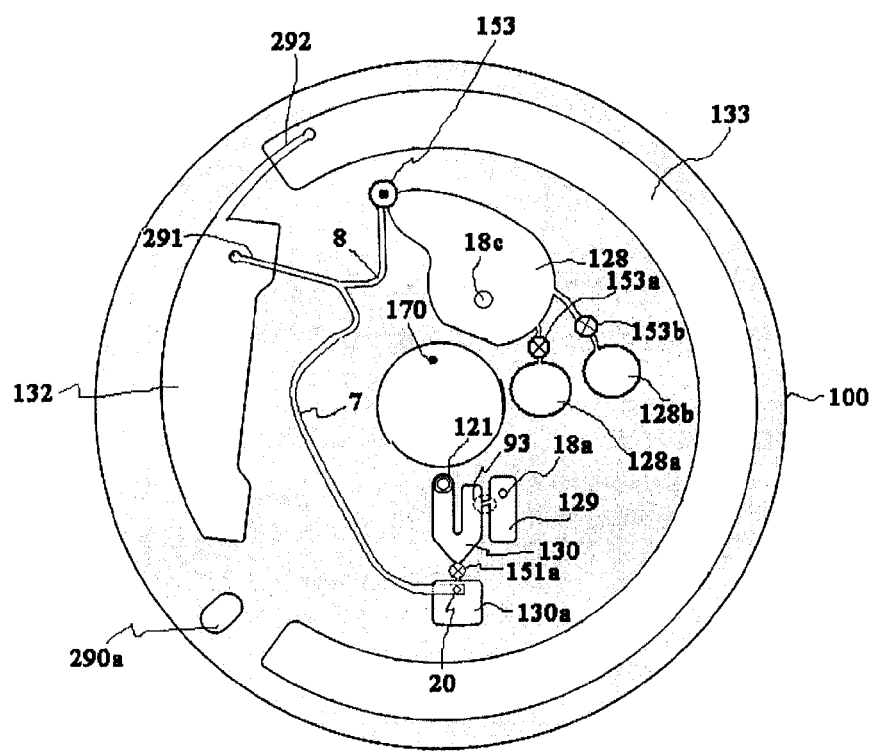
Figure 19:
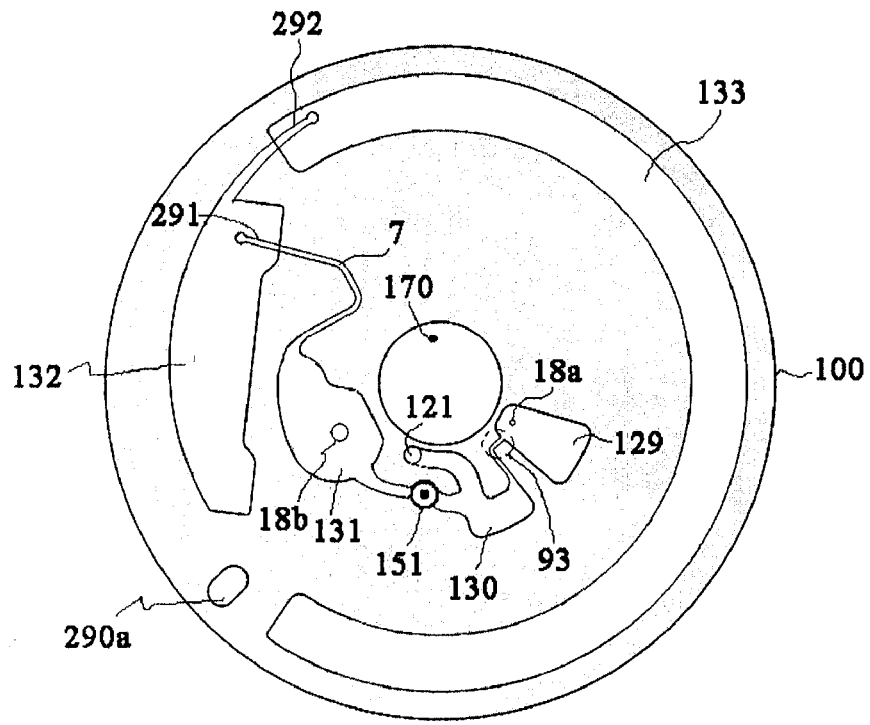
Figure 20:
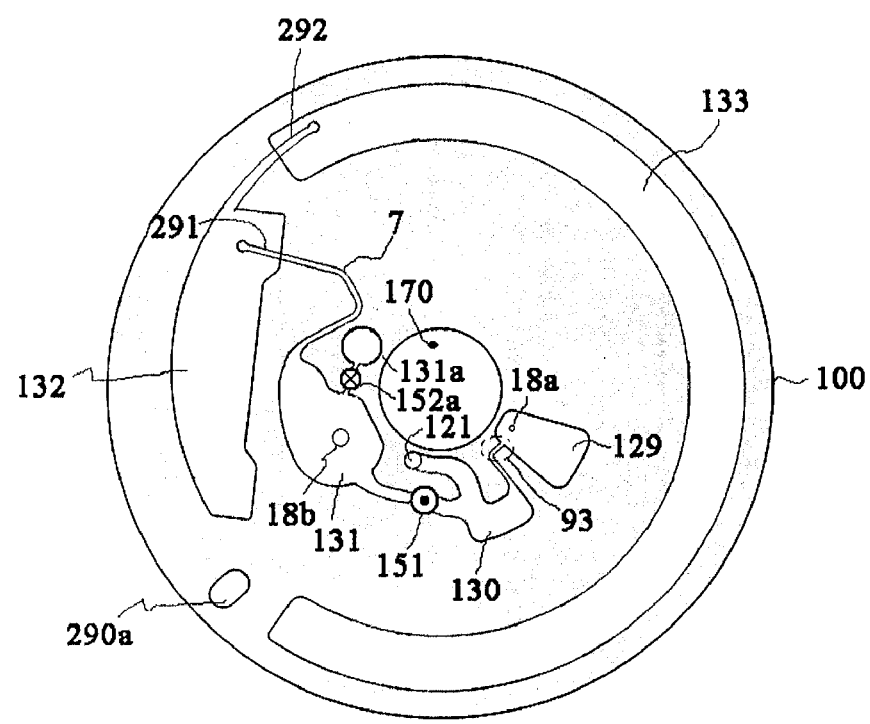

In the case of FIG. 18, channels 7 and 9 are joined to the channel 291 so that, in addition to the solution in the buffer chamber 131, the cleaning solution in the cleaning chamber is directed to the assay site 132.

Figure 26:
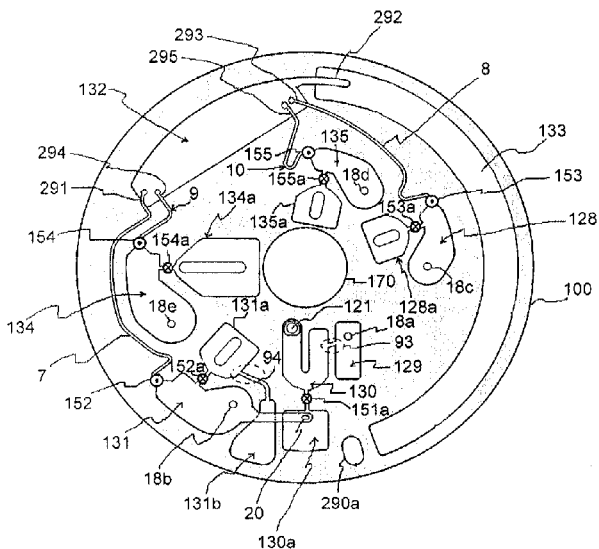
FIG. 26 shows a thin film chemical analysis apparatus adapted for a series of processes regarding a lab-on-a-chip for an ELISA or a CLISA according to another embodiment of the present invention.

In the case of FIG. 26, a channel 293 is used to direct the cleaning solution in the cleaning chamber 128 to the assay site 132.

Figure 23:
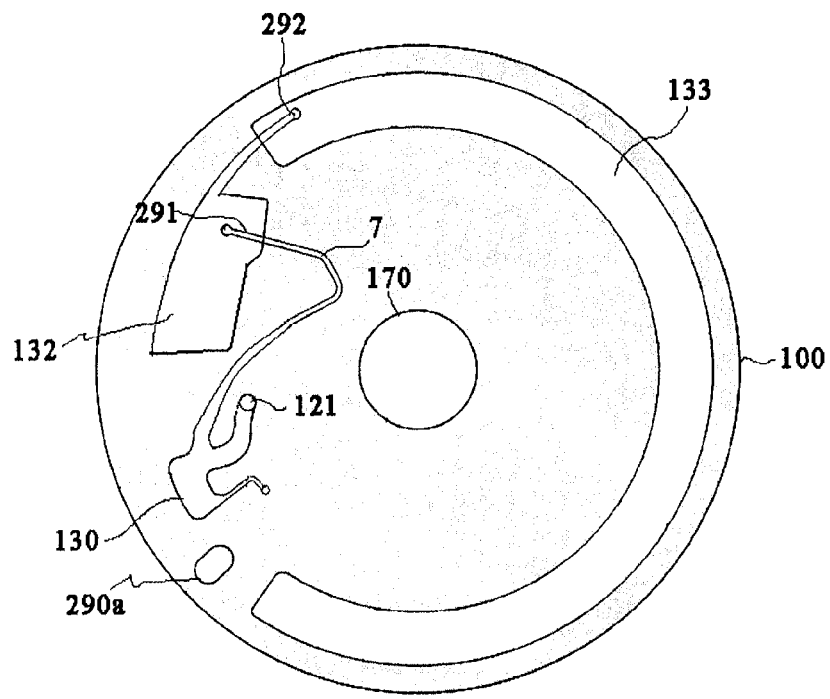
Figure 23:
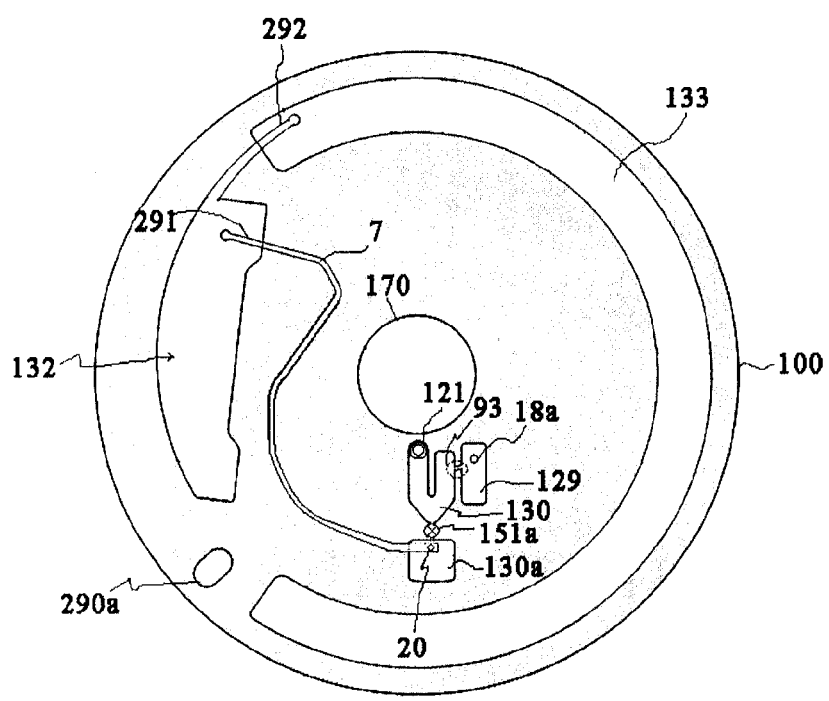

In the case of FIG. 23, the channel 291 directs the analyte, which has been separated in the preparation chamber 130, directly to the assay site 132. Preferably, the assay site 132 is configured in such a manner that (i) a capture probe is fixed in an empty space between interdigitated electrodes constituting a surface coating on a porous membrane, (ii) a capture probe is fixed on a porous membrane, (iii) a capture probe is fixed to a micropore formed on the substrate surface of the assay site 132, or (iv) a capture probe is fixed to the substrate of the assay site by a fixing means at a desired time. The porous membrane preferably consists of NC (NitroCellulose), nylon, or an aligned nanotube. The micropore is preferably a groove (or pit) formed on the substrate by embossing or stamping. The pore size of the porous membrane, the pore size of the micropore, or the size of the groove (pit) is a main parameter of the rate of fluid diffusion caused by the capillary tube.

The larger the pore size is, the faster the diffusion becomes. According to the present invention, the micropore or groove (pit) is preferably coated with a hydrophilic material.

After flowing into the channel 291, the solution is diffused and moved by the porous membrane, micropore, or diffusing means, and undergoes biochemical specific binding with the capture probe. In the case of FIG. 18 or 26, the cleaning solution flows from the chamber 128 to the channel 291 or 293, and is diffused and moved by the porous membrane, micropore, or diffusing means. The cleaning solution then cleans an analyte having non-specific binding with the capture probe on the assay site 132, or an analyte having no binding.

The preset invention is characterized in that the porous membrane, micropore, or diff-using means preferably allows diffusion based on a later flow or flow-through.

The chambers 130, 132, and 133 for the major processes (preparation process, antigen-antibody reaction or biochemical reaction process, cleaning process) are helically connected and arranged on the thin film chemical analysis apparatus. This facilitates movement and connection of fluids necessary for respective processes by means of centrifugal force. Chambers containing reagents for supporting the major processes are also helically arranged nearby.

In addition to the above-mentioned chambers, chambers for other necessary processes (e.g. DNA amplification) may be added and inserted.

Preferably, the preparation chamber 130 or auxiliary preparation chamber 130a has a conical beaker shape, a flask shape, or a kettle shape, which is wider near the outer circumference as shown in FIGS. 18-25, in order to facilitate centrifugal sample separation.

As used herein, serum also has the meaning of plasma.

When the thin film chemical analysis apparatus 100 rotates at a high speed, the resulting centrifugal force separates serum from blood. Particularly, the blood is separated into serum and thrombus in the preparation chamber 130. When the preparation chamber 130 has the above-mentioned shape (i.e. wider near the outer circumference), the serum fills the preparation chamber 130 as high as possible. This is advantageous in that, if the thin film valve 151 or the burst valve 151a is opened while the thin film chemical analysis apparatus is rotating, the centrifugal force easily moves the serum alone to the buffer chamber 131. This would be very difficult unless the serum rises as high as possible. If the centrifugal force fails to move the serum to the buffer chamber 131 while the thin film chemical analysis apparatus is rotating as mentioned above, the viscosity of the serum itself makes the movement difficult. Even when centrifugally separated, the serum is likely to diffuse and mix with the thrombus again. In summary, the separated serum must move to the buffer chamber 131 during rotation.

Figure 27:
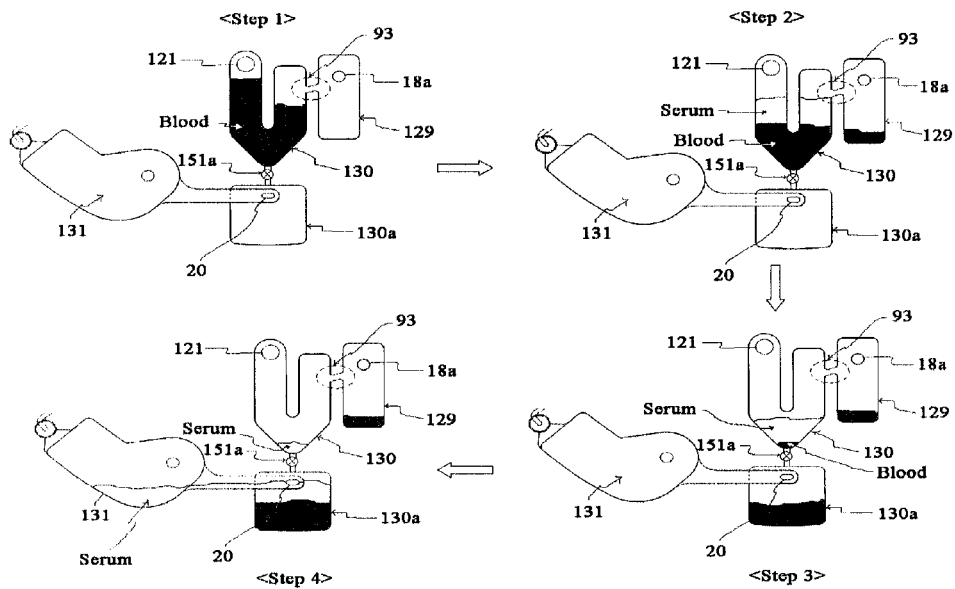
FIG. 27 shows a preparation chamber using a burst valve according to an embodiment of the present invention.

FIG. 27 shows a preparation chamber 130 using a burst valve according to an embodiment of the present invention. Referring to FIG. 27, a sample is separated from an analyte by a wedge-shaped preparation chamber 130 and a burst valve 151a, and is moved to a buffer chamber 131 according to an embodiment of the present invention. When the disk rotates, the hydraulic pressure occurring in the analyte is increased by the wedge-shaped portion of the preparation chamber 130. In accordance with, the hydraulic pressure is efficiently concentrated in the burst valve 151a.

It will be assumed in the following description that the analyte is blood. While the burst valve 151a remains closed initially, blood is injected into the preparation chamber 130 via the injection hole 121 (step 1). The disk is rotated at a speed high enough for centrifugal separation so that the resulting centrifugal force separates the blood into serum and thrombus (step 2). The burst valve 151a remains closed during the centrifugal separation. After the centrifugal separation is over, the disk is rotated at a speed high enough to open the burst valve 151a. Via the opened burst valve 151a, the centrifugal force moves the thrombus from the outer periphery of the preparation chamber 130 (outer periphery of the thin film chemical analysis apparatus 100 in the circumferential direction) to the auxiliary preparation chamber 130a, the level of which rises (step 3). Then, the serum lying inside the preparation chamber 130 (in the circumferential direction) moves to the auxiliary preparation chamber 130a, the level of which rises until it reaches the preparation hole 20. Then, the serum moves to the buffer chamber 131 via the preparation hole 20 (step 4).

Another embodiment will be described with reference to FIG. 27 on an assumption that the analyte is milk, urine, or biomaterial. While the burst valve 151a remains closed initially, the analyte is injected into the preparation chamber 130 via the injection hole 121 (step 1). The disk is rotated at a speed high enough for centrifugal separation so that the resulting centrifugal force separates the analyte into a sample and remnants (step 2). After the centrifugal separation is over, the disk is rotated at a speed high enough to open the burst valve 151a. Via the opened burst valve 151a, the centrifugal force moves the remnants from the outer periphery of the preparation chamber 130 (in the circumferential direction) to the auxiliary preparation chamber 130a, the level of which rises (step 3). Then, the sample lying inside the preparation chamber 130 (in the circumferential direction) moves to the auxiliary preparation chamber 130a, the level of which rises until it reaches the preparation hole 20. Then, the sample moves to the buffer chamber 131 via the preparation hole 20 (step 4).

The wedge-shaped preparation chamber 130 shown in FIGS. 18, 21, 22, 26, and 27 is advantageous in that, when the disk rotates, the hydraulic pressure occurring in the analyte stored in the preparation chamber 130 is efficiently concentrated in the burst valve 151a so that the hole-closing membrane of the burst valve 151a is easily torn off by the hydraulic pressure. This is particularly advantageous to a situation in which only a small mount of analyte can be stored in the preparation chamber and, in spite of strong centrifugal force, the hydraulic pressure is insufficient to open the burst valve.

According to the present invention, the rotation speed of the wedge-shaped preparation chamber 130 for centrifugal separation is preferably 3,000-5,000 rpm, and the rotation speed for opening the burst valve 151a is preferably 8,000-10,000 rpm. This means that, since the rotation speed of the preparation chamber for centrifugal separation is lower than that for opening the burst valve 151a, the burst valve 151a remains closed during centrifugal separation.

When the thin film chemical analysis apparatus 100 rotates at a high speed, the resulting centrifugal force extracts serum or a sample from blood. Particularly, blood is separated into serum and thrombus in the preparation chamber 130 by centrifugal separation. When the preparation chamber 130 has the above-mentioned shape (i.e. wider near the outer circumference), such as a conical beaker shape or a flask shape, the serum fills the preparation chamber 130 as high as possible. This is advantageous in that, if the thin film valve 151 or the burst valve 151a is opened while the thin film chemical analysis apparatus is rotating, the centrifugal force easily moves the serum alone to the buffer chamber 131. This would be very difficult unless the preparation chamber 130 has the above-mentioned shape and unless the serum rises as high as possible. If the centrifugal force fails to move the serum to the buffer chamber 131 while the thin film chemical analysis apparatus is rotating as mentioned above, the viscosity of the serum itself makes the movement difficult. Even when centrifugally separated, the serum is likely to diffuse and mix with the thrombus again.

Reference numeral 128 refers to a chamber containing a cleaning solution or an elution buffer.

The fluid movement on the thin film chemical analysis apparatus 100 is based on (i) centrifugal force caused by rotation of the thin film chemical analysis apparatus and the resulting valve opening/closing, (ii) movement of a hydrophilic fluid caused by hydrophilic surface treatment of the channels and the resulting valve opening/closing operation, (iii) movement of a hydrophilic fluid accompanied by repeated fast opening/closing of the valves, or (iv) centrifugal force acting on the fluid and the repeated valve opening/closing operation during rotation of the thin film chemical analysis apparatus. Since the channels are narrow, the capillary phenomenon occurs in the fluid.

According to the present invention, the fluid movement on the thin film chemical analysis apparatus 100 is preferably based on centrifugal force occurring in the fluid during rotation of the thin film chemical analysis apparatus and based on the valve operation of opening the hole every time the permanent magnet 5a installed on the slider 211 matches with the hole during rotation of the thin film chemical analysis apparatus. Such a valve operation will hereinafter be referred to as a "pulse valve" operation.

An embodiment of the "pulse valve" operation will now be described in detail with reference to FIG. 18.

Assuming that the distance from the center of the circle to the thin film valve 151 is R1, the distance to the thin film valve 152 is R2, the distance to the thin film valve 153 is R3, and the distance to the outermost circumference of the thin film chemical analysis apparatus 100 is R4, there occurs a relationship of R1<R2<R3<R4.

In order to open the thin film valve 151 by the pulse valve operation, the permanent magnet 5a on the slider 211 is moved as much as the distance R1, and the thin film chemical analysis apparatus 100 is rotated. During the rotation, the thin film-type cylindrical magnet positioned at the center of the hole of the thin film valve 151 faces the permanent magnet 5a. Every time the magnets face each other, drawing force occurs between them and opens the thin film valve 151 instantaneously. Since the thin film chemical analysis apparatus 100 is rotating, the fluid is moved by the centrifugal force every time the thin film valve 151 is opened.

In order to close the thin film valves, the permanent magnet 5a on the slider 211 is moved to a region corresponding to the distance R4.

The permanent magnet 5a at the distance R4 has no influence on the thin film valves 151, 152, and 153. However, the drawing force between the permanent magnets 4a, 4b, and 4c lying above the hole of the thin film valves and the thin film-type cylindrical magnets 7a, 7b, and 7c closes the hole.

The present invention is characterized in that the fluid movement on the thin film chemical analysis apparatus 100 is preferably based on movement of a hydrophilic fluid resulting from hydrophilic surface treatment of the channels, based on movement of a hydrophilic fluid combined with pumping force acting on the fluid due to upward/downward movement of the thin film-type cylindrical magnets when they repeatedly move toward and away from the center of the hole of the permanent magnet 5a on the slider 211, or based on pumping force acting on the fluid due to upward/downward movement of the thin film-type cylindrical magnets at a high speed.

The fluid movement caused by the pumping force will hereinafter be referred to as a pumping fluid movement.

The present invention is characterized in that the hydrophilic fluid movement and the pumping fluid movement are preceded by a radial valve search process and an azimuthal valve search process, which will now be described.

(1) The radial valve search process refers to a process of moving the permanent magnet 5a in the radial direction. Particularly, the permanent magnet 5a on the slider 211 is moved to a location corresponding to each radius about the hole center (R1, R2, or R3). (2) The azimuthal valve search process must follow so that the location of the permanent magnet 5a coincides with that of the hole at the corresponding radius.

This is realized by operating the spindle motor 102 at a low speed while the slider 211 remains stationary. Alternatively, the spindle motor repeatedly rotates and stops for a short period of time. Once the permanent magnet 5a on the slider 211 matches with the thin film-type cylindrical magnet 7a, 7b, or 7c lying at the corresponding radius in either manner, the thin film chemical analysis apparatus can no longer rotate in the same manner as it had been rotating, and the permanent magnet 5a and the hole center are aligned with each other.

More particularly, the fluid movement proceeds in the following manner: during the radial valve search process and the azimuthal valve search process, the permanent magnet 5a matches with the hole center of the corresponding thin film valve, which is then opened. The following hydrophilic fluid movement results in the fluid movement. Alternatively, the slider 211, which is adapted for the pumping fluid movement, is vibrated in the forward/backward or leftward/rightward direction about the hole. The thin film-type cylindrical magnets 7a, 7b, and 7c rapidly move up and down, and pumping force acts on the fluid accordingly. The pumping force is combined with hydrophilic surface treatment of the channels to move the fluid.

The present invention is characterized in that the azimuthal valve search process is realized by controlling the rotation of the step motor, which is mechanically connected to the shaft of the spindle motor 102, when the azimuthal valve search is necessary. In other words, the rotation angle of the spindle motor 102 is controlled based on the rotation of the step motor.

Reference numerals 7, 8, 9, and 10 refer to liquid valves for preventing the liquid from leaking out during high-speed rotation of the thin film chemical analysis apparatus.

According to the present invention, the liquid valves are preferably V-or U-shaped channels 7, 8, 9, and 10 coated with a hydrophilic material.

Reference numeral 131 refers to a buffer chamber for temporarily storing a sample obtained in the preparation chamber 130, storing a dilution buffer for diluting the sample obtained in the preparation chamber 130, or storing a label to be attached to the sample. The label generally consists of chromogenic particles having antibodies or DNA bound thereto, such as gold, gold conjugate, latex, fluorescent material, noctilucent material, radioisotope, enzyme, or enzyme-linked antibodies. The enzyme reacts with a substrate and exhibits a color.

The present invention is characterized in that a substrate chamber for storing a substrate is preferably provided, the substrate reacting with the enzyme and exhibiting a color. According to the present invention, the sample is preferably a biomaterial undergoing a specific biochemical binding reaction, such as serum, DNA, protein, ligand, or receptor.

Reference numerals 18b, 18c, 18d, and 18e refer to reagent injection holes for injecting reagents into corresponding chambers in advance, or discharge holes.

Reference numeral 290a refers to a reference hole for aligning the thin film chemical analysis apparatus when the disk is manufactured and assembled. The reference hole 290a is inserted into a fixture installed on a jig.

According to the present invention, the label of the buffer chamber 131 preferably consists of solid-phase granules, rather than being in a liquid phase. The granules are dissolved in the dilution buffer stored in the dilution buffer chamber 131a, and turn into a liquid phase.

As used herein, the solid-phase granules refer to particles which are selected from the form of tablets, balls, grains, powder, or freeze-dried on a porous pad.

The thin film chemical analysis apparatus according to the present invention is characterized in that small magnetic balls are preferably contained in the buffer chamber 131 to facilitate the mixing of liquid substances inside the chamber (antigen and dilution buffer, antigen and label, or solid-phase granules and dilution buffer), and that the permanent magnet 5a on the slider 211 exerts drawing force on the small magnetic balls, vibrates them according to the rapid movement of the slider 211, and induces liquid mixing.

Instead of the permanent magnet 5a, the small magnetic balls inside the chamber may be moved together based on the on/off control of an electromagnet or based on the change of direction of the magnetic field so that liquid mixing is induced.

The thin film chemical analysis apparatus according to the present invention is characterized in that the buffer chamber 131 preferably has small magnetic balls inserted (stored) therein and adapted to move as the thin film chemical analysis apparatus repeatedly rotates in the forward/backward direction (by means of the drawing force from the permanent magnet 5a on the slider 211), while the permanent magnet remains at a corresponding radius of the buffer chamber 131 so that the mixing operation is induced.

The present invention is characterized in that the mixing operation is preceded by a radial chamber search process or by both a radial chamber search process and an azimuthal chamber search process with regard to the chamber due for the mixing operation.

The thin film chemical analysis apparatus according to the present invention is characterized in that the preparation chamber 130 preferably has an excess chamber 129 for storing an excess of blood or analyte, when the amount of blood or analyte injected therein exceeds a predetermined threshold, so that no more than a predetermined amount of blood or analyte is stored in the preparation chamber 130. Reference numeral 18a refers to a discharge hole of the excess chamber 129.

The excess of analyte injected into the preparation chamber 130 is moved to the excess chamber 129 so that the preparation chamber 130 always stores no more than a predetermined amount of sample.

The thin film chemical analysis apparatus according to the present invention is characterized in that, when the amount of analyte (or blood) exceeds a predetermined threshold, the excess is preferably moved to the excess chamber 129 via a quantitative channel 93 by means of centrifugal force occurring when the thin Film chemical analysis apparatus rotates. The height adjustment by the quantitative channel 93 (corresponding to the distance in the radial direction) determines the amount of sample (analyte) remaining in the preparation chamber 130. If the analyte in the preparation chamber exceeds the height of the quantitative channel 93, the excess is moved to the excess chamber 129 via the quantitative channel 93 by centrifugal force during rotation.

Reference numerals 151, 152, and 153 refer to thin film valves, and reference numerals 151a, 152a, and 153a refer to burst valves.

According to the present invention, the thin film valve 151 shown in FIGS. 18-20, 24, and 25 is preferably adapted to move the sample in the preparation chamber 130 to the buffer chamber 131 by a pulse valve operation.

In the case of FIGS. 19-22, an optional thin film valve 152 may be installed at the outlet of the buffer chamber 131 as shown in FIG. 18. In this case, the thin film valve 152 preferably moves the fluid in the buffer chamber 131 to the assay site 132 via the channels 7 and 291 by means of a hydrophilic fluid movement or a pumping fluid movement.

In the case of FIGS. 19-23, an optional thin film valve 153 and a cleaning chamber 128 may be installed together with the channel 8 as shown in FIG. 18. Characteristically, the channels 8 and 291 enable the solution in the cleaning chamber 128 to move to the assay site 132 based on the hydrophilic fluid movement or pumping fluid movement by the thin film valve 153.

The present invention is characterized in that the channel 7 shown in FIGS. 19-23 allows the fluid, which has been held in the buffer chamber 131 (preparation chamber 130 or auxiliary preparation chamber 130a in the case of FIG. 23) by the liquid valve function of the channel 7 itself during rotation of the thin film chemical analysis apparatus 100, to move to the assay site 132 based on the hydrophilic fluid movement as soon as the rotation stops.

In FIGS. 18, 20, 21 and 26, reference numerals 128a and 131a refer to liquid storage chambers for storing a cleaning solution and a dilution buffer, which move to the cleaning chamber 128 and the buffer chamber 131 when the centrifugal force opens the burst valves 152a and 153a, respectively. In this case, the buffer chamber 131 may store a label consisting of solid-phase granules, which are dissolved in the dilution buffer and turn into a liquid phase.

Figure 21:
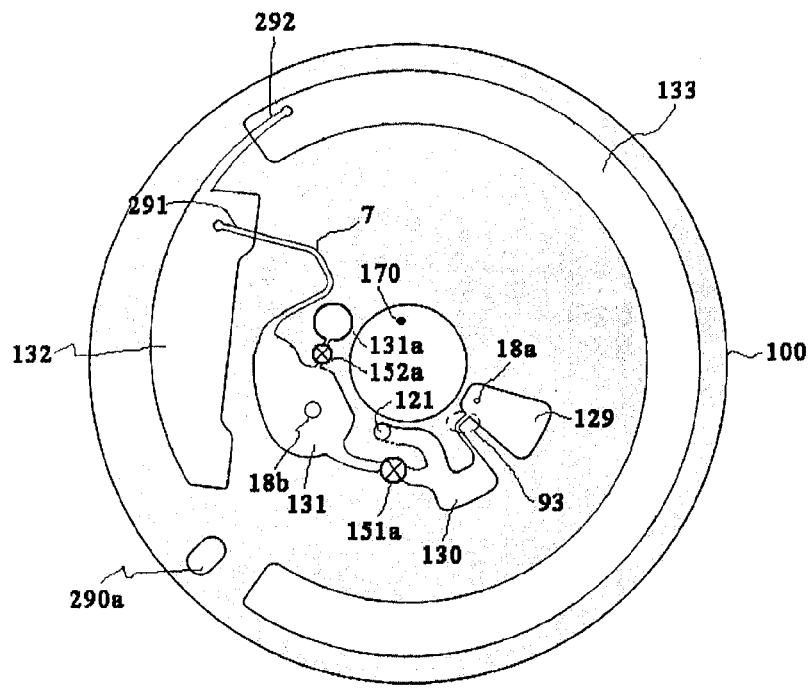
Figure 21:
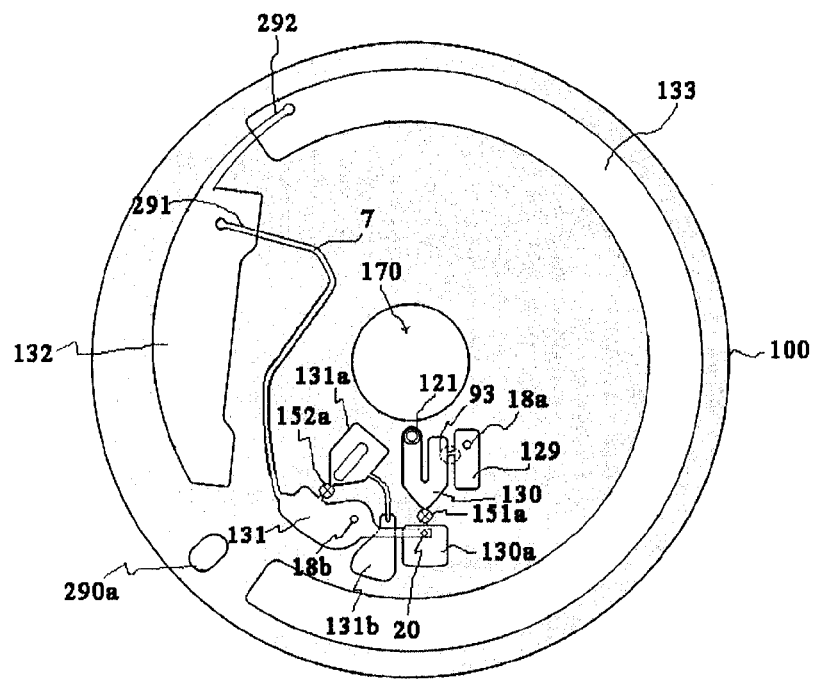
Figure 22:
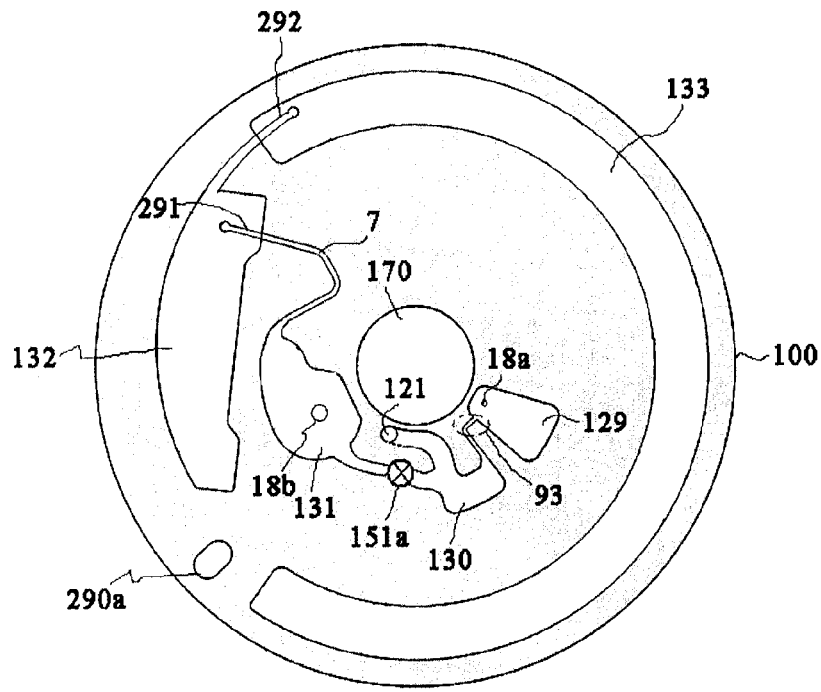
Figure 22:
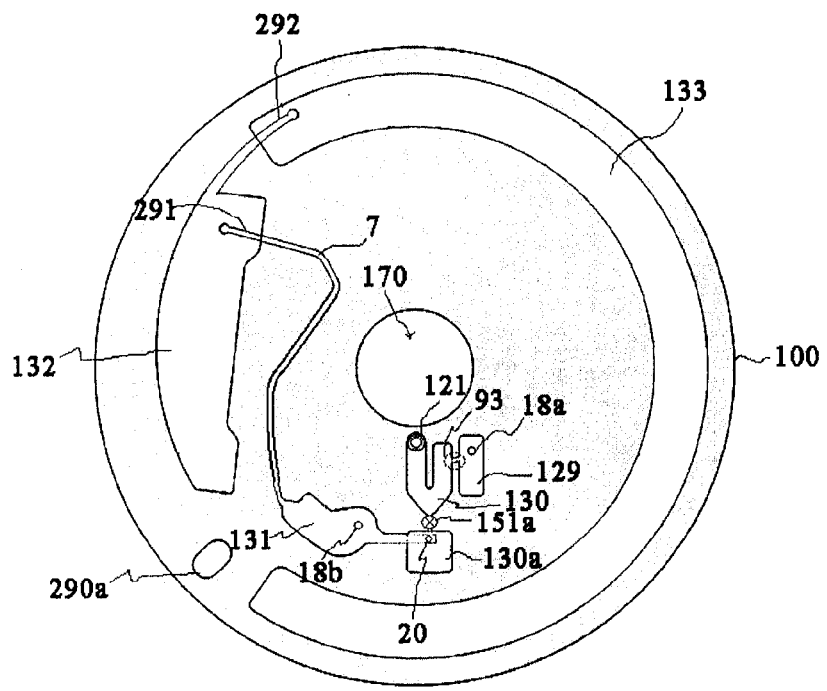

FIGS. 21, 22, and 26 show a burst valve 151a replacing the thin film valve 151 at the outlet of the preparation chamber 130 according to an embodiment of the present invention. The burst valve 151a remains closed while the sample is centrifugally separated, and is opened when a speed high enough to open it (i.e. speed equal to or higher than the centrifugal separation speed) is reached. Then, the sample that has been separated from the analyte moves to the buffer chamber 131.

FIG. 23 shows an embodiment of the present invention, according to which the buffer chamber 131, thin film valve, and burst valve are not used. The sample is held by the liquid valve function of the channel 7 during the centrifugal separation process, and is moved from the preparation chamber 130 or the auxiliary preparation chamber 130a to the assay site 132 by the hydrophilic fluid movement when the rotation stops. In the case of the embodiment shown in the upper half of FIG. 23, an optional thin film valve 151 may be further installed at the outlet of the preparation chamber 130.

Furthermore, in the case of the embodiment shown in the upper half of FIG. 23, an optional excess chamber 129 may be further installed as in the case of FIG. 18.

More detailed descriptions will follow with reference to FIG. 23.

(1) Before the thin film chemical analysis apparatus 100 is used, the user injects sampled blood (or analyte) into the preparation chamber 130 via the sample injection hole 121. The analyte is then stored in the preparation chamber 130.

(2) The thin film chemical analysis apparatus is loaded onto the thin film chemical analysis apparatus drive, and is rotated at a high speed. The resulting centrifugal force separates the blood in the preparation chamber 130 into serum and thrombus, or separates samples from the analyte. In the case of the lower half of FIG. 23, high-speed rotation following the centrifugal separation opens the burst valve 151a and moves the separated samples to the auxiliary preparation chamber 130a. During the centrifugal separation or high-speed rotation, the liquid valve function forming in the channel 7 itself holds the sample in the preparation chamber 130 or the auxiliary preparation chamber 130a without moving it to the assay site 132.

(3) The thin film chemical analysis apparatus then stops rotating, so that the sample moves to the assay site 132 via the channels 7 and 291 based on the hydrophilic fluid movement or pumping fluid movement, or by opening the thin film valve. Incubation proceeds for a predetermined period of time so that an antigen-antibody reaction or a biochemical binding reaction occurs.

(4) The thin film chemical analysis apparatus is rotated at a high speed to dehydrate and clean the assay site 132 by the centrifugal force.

(5) The result of reaction of the assay site 132 is read by the optical measuring device, electrochemical measuring device, impedance measuring device, image sensor device, bio-pit detecting device, fluorescence detecting device, noctilucence detecting device, radioactivity detector, spectrophotometer, SPR detector, or eyes.

(6) Optionally, the reading result is followed by a diagnosis and prescription result, which is displayed on the computer monitor. Remote access is made to the corresponding doctor via Internet automatically or manually. If the result of diagnosis requires data and a medical interview table, they are remote-transmitted to the doctor. The patient then waits for a prescription.

FIG. 18 shows, in its lower half, a thin film chemical analysis apparatus using a small amount of analyte according to an embodiment of the present invention. Reference numerals 128a and 128b refer to liquid storage chambers. Particularly, the cleaning chamber 128a stores a cleaning solution, which moves to the chamber 128 when the burst valve 153a is opened. The virtual sample chamber 128b stores a virtual sample, which moves to the chamber 128 when the burst valve 153b is opened.

Considering that extracting a large amount of analyte from a patient is a big burden on him/her, it is very advantageous to operate the thin film chemical analysis apparatus with only a small amount of analyte.

Referring to the lower half of FIG. 18, a wedge-shaped preparation chamber 130 is used to separate a sample from a small amount of analyte. The amount of the sample is far smaller than that of the analyte, from which it has been separated. The separated sample moves to the assay site 132 via the channel 7.

Assuming that the assay site 132 consists of a membrane selected from an NC (Nitrocellulose) membrane, a nylon membrane, and a porous membrane and that the membrane has a sample pad and a conjugate pad on one end and an absorbent pad on the other end, the amount of sample is thought to be insufficient to diffuse and move through the membrane and trigger a reaction with the marker or capture probe on the membrane. The amount may even be insufficient to wet the sample pad.

This means that if the sample is not additionally supplied after wetting the sample pad, no more diffusion occurs. Since the sample cannot be additionally supplied, a virtual sample is supplied via the channel 291. To this end, the burst valve 153b is opened so that the virtual sample moves from the virtual sample chamber 128b to the chamber 128. Then, the thin film valve 153 is opened to supply the virtual sample to the assay site. This guarantees that the sample diffuses without interruption.

After the diffusion on the membrane is over, the thin film disk is rotated at a high speed, dehydrated, and dried. The burst valve 153a is then opened to move the cleaning solution to the chamber 128, and the thin film valve 153 is opened to supply the cleaning solution to the dried membrane on the assay site 132. The resulting diffusion movement cleans the assay site.

After the diffusion is over, the thin film disk is rotated at a high speed to dehydrate and dry it.

The diffusion rate of the virtual sample must be lower than that of the sample. If not, the reaction of the capture probe immobilized on the membrane is hindered by the virtual sample.

The present invention is characterized in that the viscosity of the virtual sample is preferably higher than that of the sample.

According to the present invention, the virtual sample is preferably a cleaning solution having glycerol added thereto. In the case of the embodiment shown in the lower half of FIG. 18, the membrane preferably includes no sample pad so that a smaller amount of sample can trigger the reaction.

FIGS. 24 and 25 show thin film chemical analysis apparatuses adapted for a series of processes regarding a lab-on-a-chip having assay sites arranged in parallel on different sectors to analyze various types of biochemical reactions regarding a single sample according to embodiments of the present invention.

As used herein, the analysis of biochemical reactions refers to analysis of GOT, GPT, ALP, LDH, GGT, CPK, amylase, T-protein, albumin, glucose, T-cholesterol, triglycerides, T-bilirubin, D-bilirubin, BUN, creatinine, I. phosphorus, calcium, uric acid, etc., in blood.

Reference numeral 130 refers to a preparation chamber adapted for a preparation process for preparing a sample from blood, which has been injected via the injection hole 121, by centrifugal separation. Reference numerals 132a, 132b, 132c, and 132d refer to chambers for biochemical reactions, particularly assay sites which store reagents for analyzing and diagnosing the biochemical reactions and their results and which undergo biochemical reactions with the analyte supplied by the preparation chamber 130. According to the present invention, the reagents stored in the assay sites are preferably solid-phase granules obtained by highly concentrating reagents for biochemical analysis. Preferably, the solid-phase granules stored in the assay sites 132a, 132b, 132c, and 132d are dissolved in the dilution buffer so that they turn into a liquid-phase reagent and undergo biochemical reactions with the analyte later.

The dilution buffer is stored in the dilution buffer storage chambers 134a, 134b, 134c, and 134d in a liquid phase, and is supplied to corresponding assay sites 132a, 132b, 132c, and 132d by the opening operation of the burst valves 155a, 155b, 155c, and 155d when the thin film chemical analysis apparatus 100 rotates, respectively.

Characteristically, the reagent consisting of different types of solid-phase granules for the biochemical reaction analysis can turn into a liquid-phase reagent by a single type of unified dilution buffer.

Particularly, the plurality of assay sites 132a, 132b, 132c, and 132d have their own dilution buffer storage chambers 134a, 134b, 134c, and 134d, which have a predetermined volume corresponding to the dilution ratio with regard to solid-phase granules of respective assay sites, so that they can supply a predetermined amount of dilution buffer.

Reference numeral 7 refers to a liquid valve for preventing the liquid from leaking while the thin film chemical analysis apparatus rotates at a high speed.

According to the present invention, the liquid valve is preferably a V-or U-shaped channel 7 coated with a hydrophilic material.

Reference numeral 131 refers to a buffer chamber for temporarily storing a sample obtained in the preparation chamber 130, storing a dilution buffer for diluting the sample obtained in the preparation chamber 130, or storing a label to be attached to the sample. The label generally consists of chromogenic particles having antibodies or DNA bound thereto, such as gold, gold conjugate, latex, fluorescent material, noctilucent material, enzyme, or enzyme-linked antibodies. The enzyme reacts with a substrate and exhibits a color.

Reference numeral 290a refers to a reference hole, and reference numeral 129 refers to the excess chamber.

Reference numeral 131a refers to an optional dilution buffer chamber for storing a dilution buffer.

When the burst valve 152a is opened, the dilution buffer flows from the dilution buffer chamber 131a into the buffer chamber 131.

According to the present invention, the label preferably consists of solid-phase granules, instead of being in a liquid phase. Particularly, when the burst valve 152a is opened, the dilution buffer flows from the dilution buffer chamber 131a to the buffer chamber 131. Then, the label in the buffer chamber is dissolved into a liquid phase.

According to another embodiment of the present invention, the label is stored in the dilution buffer chamber 131a in a liquid phase, and is supplied to the buffer chamber 131 when the burst valve 152a is opened to use the thin film chemical analysis apparatus.

Reference numerals 151, 152, 154a, 154b, 154c, and 154d refer to thin film valves. Reference numerals 152a, 155a, 155b, 155c, 155d, 156a, 156b, 156c, and 156d refer to burst valves.

Reference numerals 13a, 13b, 13c, 13d, and 14 refer to discharge holes.

Referring to FIG. 24, quantitative chambers 140a, 140b, 140c, and 140d supply a predetermined amount of sample to corresponding assay sites 132a, 132b, 132c, and 132d. The volume of the quantitative chambers 140a, 140b, 140c, and 140d determines the amount of sample to be supplied to the assay sites.

The channel 7 and the concentric circle channel 9 are coated with a hydrophilic material, while the overflow chamber 132e is coated with a hydrophobic material.

When the thin film valve 152 is opened, the sample in the buffer chamber 131 makes a hydrophilic-fluid-movement via the channel 7 and the concentric circle channel 9. The quantitative chambers 140a, 140b, 140c, and 140d are coated with a hydrophilic material, and are filled while the sample moves to the concentric circle channel 9. Since the overflow chamber 132e is hydrophobic, only the concentric circle channel 9 and the quantitative chambers 140a, 140b, 140c, and 140d are filled with the sample.

The concentric circle channel 9 is designed to have a concentric circle so that it receives the same centrifugal force during rotation.

If the thin film chemical analysis apparatus is rotated after the concentric circle channel 9 is filled with the sample, a part of the sample remains stored in the quantitative chambers 140a, 140b, 140c, and 140d, but another part of the sample that has been filling the concentric circle channel 9 is entirely discharged to the overflow chamber 132e by the centrifugal force.

Then, the thin film valves 154a, 154b, 154c, and 154d are opened by the pulse valve operation so that the sample in the quantitative chambers 140a, 140b, 140c, and 140d flows into respective assay sites 132a, 132b, 132c, and 132d and undergoes a biochemical reaction with the reagent. According to the present invention, the thin film valves 154a, 154b, 154c, and 154d are arranged on a concentric circle so that they are opened simultaneously during the pulse valve operation.

The optical absorbance of the sample in the assay sites 132a, 132b, 132c, and 132d is measured by the spectrometer to analyze the result of biochemical reaction of the sample qualitatively or quantitatively.

The present invention is characterized in that the concentric circle channel 9 is designed to have a concentric circle so that, when the thin film chemical analysis apparatus 100 rotates, it receives the same centrifugal force. As a result, a part of the sample remains stored in the quantitative chambers 140a, 140b, 140c, and 140d, but another part of the sample that has been filling the concentric circle channel 9 is entirely discharged to the overflow chamber 132e by the centrifugal force against the hydrophobic barrier established in the overflow chamber 132e.

FIG. 25 shows a thin film chemical analysis apparatus having four parallel sectors 170a, 170b, 170c, and 170d according to an embodiment of the present invention. The sector number may increase in proportion to the number of test items. The sectors operate in the same manner.

Referring to FIG. 25, the sample in the buffer chamber 131 makes a hydrophilic-fluid-movement via the channel 7 and the sector channels 7a, 7b, 7c, and 7d when the thin film valve 152 is opened. The sector channels play not only the role of sample movement passages, but also the role of quantitative chambers that determine the amount of sample to be supplied to respective sectors by adjusting the length and width of respective sector channels. In the case of the sector 170a, the sample filling the sector channel 7a flows into the assay site 132a when the burst valve 156a is opened. In the case of the sector 170b, the sample filling the sector channel 7b flows into the assay site 132b and undergoes a biochemical reaction with the reagent when the burst valve 156b is opened.

The optical absorbance of the sample in the assay site is measured by the spectrometer to analyze the result of the biochemical reaction of the sample qualitatively or quantitatively.

The burst valves 156a, 156b, 156c, and 156d may be replaced with thin film valves, which are opened simultaneously by a pulse valve operation so that the sample moves into the assay sites. The movement of the sample from the sector channels to the assay sites is enabled by the centrifugal force during the valve opening. In this case, the sector channels are designed in such a manner that no interference occurs between adjacent sector channels. Particularly, the sample in the sector channel 7a does not move to the assay site 132b belonging to the sector channel 7b, but to the assay site 132a only. In order to minimize the interference between the sector channels, they have a V- or U-shape so that the sample is isolated in respective sector channels during generation of centrifugal force.

The present invention is characterized in that the azimuthal assay site search for measurement of the spectrometer 108 is realized by controlling the rotation angle of the step motor or the thin film chemical analysis apparatus connected to the step motor by a gear.

The present invention is characterized in that the azimuthal assay site search for measurement of the spectrometer 108 is realized by arranging a thin film cylindrical magnet for the assay site search on the circumference of the body and conducting an azimuthal assay site search as an application of the above-mentioned azimuthal direction valve search process. Alternatively, the assay site is subjected to space addressing by a blank solution chamber while the body 100 rotates so that the optical absorbance of the sample in each assay site is successively measured while the body rotates. In this case, the body further has the blank solution chamber for storing a blank solution, which has the same radius as the assay site. The spectrometer is calibrated so that the optical transmittance of the blank solution becomes 100% (i.e. zero optical absorbance), and the optical absorbance of the sample in each assay site is measured. The fact that the optical absorbance of the blank solution is always zero makes it possible to identify the blank solution chamber while the body rotates. This enables space addressing of the assay site with reference to the blank solution chamber.

The present invention is characterized in that the burst valves 155a, 155b, 155c, and 155d are opened at the same time.

The present invention is characterized in that the burst valves 156a, 156b, 156c, and 156d are opened at the same time.

The present invention is characterized in that the burst valves 155a, 155b, 155c, and 155d and the burst valves 156a, 156b, 156c, and 156d are opened at different points of time.

FIG. 26 shows a thin film chemical analysis apparatus adapted for a series of processes regarding a lab-on-a-chip for an ELISA (Enzyme-Linked Immunosorbent Assay) or a CLISA (Chemical Luminescence Immunosorbent Assay) according to another embodiment of the present invention.

The action of an enzyme confirms the existence of an immunoglobulin, and this technology is referred to as an ELISA, as generally known in the art. This immunological testing method has a high degree of specificity and sensitivity, because an enzyme is attached to antibody molecules by a covalent bond. Therefore, the method is suitable for qualitative and quantitative analysis, and is widely used clinically (measurement is possible in a range of 0.001-0.01 µg/ml). This technique uses an antibody, to which an enzyme is covalent-bonded without affecting the catalyst action of the enzyme and the specificity of the antibody.

Typical ligases include horseradish peroxidase, alkaline phosphatase, and β-galactosidase, all of which create colored reaction products so that even a small amount is enough to catalyze a measurable reaction.

The ELISAs includes a direct ELISA, an indirect ELISA, a sandwich ELISA, and a competition ELISA, as generally known in the art.

Detailed descriptions will now be made with reference to FIG. 26. The thin film chemical analysis apparatus adapted for a series of processes regarding a lab-on-a-chip based on an ELISA or a CLISA according to the present invention is characterized in that the apparatus includes a chamber adapted for a specific biochemical binding reaction with a sample obtained in the preparation chamber 130, particularly an assay site 132 having a capture probe attached to the substrate to analyze and diagnose the sample; a trash chamber 133 for collecting remnants that have undergone no specific biochemical binding reaction and enzymes that wander with no binding; an enzyme chamber 134a for storing an enzyme having an antibody or DNA bound thereto (i.e. secondary antibody or conjugate); a dilution buffer chamber 131a for storing a dilution buffer for diluting the sample or storing a label to be attached to the sample; a substrate chamber 135a for storing a chromogenic substrate that reacts with the enzyme and exhibits a color; an optional excess chamber 131b for storing an excess of dilution buffer; and an optional cleaning chamber 128a for storing a cleaning solution necessary for the cleaning process.

Characteristically, the excess chamber 131b is adapted in such a manner that an excess of dilution buffer or label is moved to the excess chamber 131b via the quantitative channel 94 by centrifugal force during rotation of the thin film chemical analysis apparatus.

Reference numerals 154 and 155 refer to thin film valves. Reference numerals 151a, 152a, 153a, 154a, and 155a refer to burst valves. Reference numerals 128a, 131a, 134a, and 135a refer to liquid storage chambers for storing a cleaning solution, a dilution buffer, an enzyme solution, and a substrate, respectively. The liquids in the liquid storage chambers 128a, 131a, 134a, and 135a move to corresponding chambers 128, 131, 134, and 135 when the burst valves 151a, 152a, 153a, 154a, and 155a are opened during operation of the thin film chemical analysis apparatus 100.

The ELISA and CLISA based on a thin film chemical analysis apparatus will now be described in detail with reference to FIG. 26.

(1) Before the thin film chemical analysis apparatus 100 is used, the user injects sampled blood (or an analyte) into the preparation chamber 130 via the sample injection hole 121. The analyte is then stored in the preparation chamber 130.

(2) The thin film chemical analysis apparatus is loaded onto the thin film chemical analysis apparatus drive, and is rotated at a high speed. The resulting centrifugal force separates the blood in the preparation chamber 130 into serum and thrombus, or separates samples from the analyte. High-speed rotation following the centrifugal separation opens the burst valve 151a and moves the separated samples from the auxiliary preparation chamber 130a to the buffer chamber 131. The burst valves 151a, 152a, 153a, 154a, and 155a are also opened to move the liquids in the liquid storage chambers 128a, 131a, 134a, and 135a to corresponding chambers 128, 131, 134, and 135, respectively. During the high-speed rotation, the liquid valve function developing in the channels 7, 8, 9, and 10 themselves holds the solutions in respective chambers 128, 131, 134, and 135 without moving them to the assay site 132.

(3) Optionally, the samples are mixed with the dilution buffer in the buffer chamber 131.

(4) The thin film valve 152 is opened so that the samples in the buffer chamber 131 are moved to the assay site by a hydrophilic-fluid-movement via the channels 7 and 291, and incubated for a specific biochemical binding reaction.

(5) The thin film chemical analysis apparatus 100 is rotated at a high speed to dehydrate and clean the assay site. Samples that have undergone no specific binding are moved to the trash chamber 133.

(6) The thin film valve 154 is opened so that the enzyme solution in the chamber 134 is moved to the assay site by a hydrophilic-fluid-movement via the channels 9 and 294, and incubated for a specific biochemical binding reaction.

(7) The thin film chemical analysis apparatus 100 is rotated at a high speed to dehydrate and clean the assay site. Enzymes that have undergone no specific binding are moved to the trash chamber 133.

(8) The thin film valve 155 is opened so that the substrate in the chamber 135 is moved to the assay site by a hydrophilic-fluid-movement via the channels 10 and 295, and incubated for a chromogenic reaction with enzymes.

(9) The result of reaction of the assay site 132 is read by the optical measuring device, electrochemical measuring device, impedance measuring device, image sensor device, bio-pit detecting device, fluorescence detecting device, noctilucence detecting device, radioactivity detector, spectrometer, SPR detector, or eyes.

(10) Optionally, the reading result is followed by a diagnosis result and prescription, which are displayed on the computer monitor. Remote access is made to a corresponding doctor via Internet automatically or manually. If necessary, the result data of diagnosis and a medical interview table are remote-transmitted to the doctor. The patient then waits for a prescription of the doctor.

Figure 28:
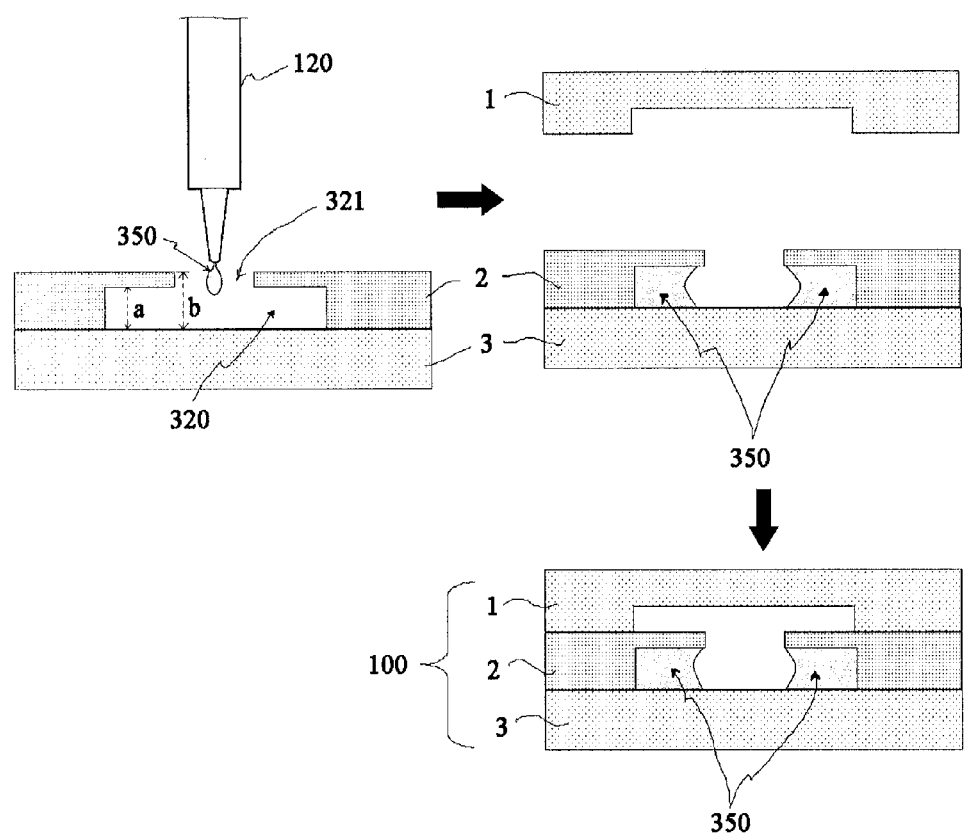
FIG. 28 shows a process for manufacturing a liquid storage chamber for injecting and storing a liquid according to an embodiment of the present invention.

FIG. 28 shows a process for manufacturing a liquid storage chamber for injecting and storing a liquid according to an embodiment of the present invention.

Referring to FIG. 28, the liquid storage chamber 320 characteristically has an upper substrate 1, a middle substrate 2, and a lower substrate 3, which are stacked on one another, as well as a recess formed therein.

During the manufacturing process, the middle and lower substrates 2 and 3 are stacked and assembled, and a predetermined amount of liquid 350 is injected into the liquid storage chamber 320 by a dispenser 120, particularly by a means for dispensing a predetermined amount of liquid or injecting a sample. The height of the liquid storage chamber 320 varies in such a manner that the injected liquid is concentrated in the outer periphery of the chamber 320 as much as possible. This is because, considering the capillary principle, the liquid is preferably positioned at a low portion of the chamber (i.e. where the chamber is narrow). Therefore, the height a of the chamber near the outer periphery of the chamber hole 321 is smaller than the height b near the chamber hole 321 so that the liquid lies as far away from the chamber hole 321 as possible. This makes it easier to stack and assemble the upper substrate 1 after the liquid injection.

The liquid storage chamber, which is constructed as mentioned above, has no separate liquid injection hole, thereby preventing evaporation of the liquid.

The present invention is characterized in that the height of the liquid storage chamber near the outer periphery is smaller than that near the center of the chamber so that the liquid is concentrated in the outer periphery, and that no separate liquid injection hole is necessary to inject a liquid into the liquid storage chamber.

The present invention is characterized in that the upper and lower substrates 1 and 3, which constitute the liquid storage chamber, have no hole (i.e. liquid injection hole, discharge hole).

In general, a liquid injection hole is necessary to inject a liquid into the liquid storage chamber, and the hole must be sealed after liquid injection. However, improper sealing may cause a problem of liquid evaporation.

In order to avoid liquid evaporation, the liquid injection hole must be sealed by COC (Cyclic Olefin Copolymer), which makes the manufacturing process complicated.

Figure 29:
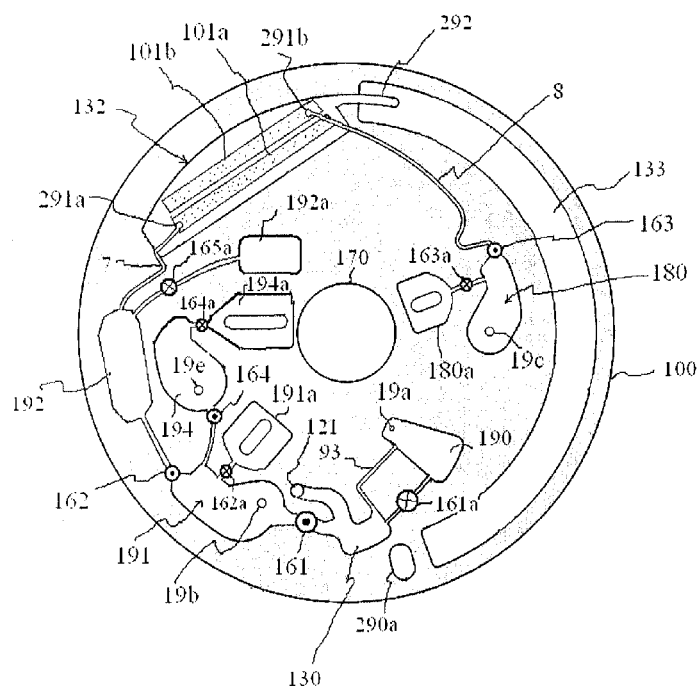
FIG. 29 shows a thin film chemical analysis apparatus adapted for a series of processes regarding a lab-on-a-chip for pesticide residue tests according to another embodiment of the preset invention.

FIG. 29 shows a thin film chemical analysis apparatus adapted for a series of processes regarding a lab-on-a-chip for pesticide residue tests according to another embodiment of the preset invention.

Referring to FIG. 29, reference numeral 101*a* refers to a sample membrane, and reference numeral 101*b* refers to a control membrane.

The sample membrane 101*a* analyzes a sample obtained from an analyte. The control membrane 101*b* is subjected to a blank test to determine the zero-point cutoff of the reaction intensity. Based on the determined zero-point cutoff, the reaction intensity of the sample membrane is measured.

Chambers 191 and 194 store solid reagents 1 and 2, respectively. Liquid storage chambers 180*a*, 191*a*, and 194*a* store distilled water. A liquid storage chamber 192*a* stores a phosphate buffer.

An analyte is obtained from a vegetable or fruit by a sampling rod, and is loaded onto the preparation chamber 130 via the sample injection hole 121.

A sample extraction solution stored in the chamber 190 is transferred to the preparation chamber 130 when the burst valve 161*a* is opened, and is mixed with the analyte stored in the preparation chamber 130 by the above-mentioned mixing operation. Then, the thin film chemical analysis apparatus 100 is rotated at a high speed to separate the sample from remnants.

The burst valves 162*a*, 163*a*, and 164*a* are opened during the centrifugal separation.

When the burst valves 162*a*, 163*a*, and 164*a* are opened, the distilled water moves from the liquid storage chambers 180*a*, 191*a*, and 194*a* to the chambers 180 191, and 194 and is mixed with the solid reagents 1 and 2 in the chambers 191 and 194 to dissolve them. As a result, liquid reagents 1 and 2 are obtained. The mixing operation is conducted so that the solid reagents 1 and 2 are easily dissolved in the distilled water.

The phosphate buffer moves from the liquid storage chamber 192*a* to the chamber 192 when the burst valve 165*a* is opened during the centrifugal separation.

After the centrifugal separation, the thin film valve 161 conducts the above-mentioned pulse valve operation to transfer the sample, which has been extracted by the sample extraction solution, to the chamber 191. Mixing and incubation of the transferred sample proceed so that the transferred sample is mixed and reacted with the liquid reagent 1 in the chamber 191.

The thin film valve 164 is then opened to inject the liquid reagent 2 from the chamber 194 into the chamber 191 so that it is mixed and reacted with the sample again and undergoes incubation.

The thin film valve 162 conducts a pulse valve operation so that the sample moves to the chamber 192 containing the phosphate buffer after reacting with the liquid reagents 1 and 2. Then, the sample is mixed and reacted with the phosphate buffer and undergoes incubation while rotating. The liquid valve 7 prevents the sample from moving to the assay site 132 during rotation of the thin film chemical analysis apparatus 100.

After the thin film chemical analysis apparatus 100 stops, the sample is injected into the sample membrane 101*a* via hydrophilic channels 7 and 291*a*. The sample is then diff-used and reacted with the enzyme or marker on the sample membrane 101*a*.

At the same time, the thin film valve 163 is opened so that the distilled water flows from the chamber 180 to the control membrane 101*b* via channels 8 and 291*b* coated with a hydrophilic material. The distilled water is then diffused and reacted with the enzyme or marker on the control membrane 101*a*.

Optionally, the thin film chemical analysis apparatus is rotated at a high speed for dehydration and drying. Then, the result of reaction of the assay site is analyzed.

The result of reaction of the assay site 132 is read by the optical measuring device, electrochemical measuring device, impedance measuring device, image sensor device, bio-pit detecting device, fluorescence detecting device, noctilucence detecting device, radioactivity detector, spectrometer, SPR detector, or eyes.

Optionally, the reading result is followed by a test result, which is displayed on the computer monitor. Remote access is made to the server of the corresponding government institute or food dealer via Internet automatically or manually. The test result and history are reported to the server, or are stored in the memory of the wireless RF IC (electronic tag).

This is advantageous in that the corresponding government institute can obtain information regarding pesticide residues, and that the food dealer can obtain information regarding reliable agricultural products. The government institute can advantageously publicize the information via Internet so that general consumers can directly buy reliable agricultural products from corresponding producers.

Characteristically, the enzyme or marker is adapted to detect organophosphorous-based and carbamate-based insecticides, which are most frequently used as pesticides for vegetables and fruits.

The present invention is characterized in that the enzyme is preferably acetylcholinesterase (AChE).

Figure 30:
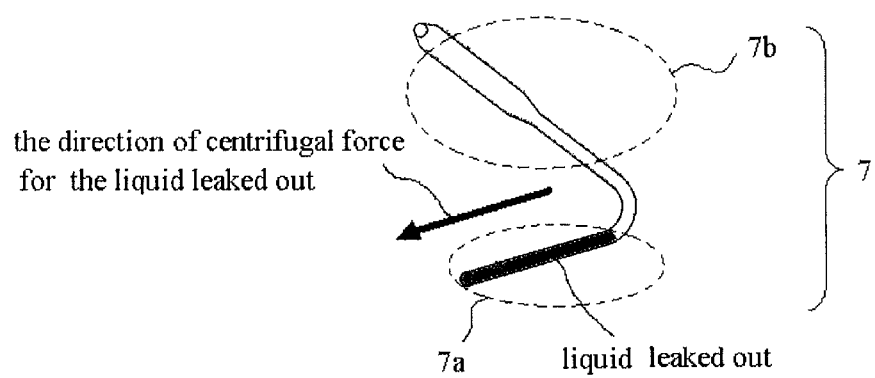
FIGS. 30 and 31 show a liquid valve for preventing liquid leakage during high-speed rotation of a thin film chemical analysis apparatus according to an embodiment of the present invention.
Figure 31:
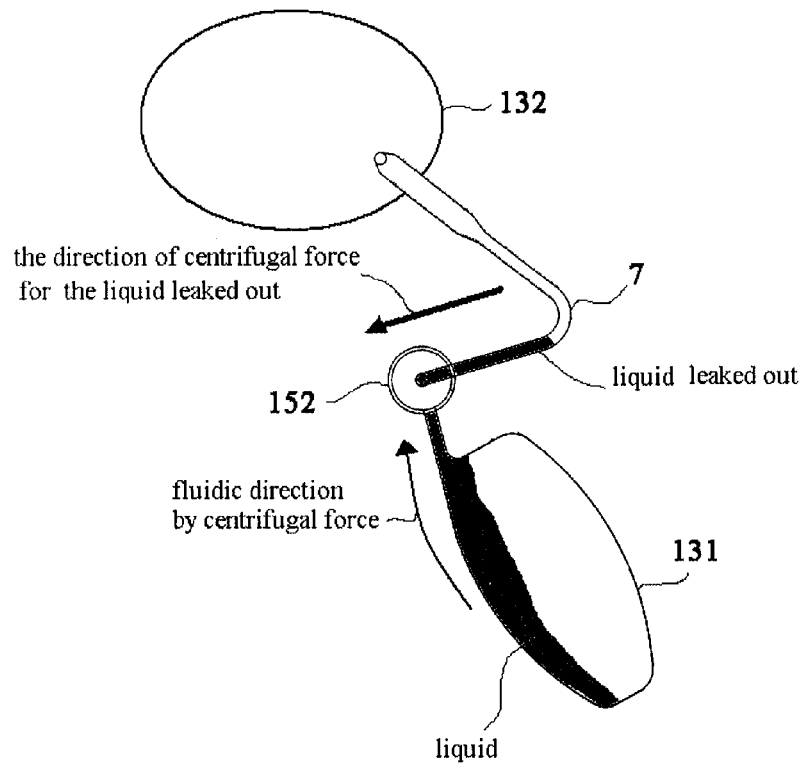

FIGS. 30 and 31 show a liquid valve for preventing liquid leakage during high-speed rotation of a thin film chemical analysis apparatus according to an embodiment of the present invention.

The liquid valve is formed by a liquid when it moves from the buffer chamber 131 or cleaning chamber 133 to a V-or U-shaped channel 7 or 8 at the outlet of the thin film valve 152 or 153 during high-speed rotation of the thin film chemical analysis apparatus 100. The liquid valve prevents the portion of the liquid, which has leaked into the next chamber 132, from moving any longer.

FIGS. 30 and 31 show in detail the liquid valve realized by the V- or U-shaped channel 7, which is divided into a liquid valve portion 7*a* and a channel portion 7*b*. The liquid valve functions in the following manner: when the thin film chemical analysis apparatus 100 rotates at a high speed, the liquid leaks out of the buffer chamber 131 and fills the liquid valve portion 7*a* first. Then, the portion of the liquid filling the liquid valve portion 7*a* receives centrifugal force in the radial direction, which prevents further liquid leakage from the thin film valve 152. Rather, the leaked portion of the liquid is withdrawn into the buffer chamber 131 again by the centrifugal force.

In other words, a portion of the liquid leaks out of the buffer chamber 131 during high-speed rotation of the thin film chemical analysis apparatus 100, and the tendency to leak out of the buffer chamber 131 is counterbalanced by the centrifugal force acting on the leaked portion of the liquid. As a result, no more liquid leakage occurs. Hereinafter, such an action of the centrifugal force acting on the leaked portion of the liquid and preventing further liquid leakage will be referred to as a liquid valve operation.

The thin film chemical analysis apparatus according to the present invention is characterized in that a liquid valve is further formed at the outlet of the thin film valves to prevent liquid leakage during high-speed rotation of the thin film chemical analysis apparatus.

The thin film chemical analysis apparatus according to the present invention is characterized in that the liquid valve is preferably realized by a V- or U-shaped channel or by a channel causing a liquid valve operation.

The present invention is characterized in that the liquid valve portion 7a prevents the sample from moving to the assay site 132 during rotation of the thin film chemical analysis apparatus 100, once the sample has been transferred from the preparation chamber 130 to the buffer chamber 131 by a pulse valve operation, and that, when the thin film chemical analysis apparatus 100 stops rotating, the sample in the buffer chamber 131 flows into the assay site 132 via the liquid valve portion 7a based on a hydrophilic fluid movement. The liquid valve portion 7a and the channel portion 7b are preferably coated with a hydrophilic material.

Figure 32:
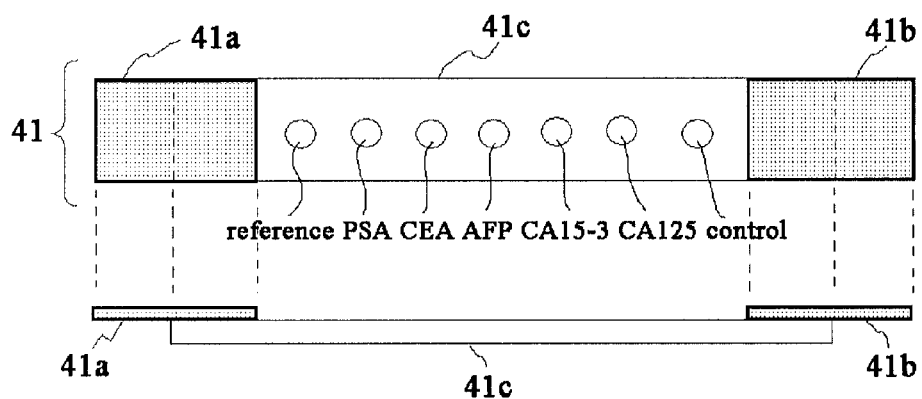
FIGS. 32-34 show strips having various tumor markers fixed to a porous membrane as lines or spots according to embodiments of the present invention.
Figure 33:
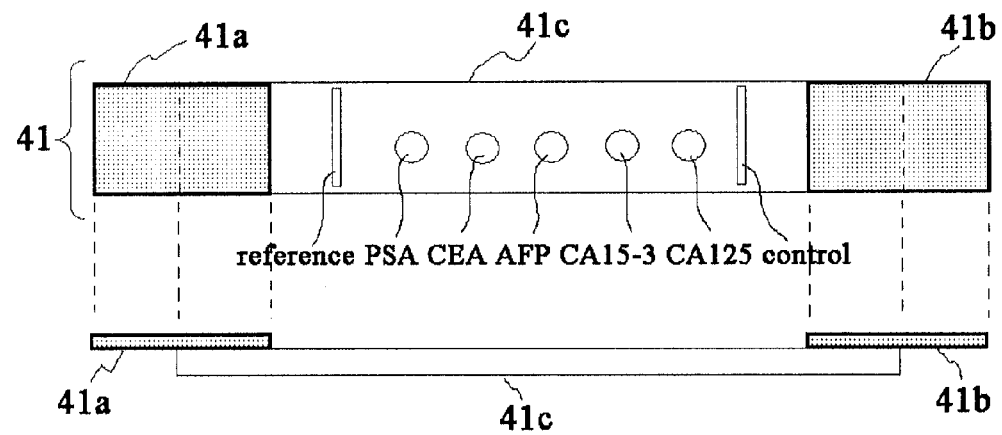
Figure 34:
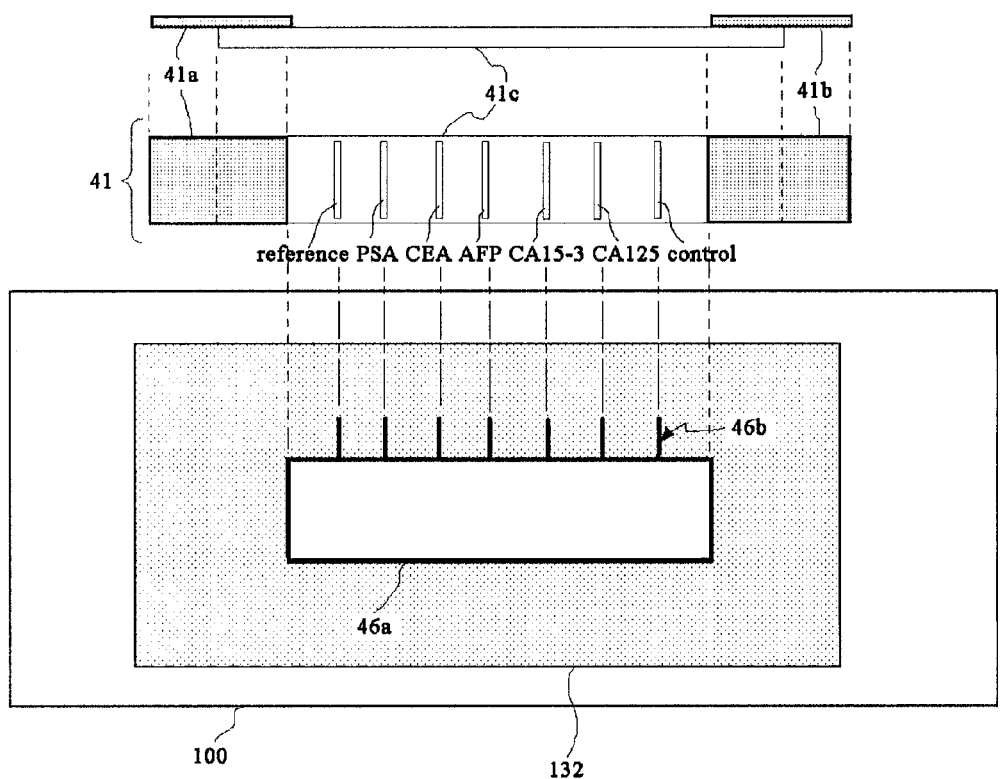

FIGS. 32-34 show strips having various tumor markers fixed to a porous membrane as lines or spots according to embodiments of the present invention.

Various types of tumor-marker lines or spots will hereinafter be referred to as test lines. Reference numeral 41a refers to a conjugate pad, a sample pad, or both a sample pad and a conjugate pad. Reference numeral 41b refers to an absorbent pad. Reference numeral 41c refers to a porous membrane. The conjugate pad preferably has a label (e.g. gold conjugate, enzyme-linked antibody noctilucent material, or fluorescent material) deposited on a pad in a freeze-dried form.

The capture antibody preferably fixes the tumor marker.

The tumor marker is preferably at least one substance selected from AFP, PSA, CEA, CA19-9, CA 125, and A15-3.

The capture antibody preferably fixes GS (Glutamine Synthetase), which is a specific marker of Alzheimer's disease.

The capture antibody preferably fixes myoglobin, CK-MB, or troponin I (TnI), which is a myocardial infarction marker.

The present invention is characterized in that at least one marker or capture probe for testing AIDS, myocardial infarction, antibiotic residues, pesticide residues, allergy, or breast cancer is preferably fixed to the porous membrane 41c, and a reaction test proceeds based on immunochromatography.

The immunochromatography is a combination of immunochemistry and chromatographic assay based on applications of the specific immunological reactivity of the antibody to the antigen, the chromogenic characteristics and fluidity of colloidal gold, and molecular movement caused by the capillary phenomenon of the porous membrane. The immunochromatography is advantageous in that, unlike conventional multi-stepped immunological measurement, it integrates the analyte dilution step, cleaning step, and chromogenic step based on the reaction between the ligase and substrate into a single step for faster tests. In addition, the test result can be read without specific equipment in an easy, economic, and time-efficient manner.

Characteristically, the capture antibody additionally fixes an antibody for a reference line (or a plurality of reference lines) and a control line in addition to the tumor marker.

The reaction density of the reference line is used as the cutoff value to easily determine whether the reaction is negative or positive.

The cutoff value of the reference line is selected from 3 ng/ml, 4 ng/ml, 10 ng/ml, 20 ng/ml, 30 ng/ml, 40 ng/ml, and 50 ng/ml.

Characteristically, qualitative or quantitative analysis proceeds based on the difference in reaction intensity between the reference and test lines.

Characteristically, qualitative or quantitative analysis proceeds based on the difference in reaction intensity between the background and the test line.

Characteristically, qualitative or quantitative analysis proceeds based on determination of the reaction intensity of the test line according to a linear function regarding the reaction intensity established by a plurality of reference lines.

Characteristically, qualitative or quantitative analysis proceeds based on determination of the reaction intensity of the test line according to a linear function regarding the reaction intensity established by the reference and control lines.

The present invention is characterized in that the reaction intensity is preferably obtained from image information expressed in terms of color intensity under LED lighting in various wavelengths, and that the reaction result of the assay site 132 is analyzed quantitatively or qualitatively according to the two-dimensional mapping between the various wavelengths and the color intensity.

The reference line confirms a positive reaction when the sample has diffused to the absorbent pad 41b. As such, the reference line is useful to confirm whether or not a test using a strip is acceptable. In other words, the test result is acceptable only if the reference line is positive.

The porous membrane 41c may adopt a flow-through type or lateral flow type, and is easily available on the market. A sample or cleaning solution may be injected into the sample pad 41a. According to the present invention, in the case of the flow-through-type porous membrane, the strip preferably has various types of tumor markers, disease markers, or antibodies fixed to the porous membrane 41c as spots.

When a sample is injected into the sample pad 41a, the sample is absorbed by the sample pad 41a, diffuses and moves on the porous membrane 41c according to the capillary phenomenon, and undergoes biochemical specific binding with the capture antibody. The porous membrane 41c has an absorbent pad 41b positioned on one end to support the diffusion movement. The present invention is characterized in that an optional conjugate pad may be connected to the sample pad. In this case, a liquid sample flows into the sample pad and undergoes binding with gold conjugate on the conjugate pad, enzyme-linked antibody, noctilucent material, or fluorescent material. After constituting a complex, the sample diffuses and moves on the porous membrane 41c.

When a cleaning solution is injected into the sample pad 41a, the cleaning solution is absorbed by the sample pad 41a. Then, the cleaning solution diffuses and moves on the porous membrane 41c according to the capillary phenomenon, cleans substances that have no binding or non-specific binding with the capture body, and removes the background noise of the porous membrane 41c.

According to the present invention, the strip 41 is preferably installed in the assay site 132 shown in FIGS. 18-23 to connect the channel 291 and the sample pad 41a.

Referring to FIG. 34, guide lines 46a and 46b are marked in such a manner that, when the strip 41 in the assay site 132 is to be analyzed by the image sensor device 144 installed at the lower end of the thin film chemical analysis apparatus 100, the image sensor device can easily recognize the location of the test, reference, and control lines. The guide lines include a thick edge line 46a corresponding to the outer periphery of the porous membrane 41c, and marker location lines 46b indicated on the lower substrate 3 of the thin film chemical analysis apparatus 100 at locations corresponding to the test, reference, and control lines.

After the reaction is over, the image sensor 144 cuts off the membrane 41c by using the edge line 46a to optimize the contrast and luminance. Then, the image sensor 144 tries to find a reference line lying at the first location on the porous membrane 41c. To this end, the image sensor 144 may use the thick edge line 46a, the marker location line 46b, or a combination of both. The guide lines are preferably red, black, violet, or blue.

The present invention is characterized in that the upper substrate 1 is preferably processed to be opaque so that, even if light is shed above the upper substrate 1 to analyze the assay site 132 by the image sensor device 144, noise resulting from scattering and scratches is suppressed. The transparency is preferably 20-50%.

Figures 35, 36:
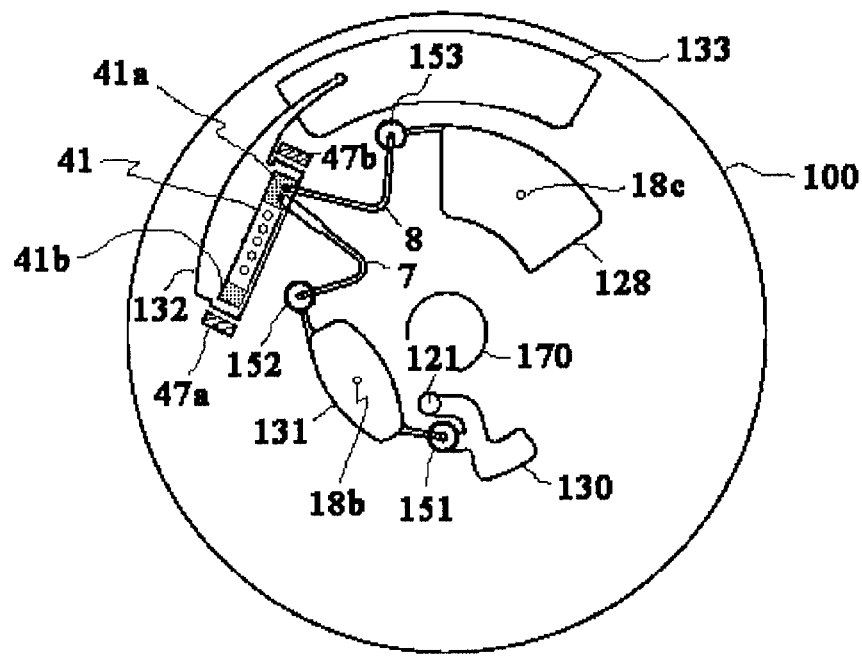
FIG. 35 shows an example of installation of the strips shown in FIGS. 32-34 inside an assay site of a thin film chemical analysis apparatus according to an embodiment of the present invention.
FIG. 36 shows a thin film chemical analysis apparatus drive adapted for front loading or top loading of a thin film chemical analysis apparatus according to an embodiment of the present invention.

FIG. 35 shows an example of installation of the strips 41 shown in FIGS. 32-34 inside an assay site 132 of a thin film chemical analysis apparatus 100 according to an embodiment of the present invention.

Referring to FIG. 35, the thin film chemical analysis apparatus 100 characteristically includes a preparation chamber 130 for preparing a sample (serum, thrombus, antigen, or DNA sample) from blood or a cell; a buffer chamber 131 for diluting the sample by a dilution buffer; an assay site 132 containing a strip 41 having a capture probe attached (fixed) as a test line for an antigen-antibody reaction or hybridization reaction with the sample; a cleaning chamber 128 for storing a cleaning solution necessary for a cleaning process; and a trash chamber 133 for collecting waste created during the cleaning process.

Reference numerals 151, 152, and 153 refer to thin film valves for controlling the fluid flow.

Reference numerals 7 and 8 refer to channels for forming a liquid valve therein. The buffer chamber 131 and the cleaning chamber 128 have a dilution buffer and a cleaning solution injected therein via sample injection holes 18b and 18c and then sealed, before they are shipped. Alternatively, the buffer chamber 131 and the cleaning chamber 128 additionally have chambers 131a and 128a and burst valves 152a and 153a as shown in FIG. 18, so that a dilution buffer and a cleaning solution are injected into the buffer chamber 131 and the cleaning chamber 128 when the burst valves are opened, respectively.

The thin film chemical analysis apparatus according to the embodiment shown in FIG. 35 is operated in the following manner: the thin film valve 152 shown in FIG. 35 is optional, and an excess chamber 129 may be additionally provided.

The present invention is characterized in that a plurality of strips 41 are preferably arranged in parallel inside the assay site 132 so that a multiple-strip test can proceed with regard to a single sample.

(1) Before the thin film chemical analysis apparatus 100 is used, the user samples blood with a blood-sampling device and injects the sampled blood into the preparation chamber 130 via the sample injection hole 121. The blood is then stored in the preparation chamber 130.

(2) The thin film chemical analysis apparatus is then loaded onto the thin film chemical analysis apparatus drive and is rotated at a high speed. The resulting centrifugal force separates the blood in the preparation chamber 130 into serum (or plasma) and thrombus.

(3) The thin film 151 is opened by the pulse valve operation to move the separated serum (or plasma) to the buffer chamber 131. Optionally, the serum (or plasma) may be mixed with the dilution buffer in the buffer chamber 131 to dilute it.

(4) (a) When the thin film valve 152 is used: the thin film valve 152 is opened while the thin film chemical analysis apparatus remains stationary so that the serum (or plasma) stored in the buffer chamber 131 makes a hydrophilic-fluid-movement via the channel 7. The serum (or plasma) is absorbed by the sample pad 41a when it reaches the end of the channel 7 (where the sample pad 41a lies on the strip 41). Optionally, the thin film valve 152 may cause a pumping fluid movement so that the serum (or plasma) reaches the sample pad 41a more easily.

(b) When the thin film valve 152 is not used: if the serum (or plasma) stored in the buffer chamber 131 fails to move to the assay site 132 by the liquid valve operation of the channel 7 while the thin film chemical analysis apparatus rotates in step (3) and if the thin film chemical analysis apparatus stops, the serum (or plasma) stored in the buffer chamber 131 makes a hydrophilic-fluid-movement via the channel 7 and is absorbed by the sample pad 41a when reaching the end of the channel 7.

(5) After being absorbed by the sample pad, the serum (plasma) is diffused due to the capillary phenomenon resulting from the porosity of the porous membrane 41c. During the diffusion process, the antigen in the serum undergoes a specific binding reaction (antigen-antibody reaction) with the capture probe on the porous membrane 41c.

(6) After a predetermined period of time elapses, the thin film chemical analysis apparatus is rotated at a high speed to dehydrate and dry the strip 41. During the dehydration process, an antigen undergoing non-specific binding is separated from the antibody and moves to the trash chamber 133.

(7) The thin film valve 153 is then opened so that the cleaning solution stored in the cleaning chamber 128 makes a hydrophilic-fluid-movement via the channel 8.

(8) When the cleaning solution reaches the end of the channel 8 (where the sample pad 41a lies on the strip 41), it is absorbed by the sample pad 41a. Optionally, the thin film valve 153 may cause a pumping fluid movement so that the cleaning solution reaches the sample pad 41a more easily. Since the strip 41 has been dried in step (6), it recovers its absorbing capability.

(9) After being absorbed by the sample pad 41a, the cleaning solution is diffused due to the capillary phenomenon resulting from the porosity of the strip 41. During the diffusion process, the cleaning solution removes components on the strip 41, which undergo non-specific binding reaction or no binding.

(10) The thin film chemical analysis apparatus is then rotated at a high speed to dehydrate and dry the strip 41.

(11) The result of reaction on the strip 41 is read by the optical measuring device, electrochemical measuring device, impedance measuring device, image sensor device, bio-pit detecting device, fluorescence detecting device, noctilucence detecting device, radioactivity detector, spectrometer, SPR detector, or eyes.

(12) Optionally, the reading result is followed by a diagnosis result and prescription, which are displayed on the computer monitor. Remote access is made to the corresponding doctor via Internet automatically or manually. If necessary, the result data of diagnosis and a medical interview table regarding height, weight, gender, age, etc. are remote-transmitted to the doctor. The patient then waits for a prescription of the doctor.

Optionally, the result of reaction on the strip 41 is read by the optical measuring device, electrochemical measuring device, impedance measuring device, image sensor device, bio-pit detecting device, fluorescence detecting device, noctilucence detecting device, radioactivity detector, spectrometer, or SPR detector while repeating steps (4)-(6) or (4)-(10), and the reaction result is subjected to quantitative analysis with reference to the number of repetition (cycle). According to the present invention, the increase in chromogenic intensity of the reaction result is preferably monitored at every cycle of the quantitative analysis.

Optionally, the dilution buffer according to the embodiment may include a label.

Optionally, the sample pad 41a according to the embodiment may have a gold conjugate pad coupled thereto.

Referring to FIG. 35 again, reference numerals 47a and 47b refer to air holes formed on both ends of the assay site 132 so that, when the thin film chemical analysis apparatus is rotated at a high speed, an air stream is formed to quicken the drying of the strip 41. Particularly, the strip 41 is dried before the cleaning process so that the cleaning solution is easily diffused on the strip during the cleaning process. The resulting diffusion force removes the background noise component.

The assay site 132 shown in FIG. 35 may be an assay site having a capture probe fixed to a gold surface, a gold film, an SAM (Self-Assembly Monolayer), or other substrates, with which a biomaterial can be linked instead of the strip (41). Various embodiments in this regard are disclosed in detail in Korean Patent Application No. 10-2001-0003956 (Jan. 27, 2001) entitled "NUCLEIC HYBRIDIZATION ASSAY METHOD AND DEVICE USING CLEAVAGE TECHNIQUE SPECIFICALLY RESPONSIVE TO SPECIFIC SEQUENCE OF COMPLEMENTARY DOUBLE BOND STRAND OF NUCLEIC ACID AND OLIGONUCLEOTIDE" and PCT Application No. PCT/KR02/00126 (Jan. 27, 2002) entitled "NUCLEIC HYBRIDIZATION ASSAY METHOD AND DEVICE USING A CLEAVAGE TECHNIQUE RESPONSIVE TO THE COMPLEMENTARY DOUBLE STRAND OR THE SINGLE STRAND OF NUCLEIC ACIDS OR OLIGONUCLEOTIDES".

Instead of the strip, the assay site may have a micropore or a groove (pit) for inducing the diffusion movement of the liquid sample.

According to an alternative embodiment, the thin film chemical analysis method does not use the cleaning chamber 128, the thin film valve 153, and the channel 8 of the thin film chemical analysis apparatus shown in FIG. 35, but includes the above-mentioned steps (1)-(6).

An example of respective processes shown in FIGS. 18-22 (preparation process, amplification process, antigen-antibody reaction process, hybridization process, and cleaning process) will now be described.

Preparation Process for Preparing Antigen or Serum (Plasma)

An exemplary preparation process for preparing serum in the preparation chamber 130 by using a chamber for extracting serum from blood will now be described.

(1) Blood is injected as much as 10-200 μl via the sample injection hole 121 installed on the preparation chamber 130. Optionally, the preparation chamber 130 may be coated with a thin heparin membrane to contain anticoagulant in a liquid or powder phase.

(2) The thin film chemical analysis apparatus is rotated at a high speed to separate serum and thrombus.

(3) The thin film valve 151 is opened by a pulse valve operation, and the separated serum (plasma) in the preparation chamber 130 is mixed with a dilution buffer or a label in the buffer chamber 131 to prepare a sample. The opening of the thin film valve 151 by the pulse valve operation is realized by moving the permanent magnet 5a to a distance R1 from the center of the thin film chemical analysis apparatus.

Preparation Process for Preparing DNA Sample

An exemplary preparation process for extracting a DNA sample from blood in the preparation chamber 130 will now be described.

(1) Blood is injected as much as 10-200 μl via the sample injection hole 121 installed on the preparation chamber 130.

(2) A lysis buffer destroys the membrane component of the cell, including lipid, and dissolves protein and nucleic acid.

(3) When ethyl alcohol (ethanol) is added thereto, DNA and RNA are extracted again as white precipitates.

(4) Centrifugal separation proceeds to obtain the DNA precipitated by ethanol. The DNA gathers at the end of the preparation chamber 130, and the upper-layer liquid in the preparation chamber 130 is discharged to the trash chamber 133 to separate and remove cell debris.

(5) A dilution buffer is introduced into the preparation chamber 130 and is mixed with the DNA so that the overall volume of the DNA increases. This step (5) is repeated about three times.

(6) The thin film valve 151 is opened by a pulse valve operation, and the prepared DNA in the preparation chamber 130 is mixed with a dilution buffer or a label in the buffer chamber 131 to prepare a sample. The opening of the thin film valve 151 by the pulse valve operation is realized by moving the permanent magnet 5a to a distance R1 from the center of the thin film chemical analysis apparatus.

(7) Optionally, a PCR process or a DNA amplification process follows to prepare an amplified DNA sample (or simply sample).

Antigen-Antibody Reaction Process and Hybridization Process

During these processes, the sample (DNA sample, antigen, label-antigen linked body, or label-DNA linked body) that has been obtained through the preparation process and stored in the buffer chamber 131 is moved to the assay site 132 to undergo a biochemical specific binding reaction with the capture probe on the assay site. Exemplary processes will now be described.

(1) The sample in the buffer chamber 131 is moved to the assay site 131 by opening the thin film valve 152 or by a hydrophilic fluid movement.

(2) The thin film chemical analysis apparatus remains still for 3-5 minutes at room temperature (i.e. incubation) so that the sample and the capture antibody undergo an antigen-antibody reaction or a hybridization reaction.

Cleaning Process (1) The thin film chemical analysis apparatus is rotated at a high speed so that the resulting centrifugal separation removes a sample that has non-specific binding or no binding with the capture probe.

(2) Optionally, the thin film valve 153 is opened to move the cleaning solution or elution buffer from the cleaning chamber 128 to the assay site 132 to clean the assay site 132.

(3) Optionally, above steps (1) and (2) are repeated.

After being loaded onto the thin film chemical analysis apparatus drive 100a, the thin film chemical analysis apparatus 100 automatically starts analysis.

If the thin film chemical analysis apparatus has been loaded with no sample injected via the sample injection hole 121, the user is requested to eject it or receives a warning message.

It is possible to confirm whether or not a sample has been injected by additionally providing the preparation chamber 130 with a sample injection check means selected from an impedance measuring device, an image sensor device, and an optical transmittance measuring device. Particularly, the impedance characteristics, optical transmittance, or color of the preparation chamber differs between when the sample has been injected and when it has not. This tells whether or not the sample has been injected.

Characteristically, the process of confirming whether or not a sample (e.g. blood) has been injected by the sample injection check means includes the steps of injecting a sample, rotating the thin film chemical analysis apparatus at a low speed so that the sample injected into the preparation chamber 130 is packed in the circumferential direction of the preparation chamber 130, and making a determination by the sample injection check means.

The thin film chemical analysis apparatus drive according to the present invention is characterized in that, when a conventional optical disk (e.g. CD or DVD) or an unrecognizable thin film chemical analysis apparatus is loaded onto the thin film chemical analysis apparatus drive, the user is requested to eject it or receives a warning message.

When the user requests that the thin film chemical analysis apparatus 100 be ejected (unloaded) from the thin film chemical analysis apparatus drive or stopped while the thin film chemical analysis apparatus is diagnosing or analyzing a sample, the drive ignores the request and continues the analysis and diagnosis. The drive gives the user a warning message or requests a password.

If the user enters the correct password, the user's request for ejecting (unloading) or stopping is accepted.

After the diagnosis and analysis are completed, the user's request for ejecting is accepted so that the thin film chemical analysis apparatus can be ejected from the thin film chemical analysis apparatus drive.

The memory of the wireless RF IC 188 stores information regarding how many times the thin film chemical analysis apparatus has been used, its expiration date, or the kind of disease to be diagnosed.

Particularly, when a disposable thin film chemical analysis apparatus is ejected while it is being used or after it has been used, the memory of the wireless IF IC 188 records its history so that, if the apparatus is reloaded at a later time, the user is informed that the apparatus is not suitable for diagnosis.

The barcode pattern stores information regarding the proper ID of the thin film chemical analysis apparatus, its expiration date, or the type of disease to be diagnosed.

The information regarding expiration date is used to inform the user that, if the expiration date of the thin film chemical analysis apparatus is over, it is not suitable for diagnosis.

FIG. 36 shows a thin film chemical analysis apparatus drive adapted for front loading or top loading of a thin film chemical analysis apparatus according to an embodiment of the present invention.

A thin film chemical analysis apparatus 100 is loaded onto the thin film chemical analysis apparatus drive. Reference numeral 751 refers to a case of the thin film chemical analysis apparatus drive, reference numeral 750*a* refers to a tray for front-loading the thin film chemical analysis apparatus 100, and reference numeral 750*b* refers to a cover for top loading, which is opened to fit the pore 170 of the thin film chemical analysis apparatus to the turntable. Either the tray 750*a* or the cover 750*b* is selected according to the loading type. The thin film chemical analysis apparatus according to the present invention optionally has a playback/search button 745 and a stop button 746 for playing a conventional optical disk. Reference numeral 744 refers to a power on/off button of the thin film chemical analysis apparatus drive.

Reference numeral 760 refers to a display device for displaying the proceeding state and mode of the thin film chemical analysis apparatus drive, and an LED or LCD device may be used as the display device.

The display device 760 displays whether the currently loaded disk is a thin film chemical analysis apparatus or an optical disk, the analysis result, or the proceeding state of the thin film chemical analysis apparatus drive during major processes.

The proceeding ratio during the major processes (preparation process, amplification process, hybridization process, and antigen-antibody reaction process) and steps may be displayed in terms of percent (%) or in a bar graph type.

Alternatively, the display device 760 may display the proceeding ratio during the major processes (preparation process, amplification process, hybridization process, and antigen-antibody reaction process) and steps in terms of percent or in a bar or pie graph type together with a graphic user interface.

Reference numeral 111 refers to an input/output device, which is used for remote access to the corresponding doctor via Internet automatically or manually. If necessary, the diagnosis result data and a medical interview table are remotely transmitted to the doctor. The patient then waits for a prescription of the doctor. The thin film chemical analysis apparatus drive shown in FIG. 36 may additionally have a speaker, a moving image camera, and a microphone.

In general, the concentration of the tumor marker in blood is not increased as long as the cancer is not progressing. In other words, the tumor marker concentration in blood is in a normal range in the case of an initial-stage cancer, and increases as the cancer progresses (i,e. the positive ratio increases). The present invention is characterized in that, based on these findings, statistical software for managing the history of the result of reading the assay site according to qualitative analysis is preferably used to provide the user with information regarding periodical tracing diagnosis.

The present invention is also characterized in that the thin film chemical analysis apparatus drive preferably has software for reading and analyzing the reaction result, determining whether the result is negative or positive or it belongs to a risk group, and calculating relevant numbers.

In addition, the present invention is characterized in that the thin film chemical analysis apparatus drive is preferably adapted for side loading or vertical loading of the thin film chemical analysis apparatus.

Figure 37:
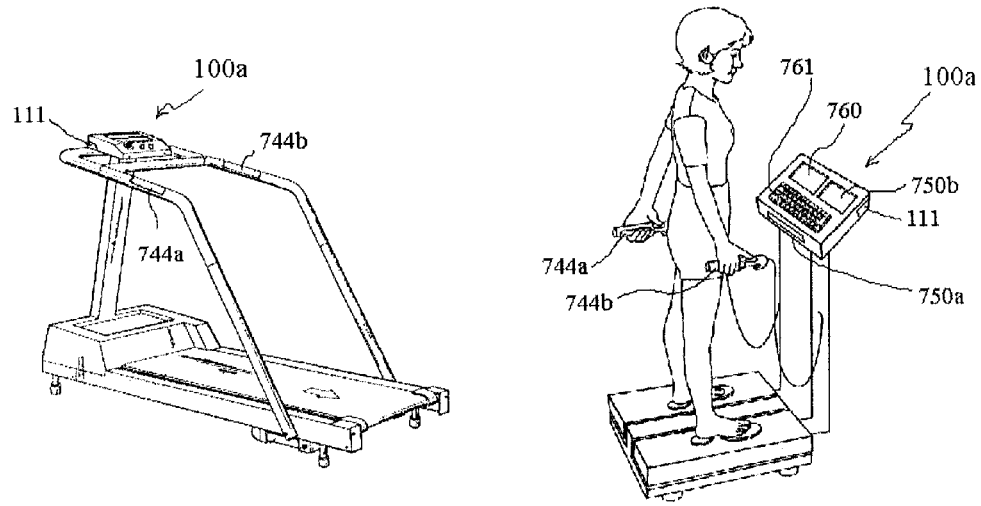
FIG. 37 shows a running machine and a body fat measuring apparatus, which are equipped with a thin film chemical analysis apparatus drive shown in FIG. 36, according to an embodiment of the present invention.

FIG. 37 shows a running machine (in the left half) and a body fat measuring apparatus (in the right half), which are equipped with a thin film chemical analysis apparatus drive shown in FIG. 36, according to an embodiment of the present invention.

Referring to FIG. 37, the running machine or body fat measuring apparatus equipped with the thin film chemical analysis apparatus drive can not only measure body fat, but also conduct various types of biochemical blood analysis and diagnosis. Reference numeral 760 refers to a display device, and reference numeral 761 refers to a keyboard having ten keys for inputting information regarding the person to be tested (e.g. height, weight, gender, age, etc). Reference numeral 750*a* refers to a tray for front loading of the thin film chemical analysis apparatus 100, and reference numeral 750*b* refers to a cover for top loading.

Reference numerals 744a and 744b refer to electrodes for measuring the body fat or pressure sensors for measuring the blood pressure or pulse. Reference numeral 111 refers to an interface unit for the input/output device, which has the communication standard of USB, IEEE1394, or Internet communication networks.

Figure 38:
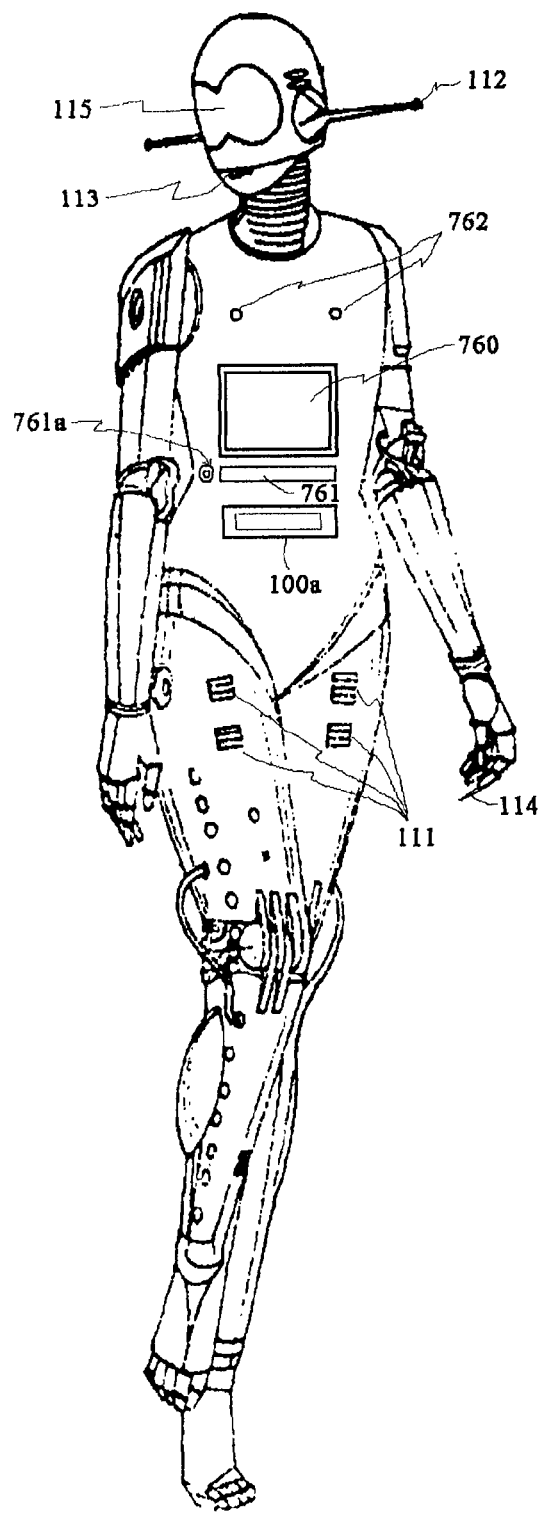
FIG. 38 shows a bio-robot or a robot mannequin equipped with a thin film chemical analysis apparatus drive shown in FIG. 36 according to an embodiment of the present invention.

FIG. 38 shows a bio-robot or a robot mannequin equipped with a thin film chemical analysis drive shown in FIG. 36 according to an embodiment of the present invention.

Reference numeral 760 refers to a display device, reference numeral 112 refers to a wireless input/output device, reference numeral 113 refers to a speaker, and reference numeral 115 refers to a moving image camera. The bio-robot has a lancet device 114 mounted on its finger to sample blood, which is injected into the injection hole 121 of the thin film chemical analysis apparatus. Then, the thin film chemical analysis apparatus is loaded onto the thin film chemical analysis apparatus drive 100a to start biochemical blood analysis. Reference numeral 762 refers to a microphone, and reference numeral 761 refers to a keyboard having ten keys. The keyboard is mounted on the tray and is contained in the belly of the bio-robot. A keyboard tray drawing button 761a is used to draw out the keyboard while being mounted on the tray or to place it inside the belly.

Reference numeral 111 refers to an interface unit for the wired and wireless input/output device, which characteristically follows the communication standard of USB, IEEE1394, Internet communication networks, or wireless mobile communication telephones.

The bio-robot characteristically has electrodes for measuring body fat or pressure sensors for measuring blood pressure or pulse, which are positioned on fingers or palms of both hands of the bio-robot.

The electrodes for measuring body fat are preferably adapted to make contact with both hands of a person to measure his/her body fat contained in a specific portion of his/her body based on BIA (Bioelectrical Impedance Analysis).

The thin film chemical analysis apparatus may be used in combination with a vending machine. Particularly, the vending machine has menu buttons and a coin (note) insertion hole so that customers can buy thin film chemical analysis apparatuses depending on the type of disease. After a user settles the charge, a corresponding thin film chemical analysis apparatus is outputted via a discharge hole so that the user can manually load an analyte. Alternatively, the user may insert his/her finger into a blood-sampling hole of the vending machine so that a lancet device contained in the vending machine automatically samples blood and starts diagnosis. In the former case, i.e. when the user manually loads an analyte on the thin film chemical analysis apparatus, it is again inserted into a slot of the vending machine. Then, a thin film chemical analysis apparatus drive contained in the vending machine outputs the diagnosis result after a predetermined period of time and informs the user of it. Various thin film chemical analysis apparatuses are stacked on a tray in the vending machine so that, when a user settles the charge, a corresponding thin film chemical analysis apparatus is outputted via the discharge hole.

Figure 39:
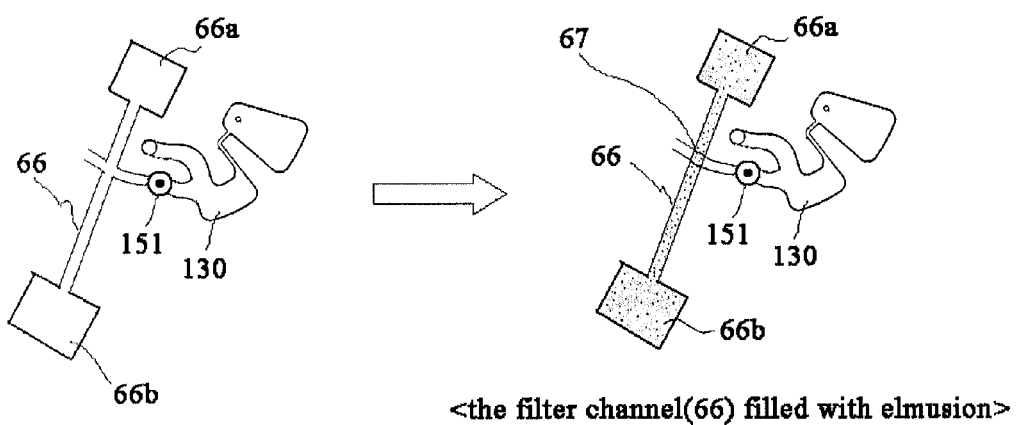
FIG. 39 shows a thin film valve having a filter, which is equipped with a micropore, installed at its outlet according to an embodiment of the present invention.

FIG. 39 shows a thin film valve having a filter, which is equipped with a micropore, installed at its outlet according to an embodiment of the present invention.

Referring to FIG. 39, a filter 67 equipped with a micropore is installed at the outlet of a thin film valve 151 so that, every time when the thin film valve 151 is opened by a pulse valve operation, the analyte in the preparation chamber 130 passes through the filter by centrifugal force and that the separated sample moves to the buffer chamber 131 according to an embodiment of the present invention. Such an operation will hereinafter be referred to as a pulse filter operation, which is advantageous when serum or plasma is separated from a viscous analyte (e.g. blood). Particularly, the sticky analyte is forced to move through the filter by centrifugal force so that samples can be separated quickly. The pulse filter operation may begin after a predetermined amount of serum has been separated during the centrifugal separation process.

Such serum separation by the pulse filter operation is advantageous in that direct centrifugal separation through the filter 67 shortens the serum separation time.

A membrane or a porous filter having a micropore for separating plasma or serum is preferably placed at the outlet of the preparation chamber so that the blood or analyte is forced to pass through the filter by centrifugal force in order to separate serum.

The present invention is characterized in that the porous filter is preferably obtained by installing a prepolymer mixture at the outlet of the thin film valve and irradiating it with UV light to form a polymer (i.e. emulsion photopolymerization).

Characteristically, the prepolymer mixture consists of a monomer, a crosslinker, a porogen, and a photoinitiator.

The prepolymer mixture turns into an emulsion by ultrasonic waves. When the emulsion is injected into the inlet 66a of the filter channel 66 which is perpendicular to the outlet of the thin film valve 151, the emulsion fills the filter channel 66 due to the capillary phenomenon and reaches the outlet 66b of the filter channel 66.

When irradiated with UV light, the filter channel 66 undergoes photopolymerization and forms a polymer. As a result, a porous filter 67 is formed at the outlet 151 of the thin film valve.

The present invention is characterized in that the sample in the preparation chamber is obtained from an analyte by centrifugal separation, or a desired sample is separated from the analyte by a pulse filter operation.

The present invention is characterized in that the preparation chamber has a filter channel at its outlet.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A thin film chemical analysis apparatus comprising:
   at least one chamber adapted to store a fluid necessary for biological or biochemical analysis or to conduct a biological or biochemical reaction;
   channels for fluid-connection between the chambers;
   holes arranged between or inside the channels and connected to the channels;
   a rotatable body having the chambers, the channels, and the holes integrated into the body wherein the body comprises of at least two substrates selected among an upper substrate, a middle substrate, and a lower substrate stacked on one another; and
   a seal formed on the holes by a thin film adhesive tape while the thin film adhesive tape binds the substrates; and
   wherein the seal is opened when the thin film adhesive tape is burst or torn away from the holes by hydraulic pressure of the fluid created by centrifugal force resulting from rotation of the body.

2. The thin film chemical analysis apparatus as claimed in claim 1, wherein the seal further comprises a thin film valve coupled to the seal in series and a valve hole for the thin film valve, and wherein the thin film valve is reversibly opened/closed by either opening or closing the valve hole.

3. The thin film chemical analysis apparatus as claimed in claim 1, wherein the thin film chemical analysis apparatus further comprises a heat irradiator to apply heat to the seal, and a valve searcher coupled to the heat irradiator so that the seal to be opened can be selected and wherein the seal is opened by a combination of the centrifugal force and the heat applied by the heat irradiator.

4. The thin film chemical analysis apparatus as claimed in claim 1, wherein the seal comprises grease or a grease-coated solid particle, the grease or grease-coated solid particle is glued to the hole, and the hole is opened when the grease or grease-coated solid particle is torn or separated from the hole by centrifugal force resulting from rotation of the body.

5. The thin film chemical analysis apparatus as claimed in claim 1, wherein the seal comprises a stopple glued to the hole, and the hole is opened when the stopple is separated from the hole by centrifugal force resulting from rotation of the body.

6. The thin film chemical analysis apparatus as claimed in claim 1 or 2, further comprising a searcher to search for a specific location of the body through a radial search process and an azimuthal search process and a thin film-type magnet arranged at a specific location of the body to provide the searcher with a reference location, and wherein the searcher is adapted to search for a location of a valve, a chamber, or an assay site on the body.

7. The thin film chemical analysis apparatus as claimed in claim 1, wherein the body comprises at least two substrates stacked on each other, and the thin film chemical analysis apparatus further comprises thin film adhesive tape stacked between the substrates to bind the substrates; and a thin film channel formed on the thin film adhesive tape and wherein the thin film channel is formed by a missing portion from the thin film adhesive tape when the substrates are bound, and thereby forms a capillary channel.

8. The thin film chemical analysis apparatus as claimed in claim 1, further comprising: a bio pickup optical module; a slider equipped with the bio pickup optical module and adapted to search for a specific location on the body; a slider motor for controlling movement of the slider; a spindle motor for rotating the body; optionally a step motor for rotating the body by a predetermined angle and a gear connector to control connection of the step motor and the spindle motor, and wherein the bio pickup optical module comprises at least one of: a laser beam generating device, a thin film valve opening/closing means for controlling opening/closing of the thin film valve, a reaction result detecting device, a searcher, and a chamber mixer.

9. The thin film chemical analysis apparatus as claimed in claim 1, wherein the at least one chamber comprises a liquid storage chamber and a reagent chamber, the liquid storage chamber contains a liquid-phase reagent and the liquid-phase reagent stored in the liquid storage chamber is supplied to the reagent chamber when the seal is opened; or the liquid storage chamber and the reagent chamber contain a dilution buffer and solid-phase reagent granules, respectively, and the dilution buffer stored in the liquid storage chamber is supplied to the reagent chamber when the seal is opened so that the solid-phase reagent granules stored in the reagent chamber are dissolved in the dilution buffer and turn into a liquid-phase reagent.

10. The thin film chemical analysis apparatus as claimed in claim 1, wherein the at least one chamber comprises a liquid storage chamber, a reagent chamber, and a process chamber, the body further comprises a thin film valve and a valve hole, and wherein the thin film valve is reversibly opened/closed by opening/closing the valve hole, a fluid movement from the liquid storage chamber to the reagent chamber is made when the seal is opened, and a fluid movement from the reagent chamber to the process chamber or a fluid movement between the process chambers is made when the thin film valve is opened.

11. The thin film chemical analysis apparatus as claimed in claim 2 or 10, wherein the thin film chemical analysis apparatus further comprises a thin film valve opener/closer to control opening/closing of the thin film valve; and a valve searcher coupled to the thin film valve opener/closer so that a thin film valve is opened whenever the thin film valve is selected by the valve searcher.

12. The thin film chemical analysis apparatus as claimed in claim 2 or 10, wherein the thin film valve comprises: a permanent magnet installed above the valve hole; an movable electromagnet or a movable permanent magnet installed below the body; and a magnetic microbead or a thin film cylindrical magnet which is moved upward or downward by magnetic force formed between the permanent magnet installed above the valve hole and the movable electromagnet or the movable permanent magnet, thereby opening and closing the valve hole, wherein the thin film valve is in closed state during circulation and storage periods by magnetic force formed between the permanent magnet installed above the valve hole and the magnetic microbead or the thin film cylindrical magnet.

13. The thin film chemical analysis apparatus as claimed in claim 1, wherein the thin film chemical analysis apparatus further comprises a small magnetic ball stored in the at least one chamber; a slider adapted to move below the chamber; and a permanent magnet mounted on the slider to apply drawing force or repulsive force to the small magnetic ball so that the small magnetic ball can move, and the small magnetic ball in the chamber moves together by the drawing force or repulsive force from the permanent magnet when the slider moves so that liquid in the chamber is mixed.

14. The thin film chemical analysis apparatus as claimed in claim 1, wherein the thin film chemical analysis apparatus further comprises a small magnetic ball stored in the at least one chamber; a slider adapted to move below the chamber; and a permanent magnet mounted on the slider to apply drawing force or repulsive force to the small magnetic ball so that the small magnetic ball can move, and the small magnetic ball in the chamber moves together by the drawing force or repulsive force from the magnet every time the ball faces the permanent magnet by rotating the body or by repeating forward/backward movement of the slider while the permanent magnet remains stationary at a corresponding radius of the chamber so that liquid in the chamber is mixed.

15. The thin film chemical analysis apparatus as claimed in claim 1, wherein the thin film chemical analysis apparatus further comprises a small magnetic ball stored in the at least one chamber; a slider adapted to move below the chamber; and an electromagnet mounted on the slider to apply drawing force or repulsive force to the small magnetic ball so that the small magnetic ball can move, and the small magnetic ball in the chamber vibrates by on/off control of the electromagnet or by changing a magnetic field direction or by repeating forward/backward movement of the slider so that liquid in the chamber is mixed.

16. The thin film chemical analysis apparatus as claimed in claim 2 or 10, wherein the thin film chemical analysis apparatus further comprises a thin film valve opener/closer to control opening/closing of the thin film valve; and a valve search means coupled to the thin film valve opening/closing means so that a thin film valve to be opened can be selected, and a fluid movement is made by pumping force occurring when the valve search means repeatedly selects the thin film valve or by a pulse valve operation of opening the thin film valve every time a location of the thin film valve opening/closing means coincides with a location of the thin film valve during rotation of the body.

17. The thin film chemical analysis apparatus as claimed in claim 1, further comprising a liquid valve for preventing centrifugal force from causing fluid leakage from the chamber during rotation of the body.

18. The thin film chemical analysis apparatus as claimed in claim 17, wherein the liquid valve has a hydrophilic channel coated with a hydrophilic material, and a fluid held in a chamber by the liquid valve during rotation of the body is moved to a different chamber by a hydrophilic fluid movement through the hydrophilic channel when the body stops.

19. The thin film chemical analysis apparatus as claimed in claim 1, wherein the at least one chamber comprises a preparation chamber for preparing a sample from an analyte, the preparation chamber is a wedge-shaped chamber connected to the channel, the seal is arranged between the wedge-shaped chamber and the channel, and wherein the wedge-shaped chamber has an inverted V-shape when viewed with a rotation center of the body.

20. The thin film chemical analysis apparatus as claimed in claim 1, wherein the body further comprises a thin film valve and a filter connected to the thin film valve in series to separate a sample from an analyte leaking from the thin film valve whenever the thin film valve is opened, and wherein the sample is separated by a pulse filter operation of opening the thin film valve every time a location of the thin film valve opening/closing means coincides with a location of the thin film valve during rotation of the body and passing the analyte through the filter by centrifugal force.

21. The thin film chemical analysis apparatus as claimed in claim 1, further comprising a temperature controller to control a reaction temperature of the chamber, the temperature controller comprising a temperature measure, a heater, and a cooler.

22. The thin film chemical analysis apparatus as claimed in claim 1, wherein the at least one chamber comprises at least one of: a preparation chamber for preparing a sample from an analyte; an amplification chamber for amplifying the sample; a buffer chamber for temporarily storing a sample obtained in the preparation chamber or storing a dilution buffer for diluting the sample or storing a label to be coupled to a target substance in the sample; an assay site for a biological or biochemical reaction with the sample; a liquid storage chamber storing an enzyme necessary for analysis or a buffer solution; a reagent chamber for temporarily storing the enzyme or buffer solution from the liquid storage chamber; a trash chamber for collecting waste created during a dehydration process or a washing process; a washing chamber for storing a washing solution necessary for a washing process; and a quantitative chamber for holding a predetermined amount of sample.

23. The thin film chemical analysis apparatus as claimed in claim 22, wherein the dilution buffer in the buffer chamber is supplied via a reagent injection hole of the buffer chamber or is supplied by opening the seal corresponding to the liquid storage chamber storing the dilution buffer.

24. The thin film chemical analysis apparatus as claimed in claim 22, wherein the quantitative chamber is installed between a concentric channel and the assay site, the quantitative chamber and the concentric channel are filled with a sample by a hydrophilic fluid movement of the sample via the concentric channel, and the at least one chamber further comprises an overflow chamber at an end of the concentric channel so that, during rotation of the body, the sample filling the concentric channel is moved into the overflow chamber by centrifugal force and thereby the predetermined amount of sample is left in the quantitative chamber.

25. The thin film chemical analysis apparatus as claimed in claim 22, wherein the assay site comprises at least one of: a porous membrane, interdigitated electrodes coated on a surface of the porous membrane, and a capture probe fixed in spaces given between the interdigitated electrodes; a porous membrane and a capture probe fixed on the porous membrane; a micropore formed on the assay site and a capture probe fixed on the micropore; a capture probe to be fixed and a fixer to fix the capture probe to the assay site at a desired time.

26. The thin film chemical analysis apparatus as claimed in claim 22, wherein the assay site comprises a porous membrane and a biomaterial fixed on the porous membrane as a form of lines or spot array wherein the biomaterial is selected at least one of: tumor markers, DNA, antibody, a pesticide residue markers for detecting organophosphorous-based or carbamate-base insecticide and disease markers;, and wherein the porous membrane comprises at least one of: a conjugate pad, a sample pad, a reference line providing a cut off value or a reference value for evaluating reaction intensity, and a control line indicating test validity.

27. The thin film chemical analysis apparatus as claimed in claim 1, wherein the body comprises an integrated wireless RF IC incorporating a temperature measuring function, a heating function, or an assay site reading function.

28. The thin film chemical analysis apparatus as claimed in claim 1, wherein the body comprises a data layer on a surface of the body, the data layer following a CD or DVD format.

29. The thin film chemical analysis apparatus as claimed in claim 1, the body comprises a wireless RF IC, and wherein the wireless RF IC stores information regarding a pesticide residue or an antibiotic residue of agricultural products at least one of: a test date, a test result, an expiration date of the body, a producing area for the agricultural products, a product ID of the body, a production history of the agricultural products, a circulation history of the agricultural products, a farmer contact, or whether the product is organic or not.

* * * * *

UNITED STATES PATENT AND TRADEMARK OFFICE
CERTIFICATE OF CORRECTION

| | | |
|---|---|---|
| PATENT NO. | : 8,097,450 B2 | Page 1 of 1 |
| APPLICATION NO. | : 12/376034 | |
| DATED | : January 17, 2012 | |
| INVENTOR(S) | : Jae-Chern Yoo | |

It is certified that error appears in the above-identified patent and that said Letters Patent is hereby corrected as shown below:

Column 62, Line 34, In Claim 26, delete "organophosphorous" and insert -- organophosphorus --, therefor.

Column 62, Line 35, In Claim 26, delete "markers;," and insert -- markers; --, therefor.

Signed and Sealed this
Twenty-ninth Day of May, 2012

David J. Kappos
*Director of the United States Patent and Trademark Office*